US008456416B2

(12) United States Patent  
Izumi

(10) Patent No.: US 8,456,416 B2  
(45) Date of Patent: Jun. 4, 2013

(54) IMAGE RECOGNITION APPARATUS, AND OPERATION DETERMINATION METHOD AND PROGRAM THEREFOR

(75) Inventor: Kenji Izumi, Matsue (JP)

(73) Assignee: Shimane Prefectural Government, Matsue-Shi (JP)

(*) Notice: Subject to any disclaimer, the term of this patent is extended or adjusted under 35 U.S.C. 154(b) by 203 days.

(21) Appl. No.: 12/995,898

(22) PCT Filed: Jun. 2, 2009

(86) PCT No.: PCT/JP2009/060095
§ 371 (c)(1),
(2), (4) Date: Dec. 2, 2010

(87) PCT Pub. No.: WO2009/148064
PCT Pub. Date: Dec. 10, 2009

(65) Prior Publication Data
US 2011/0141009 A1  Jun. 16, 2011

(30) Foreign Application Priority Data

Jun. 3, 2008 (JP) ................................. 2008-146231  
Aug. 11, 2008 (JP) ................................. 2008-207388  
Nov. 21, 2008 (WO) ................. PCT/JP2008/071268

(51) Int. Cl.
*G09G 5/00* (2006.01)
(52) U.S. Cl.
USPC .......................................... 345/156; 345/419
(58) Field of Classification Search
USPC .......................................... 345/156–158, 419
See application file for complete search history.

(56) References Cited

U.S. PATENT DOCUMENTS

2006/0256081 A1  11/2006  Zalewski et al.  
2011/0043446 A1*  2/2011  Spears et al. .................. 345/156  
2012/0056800 A1*  3/2012  Williams et al. .............. 345/156

FOREIGN PATENT DOCUMENTS

| CN | 1183151 A | 5/1998 |
| JP | A-2001-013314 | 1/2001 |
| JP | A-2004-078977 | 3/2004 |
| JP | A-2004-139155 | 5/2004 |
| JP | A-2005-070996 | 3/2005 |
| JP | A-2005-190283 | 7/2005 |
| JP | A-2005-196530 | 7/2005 |
| JP | A-2006-107170 | 4/2006 |
| JP | A-2010-146481 | 7/2010 |
| WO | WO 96/34332 A1 | 10/1996 |

OTHER PUBLICATIONS

Japanese Office Action issued in Japanese Patent Application No. 2008-207388 dated Sep. 12, 2008 (with translation).

(Continued)

*Primary Examiner* — Regina Liang  
(74) *Attorney, Agent, or Firm* — Oliff & Berridge, PLC

(57) ABSTRACT

An image for an operator is extracted, and an operation determination unit employs a relationship, relative to a marker of an operation input system, for the operator, who is standing behind the marker when viewed by a video camera. When a body part of the operator comes to the front of an operation plane, as viewed by the video camera, the operation determination unit determines that an action for an input operation has been started, and examines the shape and the movement of each individual body part (an open hand, two fingers that are being held up, etc.), and determines whether the shape or the movement is correlated with one of operations that are assumed in advance.

23 Claims, 46 Drawing Sheets

OTHER PUBLICATIONS

Japanese Office Action issued in Japanese Patent Application No. 2008-207388 dated Jan. 9, 2009 (with translation).
International Search Report issued in International Application No. PCT/JP2009/060095 dated Aug. 18, 2009.
Aug. 17, 2012 Office Action issued in Chinese Application No. 2009801208343 (with translation).
Feb. 8, 2013 Office Action issued in Japanese Application No. 2009-133519 (with English translation).

* cited by examiner

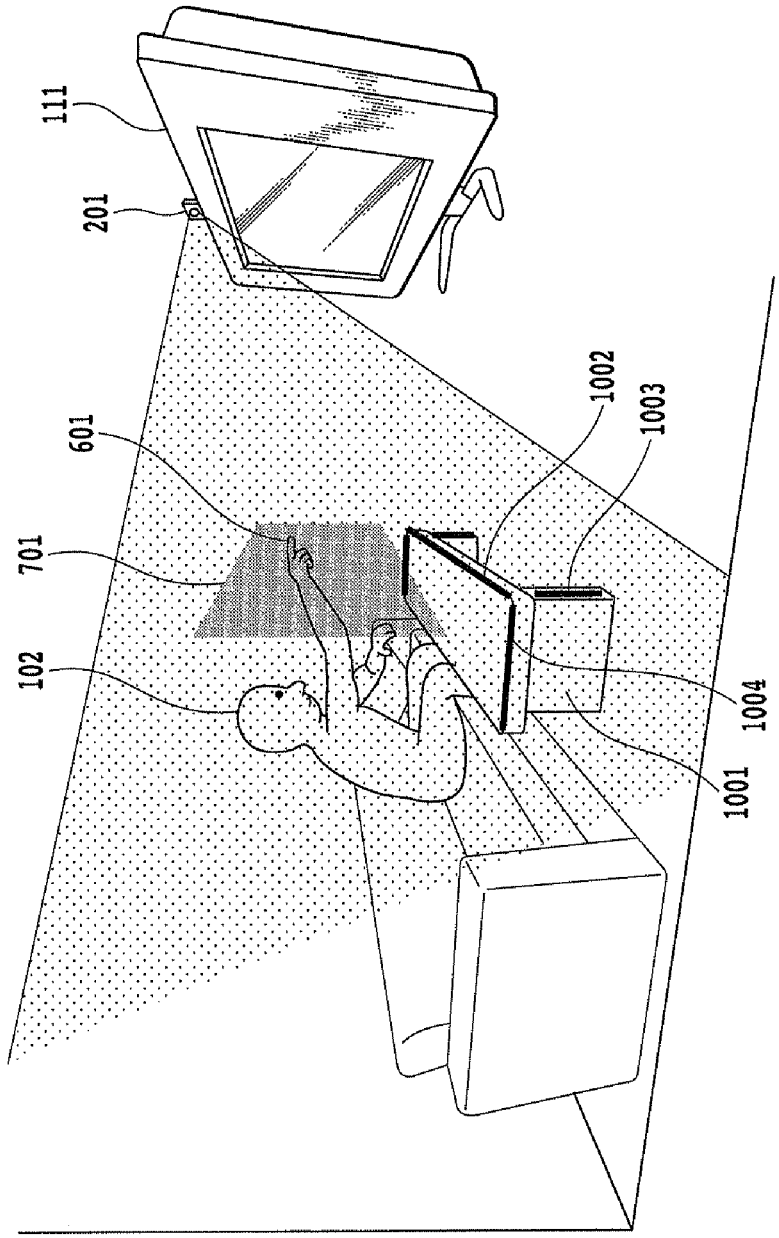

FIG.10

ADVANTAGE: SINCE GENERALLY THE ENTIRE SYSTEM IMAGE IS DIFFERENTIATED FROM A DISPLAY DEVICE, A USER CAN EASILY IDENTIFY THE SYSTEM AS A KIOSK TERMINAL. FURTHER, WITH A GUARD, A USER CAN ALSO EASILY IDENTIFY THE LOWER LIMIT (LOWER LINE OF SCREEN) OF A VIRTUAL OPERATION AREA.

DISADVANTAGE: APPROPRIATE INSTALLATION SPACE AND THE MANUFACTURING COST FOR A THREE-DIMENSIONAL HARDWARE UNIT ARE REQUIRED. HOWEVER, THE ARRANGEMENT AS SHOWN IN THIS SYSTEM THAT INCLUDES A MARKER ON A LIVING ROOM TABLE AND A LARGE-SCREEN TELEVISION CAN BE EASILY PROVIDED AS A REMOTE CONTROLLER SYSTEM WITHOUT A REMOTE CONTROLLER.

EXAMPLE OPERATION

INSTRUCT DISPLAY OF CHANNEL 21 WITH A GESTURE USING
TWO LEFT HAND FINGERS AND ONE RIGHT HAND FINGER.

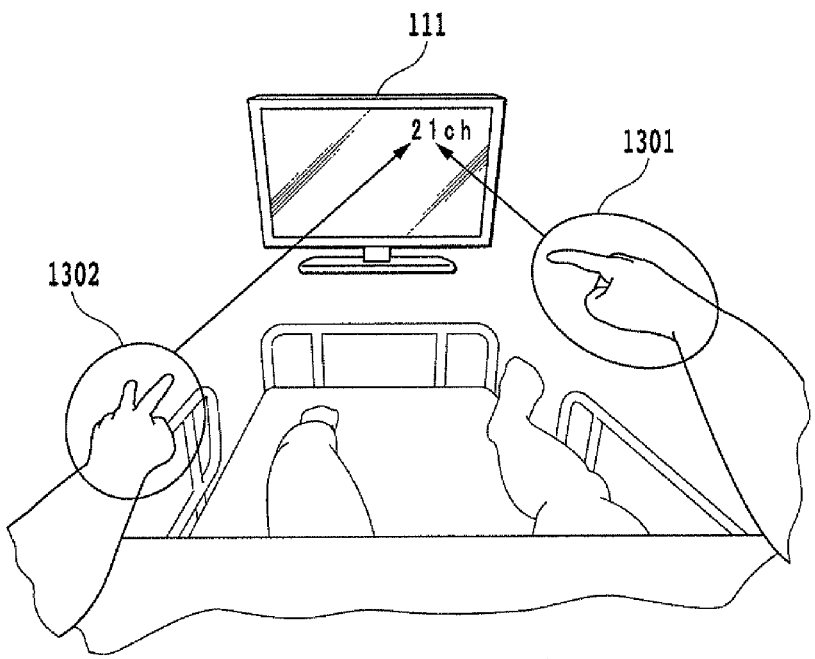

ADVANTAGE: A VIRTUAL OPERATION AREA IS EASILY
RECOGNIZED WITH A GUARD. THE INTENT, OR NOT,
OF A USER TO PERFORM AN OPERATION CAN BE CONFIRMED
BY DETERMINING WHETHER THE FINGER IS PROJECTED ACROSS
A DETERMINATION LINE (LONG SIDE), AS A RESULT
AN AMBIGUOUS EXPRESSION CAN BE AVOIDED.
AND A GESTURE THAT SIGNALS A DECISION SIMPLY NEEDS
TO BE PRESENTED ACROSS THE DETERMINATION LINE TOWARD
THE CAMERA.
THUS, AMBUGUIT AND INPUT ERRORS THAT ARE CONVENTIONAL
PROBLEMSCAN BE AVOIDED.

FIG.13 ially for game machines and operation guidance apparatuses, techniques have been proposed according to which, to ensure the performance of an operation, a full image of the figure of an operator, or a partial image of the figure is recorded by a camera, and the intent of the operator is determined based on either recorded image type. Further, an example technique proposed in Japanese Patent Laid-Open No. 2004-78977, includes the use of a host computer for identifying the shape and action of a subject that appears in an image recorded by a CCD camera, and a display device for displaying the shape provided and the action performed by the subject identified by the host computer, so that when an operator facing the CCD camera provides an instruction by moving a hand or hands, the hand movement is displayed on the screen of the display device and the operator can, by moving the hand, move the icon of an arrow cursor to point at and select a virtual switch on the display screen. Thus, an input device, such as a mouse, is not required, and for the apparatus, a very simple operation is obtained.

IMAGE RECOGNITION APPARATUS, AND OPERATION DETERMINATION METHOD AND PROGRAM THEREFOR

TECHNICAL FIELD

The present invention relates to an image recognition apparatus and an operation determination method, and more particularly, to an image recognition apparatus and an operation determination method for employing an image or images recorded by a video camera, etc., to determine an action that is measured.

BACKGROUND ART

Recently, various apparatuses and methods have been proposed for use as interfaces between computers, or other electronic equipment, and human operators, i.e., man-machine interfaces, and, especi Another input system has been proposed whereby, for entering an operation, a specific type of bodily gesture is identified by employing an image representing the action or the shape of hands or fingers. Referring to FIG. 14, an example input apparatus is illustrated that can be employed for a presentation that is given while a screen is being operated in accordance with an instruction conveyed via a gesture, or that can be employed for a non-contact kiosk terminal that does not require a touch panel. When an operator facing a large screen performs various operations directed toward a camera installed at the normal position (A), the operation contents are displayed on the large screen. Based on the image thus obtained, the shape, or the action performed by the operator is extracted by employing a method well known in the technical field of the present invention, and is compared with patterns that are, for example, predesignated and stored in a database, and the definition of the shape, or the actions performed by the operator are determined and employed to control the apparatus.

Meanwhile, a technique for capturing the image of an operator is employed, for example, for a security check, because, as shown in FIG. 15, a three-dimensional or a stereoscopic camera is employed for recording the image of an operator, and thus, a three-dimensional image can be reproduced. When a three-dimensional image is reproduced, the stereoscopic actions of the operator can be obtained, and especially the front and rear movement of the hands of the operator can be identified, as shown, for example, in FIG. 16. Thus, the types of gestures become more diverse. Furthermore, when an extracted image includes a plurality of operators, the positional relationship of multiple people can be identified based on the three-dimensional image, and simply the action of the operator in front need be extracted and employed for entering an instruction for an operation.

However, for a conventional operation during which gestures are used, specific standard gestures, such as de facto standards, have not been established, and a user can not identify, at a single glance, the correlation of an action with an available operation, other than one during which the index fingers are used for pointing at XY coordinates. Actually, there are operations for which an instruction is entered by holding a click, such as for "click", "double click" or "drag", at coordinates for a waiting time period of several seconds; however, since, for example, the designated waiting time is too long, it is not unusual that the smooth operation is interrupted. Therefore, there is a problem that a realistic method is not present whereby an operation, such as clicking or deciding (double click, etc.), is easily and smoothly performed.

Moreover, unlike an input apparatus like a touch panel that an operator can touch directly, it is difficult for a conventional gesture detection apparatus to exactly read the intent of an operator. Specifically, as a problem, when an operator has moved in a certain way, it is not easy to determine whether the action of the operator indicates input intent, or whether the operator moved simply because of a habit. As a result, even a simple gesture, for example, can not be identified unless it is performed unnaturally and noticeably, and as another problem, either an advance rule for gestures is required, or the use of complicated gestures is inhibited.

While taking these problems into account, one objective of the present invention is to provide an image recognition apparatus and an operation determination method whereby an operator is first allowed to identify a condition under which the operator is performing an operation correlated with a specific entry, and to then use a gesture to enter an operation instruction for the apparatus. As a result, an untrained operator is not required to learn special gestures, and simply need move the entire, or only a part, of the body, and the action can be identified as an operation exactly representing the intent of the operator.

CITATION LIST

Patent Literature

PTL 1: Japanese Patent Laid-Open No. 2004-78977

SUMMARY OF INVENTION

In order to achieve this objective, a first aspect of the present invention is an image recognition apparatus, characterized by comprising: three-dimensional imaging means for capturing an image of at least part of an operator, and for generating stereoscopic image data; a virtual operation plane forming reference, which is visible for an operator and is located in advance within an imaging range of the imaging means, so that the operator is able to identify a virtual operation plane in a predetermined space; operation determination means for forming the virtual operation plane based on the operation plane forming reference that is read by the three-dimensional imaging means, permitting the three-dimensional imaging means to scan an action of the operator relative to the thus formed virtual operation plane, and for employing a positional relationship between a part of the operator and the virtual operation plane to determine whether or not the action indicates an operation instruction; and signal output means for outputting a predetermined signal when it is determined that the action indicates an operation instruction.

According to another aspect of the present invention, the image recognition apparatus is characterized in that the virtual operation plane is a plane formed by an upward projection from the operation plane forming reference.

According to another aspect of the present invention, the image recognition apparatus is characterized by further comprising: action limiting means for restricting the operator on an action on the operator side along the operation plane forming reference.

According to another aspect of the present invention, the image recognition apparatus is characterized in that the virtual operation plane is a plane formed by a projection upward from a predetermined position, on the side opposite the operator side, along the operation plane forming reference.

According to another aspect of the present invention, the image recognition apparatus is characterized in that, when one part of the operator is closer to the three-dimensional imaging means than to the virtual operation plane, the operation determination means determines that the action indicates an operation instruction.

According to another aspect of the present invention, the image recognition apparatus is characterized in that the operation determination means examines the shape or the action of a specific part of the operator that is closer to the three-dimensional imaging means than to the virtual operation plane, and determines that an operation correlated with the shape or the action is currently being performed.

According to another aspect of the present invention, the image recognition apparatus is characterized in that the operation determination means searches storage means wherein operation contents are stored in advance in correlation with the shapes or actions of one part of the operator, and determines that an operation that matches or is correlated with the shape or the action is an operation to be entered.

According to another aspect of the present invention, the image recognition apparatus is characterized in that the operation plane forming reference is indicated on the surface of a floor where the operator is located.

According to another aspect of the present invention, the image recognition apparatus is characterized by comprising: a solid object located between the operator and the three-dimensional imaging means, wherein the operation plane forming reference is a predetermined outer edge of the solid object.

According to another aspect of the present invention, the image recognition apparatus is characterized in that the solid object is a table.

According to another aspect of the present invention, the image recognition apparatus is characterized in that, for the operation plane forming reference, markers are provided on a predetermined screen recorded by the three-dimensional imaging means, so that data can be easily extracted from an image that is read.

According to another aspect of the present invention, the image recognition apparatus is characterized by further comprising image display means arranged opposite the operator, wherein the operation determination means displays current results for an operation determination on the image display means, so that the operator can obtain the determination results.

According to another aspect of the present invention, the image recognition apparatus is characterized by further comprising: operation contents determination means for, when a gesture of the operator has occurred within one of two or more virtual operation layers that are areas defined based on the positional relationship relative to the virtual operation plane, determining the contents of an operation based on an operation type, allocated in advance to the virtual operation layer, and the gesture of the operator performed in the virtual operation layer.

According to another aspect of the present invention, there is an operation determination method, whereby an image recognition apparatus recognizes an image for an operator and determines contents of an operation, characterized by comprising: a three-dimensional imaging step of reading a virtual operation plane forming reference, which is visible for an operator and is located in advance within an imaging range of predetermined imaging means, so that the operator is able to identify a virtual operation plane in a predetermined space, and also of capturing an image of at least part of an operator, within the imaging range of the predetermined imaging means, and generating stereoscopic image data; an operation determination step of forming the virtual operation plane based on the operation plane forming reference that is read by the three-dimensional imaging means, and employing a positional relationship between a part of the operator and the virtual operation plane to determine whether or not the action, obtained at the three-dimensional imaging step, indicates an operation instruction; and a signal output step of outputting a predetermined signal when it is determined that the action indicates an operation instruction.

According to another aspect of the present invention, there is a program that permits an image recognition apparatus to perform an operation determination method, for recognizing an image for an operator and determining contents of an operation, characterized by comprising: a three-dimensional imaging step of reading a virtual operation plane forming reference, which is visible for an operator and is located in advance within an imaging range of predetermined imaging means, so that the operator is able to identify a virtual operation plane in a predetermined space, and also of capturing an image of at least part of an operator, within the imaging range of the predetermined imaging means, and generating stereoscopic image data; an operation determination step of forming the virtual operation plane based on the operation plane forming reference that is read by the three-dimensional imaging means, and employing a positional relationship between a part of the operator and the virtual operation plane to determine whether or not the action, obtained by the three-dimensional imaging means, indicates an operation instruction; and a signal output step of outputting a predetermined signal when it is determined that the action indicates an operation instruction.

According to another aspect of the present invention, an image recognition apparatus is characterized by comprising: three-dimensional imaging means for reading an image of at least one part of an operator, and generating a three-dimensional image; operation determination means for forming a virtual operation plane, which serves as an operation reference for the operator, by employing a pre-designated size, at a pre-designated position in an imaging range of the three-dimensional imaging means, and for permitting the three-dimensional imaging means to scan an action of the operator on the virtual operation plane that is formed, and employing a positional relationship of a part of the operator and the virtual operation plane to determine whether the action indicates an operation instruction; image display means, visually recognizable by the operator, for employing the positional relationship, obtained by the operation determination means, between one part of the operator, on the opposite side of the three-dimensional imaging means, along the virtual operation plane, and the virtual operation plane, and calculating a distance between the two, and for displaying an indicator that changes in accordance with the distance in order to indicate an operation instruction to be determined; and signal output means for outputting a predetermined signal when the action indicates an operation instruction.

According to another aspect of the present invention, the image recognition apparatus is characterized in that the indicator becomes smaller when the distance from the part of the operator to the virtual operation plane is reduced.

According to another aspect of the present invention, the image recognition apparatus is characterized in that a hue for the indicator is changed when the distance from the part of the operator to the virtual operation plane is reduced.

According to another aspect of the present invention, the image recognition apparatus is characterized in that transparency for the indicator is lowered when the distance from the part of the operator to the virtual operation plane is reduced.

According to another aspect of the present invention, the image recognition apparatus is characterized in that the contrast between the indicator and an image to be operated displayed on the image display means is increased when the distance from the part of the operator to the virtual operation plane is reduced.

According to another aspect of the present invention, the image recognition apparatus is characterized in that a shape for the indicator is changed when the distance from the part of the operator to the virtual operation plane is reduced.

According to another aspect of the present invention, the image recognition apparatus is characterized in that there are more than one part for the operator, and a plurality of indicators are displayed in correlation with the individual parts of the operator.

According to another aspect of the present invention, the image recognition apparatus is characterized by further comprising: operation contents determination means for, when a gesture of the operator has occurred within one of two or more virtual operation layers that are areas defined based on the positional relationship relative to the virtual operation plane, determining the contents of an operation based on an operation type, allocated in advance to the virtual operation layer, and the gesture of the operator performed in the virtual operation layer.

BRIEF DESCRIPTION OF DRAWINGS

FIG. 10 is a diagram showing the state of a virtual operation plane that is formed based on an operation plane forming reference according to another embodiment of the present invention;

FIG. 13 is a diagram showing a specific display example for supporting operation input according to the additional embodiment of the present invention;

DESCRIPTION OF EMBODIMENTS

The embodiments of the present invention will now be described in detail while referring to drawings.

First Embodiment

Figure 1:
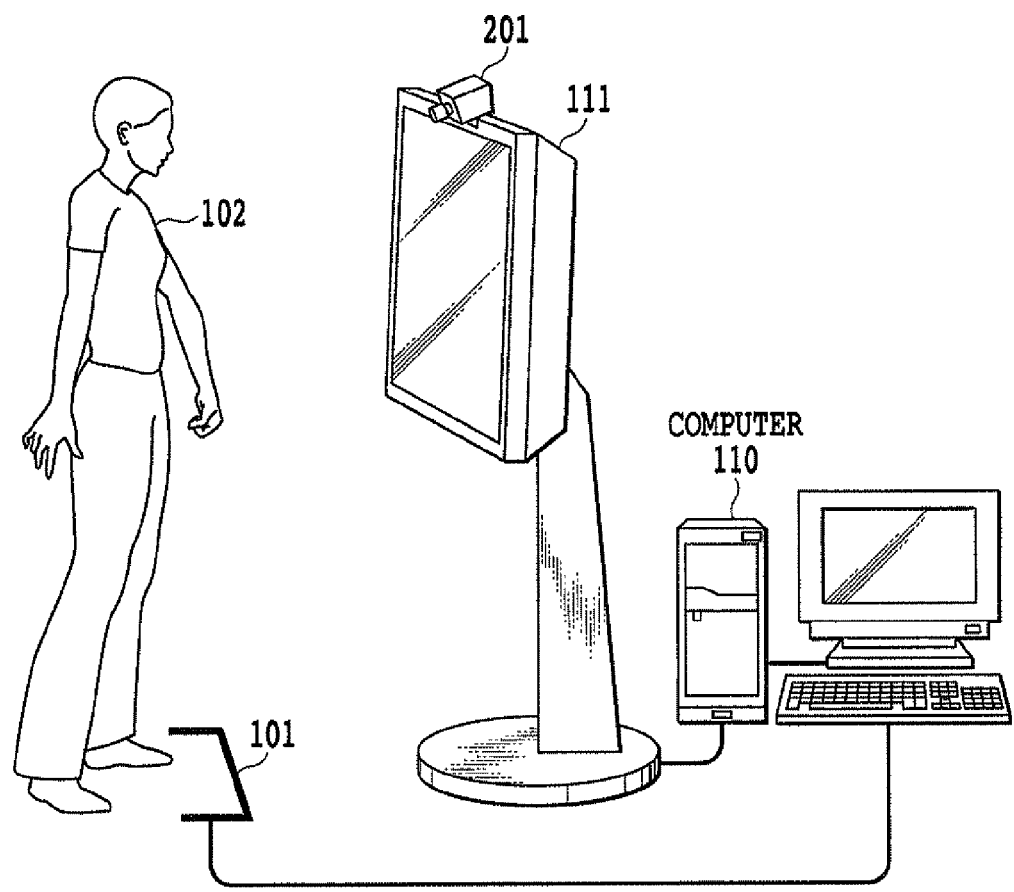
FIG. 1 is a diagram illustrating an example operation input system wherein a marker, which is an operation plane forming reference for one embodiment of the present invention, is indicated on the surface of a floor.

FIG. 1 is a diagram illustrating an example operation input system wherein a maker 101, which is an operation plane forming reference for this embodiment, is indicated on the surface of a floor. In this embodiment, the marker 101 is located between an operator and a monitor 111, and for operating the operation input system, the operator 102 can keep in mind that the movement or the shape of a portion that is extended over the marker 101 toward the display screen is employed for determination of an operation. Various types of video pictures for various applications that are operating purposes of this system are displayed on the monitor 111. Further, as will be described later, operation input can be supported, i.e., for example, the part of the operator 102 to be determined is displayed at the corner of the screen, and the operator 102 can identify a probable action that is currently determined to be an operation instruction. The action of the operator 102 is filmed by a video camera 201, and the obtained video image is processed by a computer 110 to determine an operation indicated by a gesture that is provided by the portion of the operator 102 extended over the marker 101. The computer 110 generates a stereoscopic image for the operator 102 based on data obtained by the video camera 201. Also, the computer 110 calculates the position of the virtual operation plane that is formed using the marker 101, and employs the virtual operation plane as a reference to determine whether the hands, fingers, etc., of the operator 102 are extended toward the video camera 201 and identifies the contents of an operation instruction by regarding the extended portion as an object for operation determination.

In this embodiment, for capturing images, the video camera 201 is installed above the monitor 111; however, so long as required images are obtained, recording means is not limited to this, and other arbitrary means, such as an infrared camera, well known to the technical field of this invention, may also be employed and an arbitrary place near the monitor may be selected for installation. In this embodiment, a three-dimensional (or 3D) camera is employed as the video camera 201 to generate a stereoscopic image that includes the operator and the operation plane forming reference. An infrared camera and a video camera may be employed together. That is, in a case wherein, for example, a retroreflector, which will be described later, is employed as a marker, two types of cameras can be employed in the same manner as an infrared camera that is dedicated for calibration of the operation plane forming reference and the common video camera is employed to record the action of an operator.

Furthermore, although not illustrated, audio output devices, such as loudspeakers, are included with the system in this embodiment and the contents on display and information related to the operation can be transmitted to the operator by speech. When such a function is provided, the operation plane forming reference can be identified not only by graphically displaying the operation contents, but also by releasing the instructed matter and the results using speech, and therefore, even a visually impaired operator can operate the system.

Figure 5:
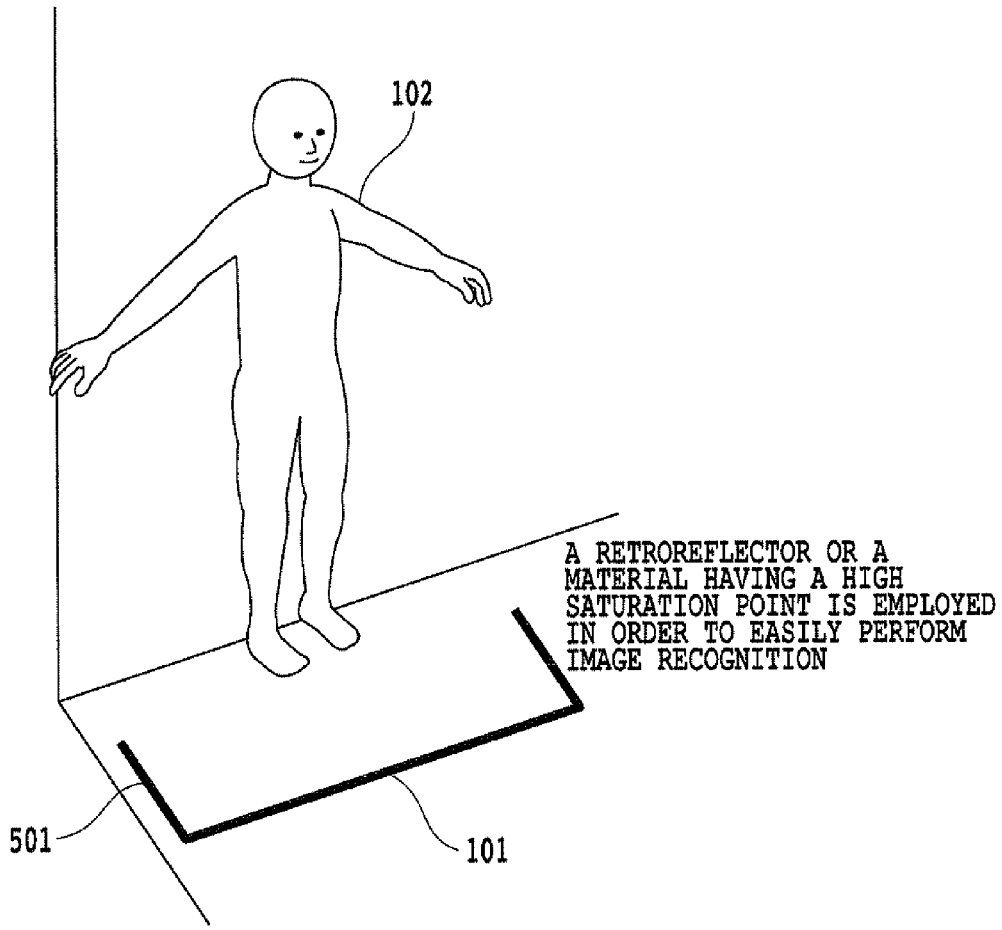
FIG. 5 is a diagram for specifically explaining the function of a marker in this embodiment.
Figure 6:
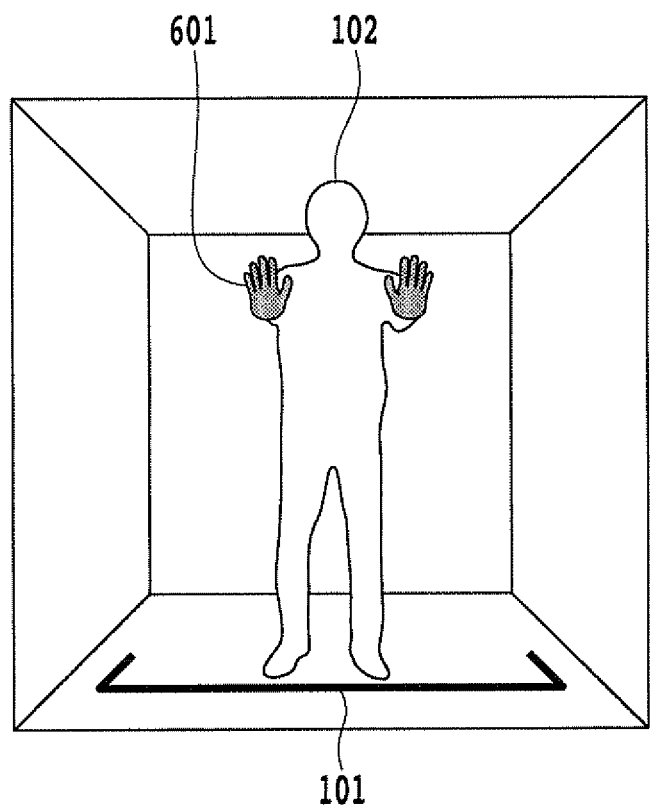
FIG. 6 is a diagram showing the state of a virtual operation plane that is formed based on the operation plane forming reference according to one embodiment of the present invention.
Figure 7:
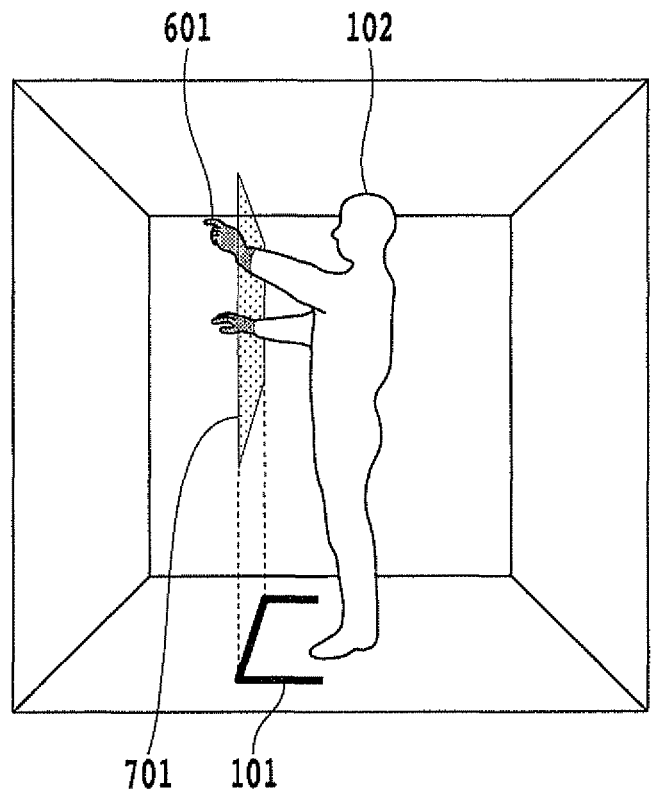
FIG. 7 is a diagram showing the state of a virtual operation plane that is formed based on the operation plane forming reference according to one embodiment of the present invention.

FIG. 5 is a diagram for specifically explaining the role of the marker 101. The marker 101 is an operation plane forming reference for the operator 102 to use to recognize a virtual operation plane, and as shown in FIG. 6, the user 102 images that an operation plane is virtually present above the marker 101, which is indicated on the surface of the floor, and to perform various operations, e.g., to enter an operation instruction, hands 601 can be pushed out, forward, with the marker 101 serving as a reference, and thus perform a gesture. The width of the marker 101 also corresponds to the operation plane. Auxiliary makers 501, which are markers for delimiting the front and rear of the marker 101, can be employed to establish an operation area, or when used as a 3D perspective computation element, may be provided in an arbitrary shape and in an arbitrary direction, and may represent an area appropriate for the measurement. For the operation input system including this maker 101, an operation plane 701 is virtually formed above the marker 101 as shown in FIG. 7, and when the operator 102 pushes out hands 601 across the marker 101, while assuming the presence of the virtual operation plane 701, or moves the hands 601 as if he or she was touching the operation plane 701, like a touch panel, that interacted with one part of the screen of the monitor 111, the operator 102 can easily enter an operation instruction. Moreover, when a user in the area along the virtual operation plane (positioned virtually above a line segment) first takes an arbitrary pose and then pushes hands out forward, the system can employ this movement (select) as a reference for determining an action, or for determining where the hands are after an operation instruction has been determined. Therefore, a user can easily identify the input results, and operation control is similar to a conventional touch panel operation. Furthermore, operation variations are remarkably increased compared with those for a conventional touch panel (double-hand operation, gestures, use of multiple fingers, etc.).

Figure 44:
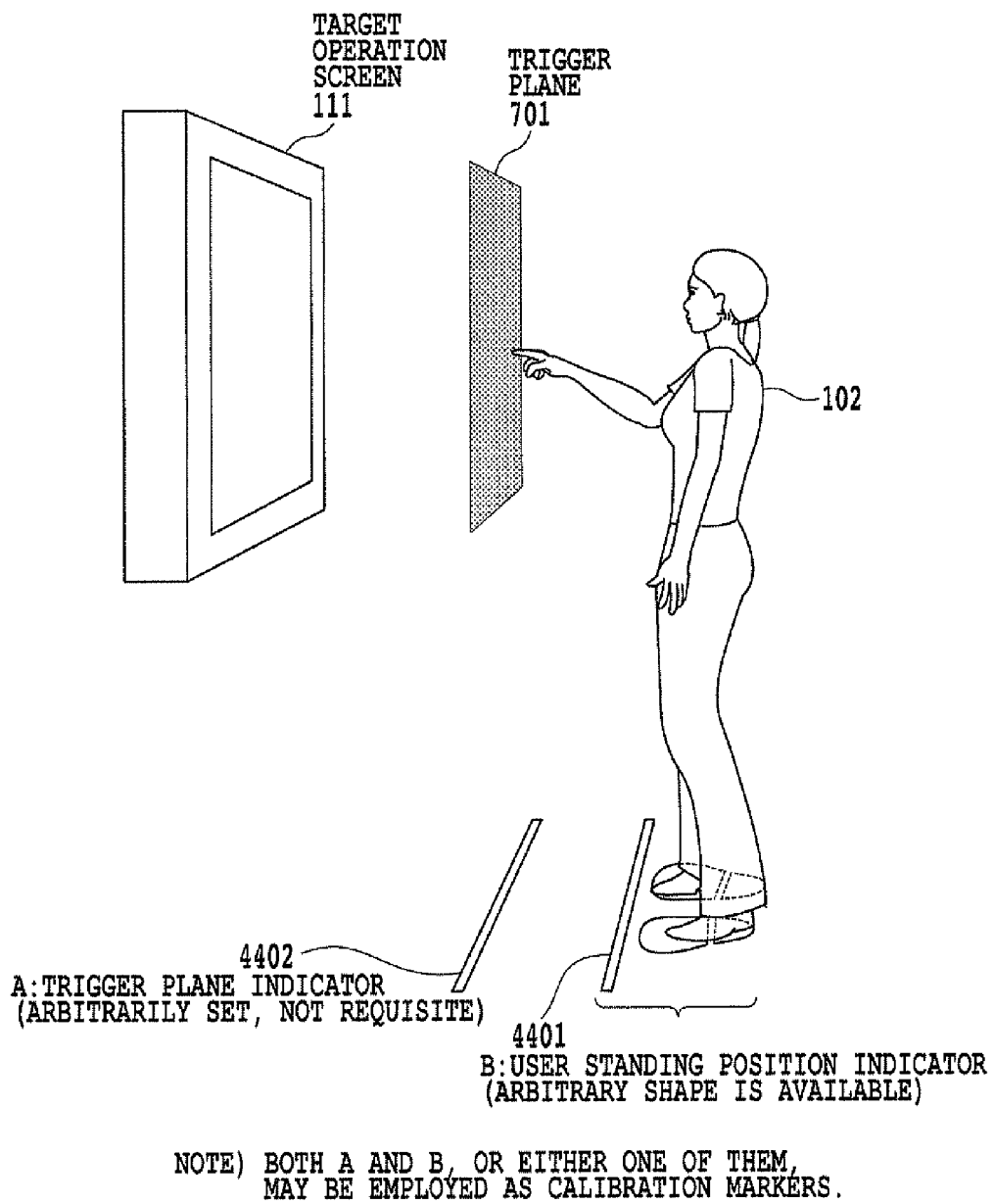
FIG. 44 is a diagram showing a relationship between a virtual operation plane and a marker according to again another embodiment of the present invention, in a case wherein a trespass prevention guard is not present.

In this embodiment, as shown in FIGS. 5 to 8, the virtual operation plane is formed immediately above the marker; however, above the marker does not always mean immediately above. That is, a marker used as an operation plane forming reference is visually noticeable, so the operator can visually identify the marker, and during operation, can estimate the approximate location of the virtual operation plane by employing the marker as a reference. Therefore, while the virtual operation plane needs to be formed above the marker, the longitudinal position relative to the operator may be changed depending on the operator and the condition of the entire system. Generally, in a case shown in FIG. 44, wherein a marker 4401 is located on the floor surface, it is assumed, considering the positions of the eyes of the operator 102, that he or she tends to stand closely to the position immediately above the marker 4401. Therefore, there seems to be a case wherein it is better that the virtual operation plane 701 should be formed at a position 4402 that is slightly shifted away from the marker 4401 to the opposite side of the operator 102, so that the operator can obtain space in which to move the arms, and can perform a natural operation gesture. Meanwhile, in a case in FIG. 21, as in a second embodiment that will be described later, wherein a marker 1902 is adhered to the edge of a desk, the action of the operator is limited by the edge opposite the edge where the marker is adhered. That is, the movement of the body of the operator is restricted, prevented from approaching nearer the operation plane from this edge, and an appropriate depth for the desk can be designated. In this case, it is assumed that the virtual operation plane should be formed immediately above the marker, so that the operator can more easily recognize the virtual operation plane.

In this embodiment, since a measurement marker can be arranged, as an operation plane forming reference, appropriately and simultaneously within a wide range on a captured screen, very reliable measurements are enabled. This effect can be employed together with a calibration system that guarantees that a marker is always within the recording range of a camera, and a savings in space and a multi-functional apparatus can be provided. Also, once calibration is performed by the system that is initially installed, the re-measurement process is not required each time.

As described above, the maker 101 is recorded by the video camera 201 to serve as an operation plane forming reference, and for facilitating this process, various types of materials, well known to the technical field of this invention, can be employed for the marker, but and for this, generally, an appropriate material is selected in accordance with the camera that is to be employed. For example, in the case of a common camera, a distinctive color is required that is distinguishable from the background color, and when an infrared camera is used, a retroreflector, for example, can be employed. Further, in the case of a color or of a material, such as one having a black portion, that less effectively reflects a laser beam, the measurement of reflected light is not easy, and a black bar need be employed, instead of using a marker or a retroreflector. With this arrangement, a portion irradiated by a laser beam is regarded as a defect on the screen, without reflected light, and the position of the bar can be detected.

As described above, for a maker, an appropriate material is adhered to the surface of a floor; however, the method is not limited to this, and a material may be applied directly to the surface of a floor, or an arbitrary adhesion method, known to the technical field of this invention, may be employed. Furthermore, in the above described explanation, the marker 101 has been employed as an operation plane forming reference; however, an operation plane forming reference is not limited to this, and an arbitrary member or structure can be employed as a stereoscopic measurement reference. For example, various figures, other than that shown in FIG. 1, can be employed as markers, and a plurality of markers of a specific size may be provided at several points.

Figure 2:
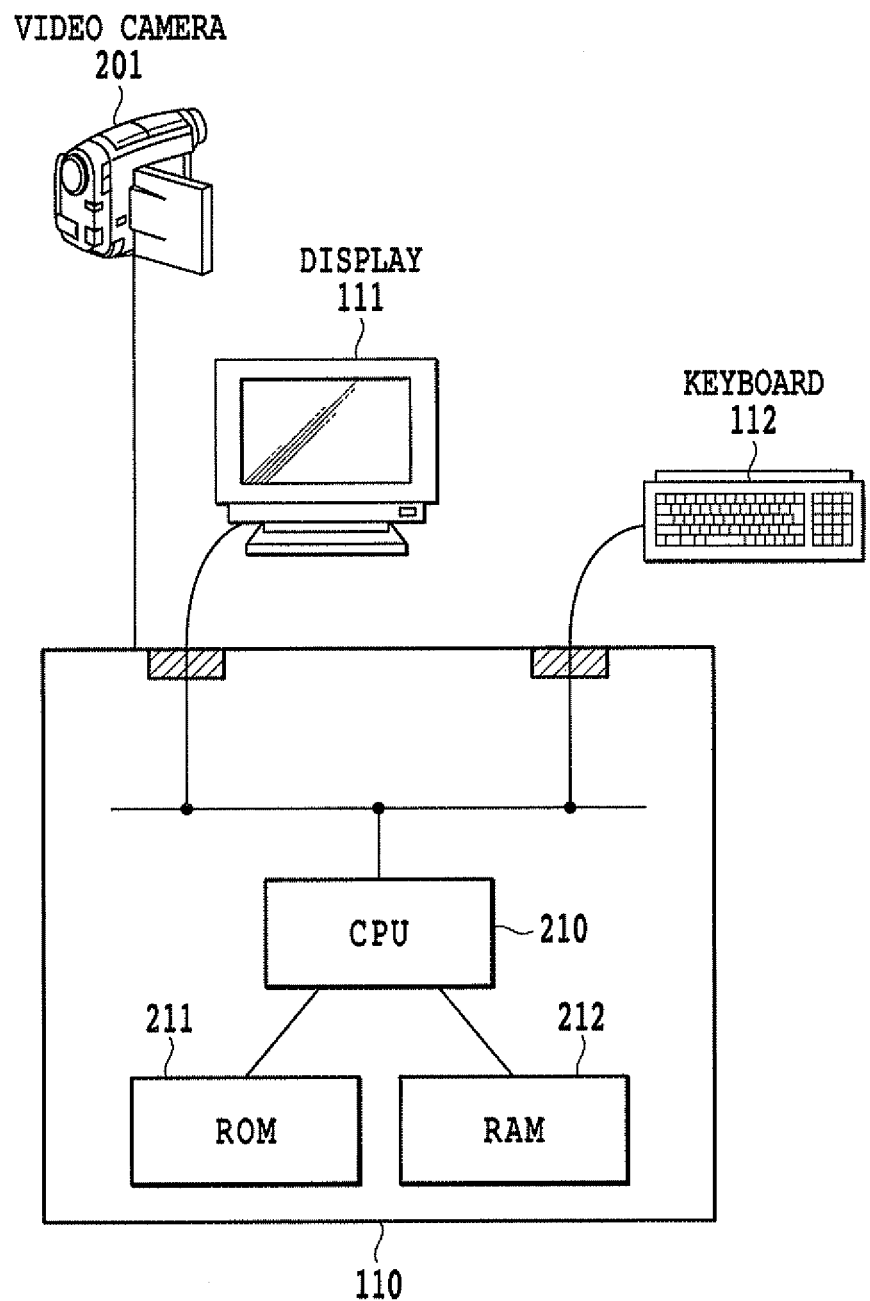
FIG. 2 is a schematic block diagram illustrating a relationship between the operation input system of this embodiment and a computer.

FIG. 2 is a schematic block diagram illustrating the configuration of the computer 110 of the image recognition apparatus according to this embodiment. The video camera 201, which records images of the operator 102 and the marker 101, is located, for example, above the monitor 701, and is connected to the computer 110 that fetches recorded images. For the obtained images, a CPU 210 performs image extraction and position computation, which are features of the embodiment, and employs the obtained position to determine whether part of the body of the operator is extended across the operation plane toward the video camera. The computer 110 generally includes the CPU 210, which executes, on a RAM 212, programs that are stored in a ROM 211, etc., and outputs to the monitor 111, etc., processing results obtained based on images received from the image recognition apparatus. In this embodiment, the monitor 111 is a device that outputs various video images provided by a variety of applications with which the operator is to experience, and also displays information that supports operation input, which will described later.

Figure 3:
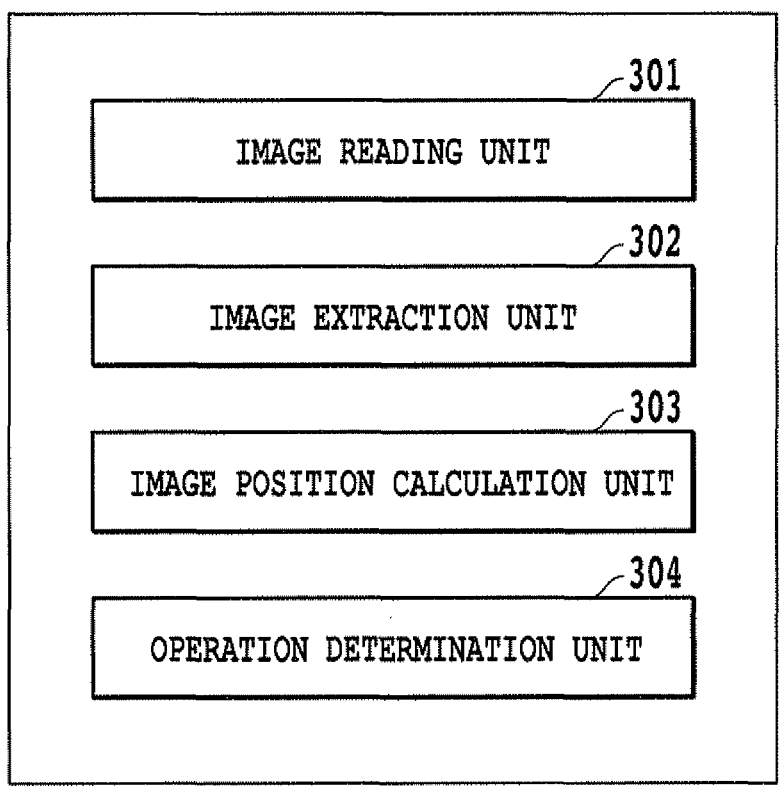
FIG. 3 is a block diagram illustrating an example functional module for a program to be performed by the CPU of a computer for this embodiment.

FIG. 3 is a block diagram illustrating an example functional module for a program processed by the CPU 210 of the computer 110 in this embodiment. As shown in FIG. 3, an image reading unit 301, an image extraction unit 302, an image position calculation unit 303 and an operation determination unit 304 perform the processing for this system. In this embodiment, the four modules are employed to perform the processing beginning from receiving of an image from the video camera 201 until output of data; it should be noted, however, that modules are not limited to these, and the processing may be performed by other modules, or by fewer modules.

(Processing for this Embodiment)

Figure 8:
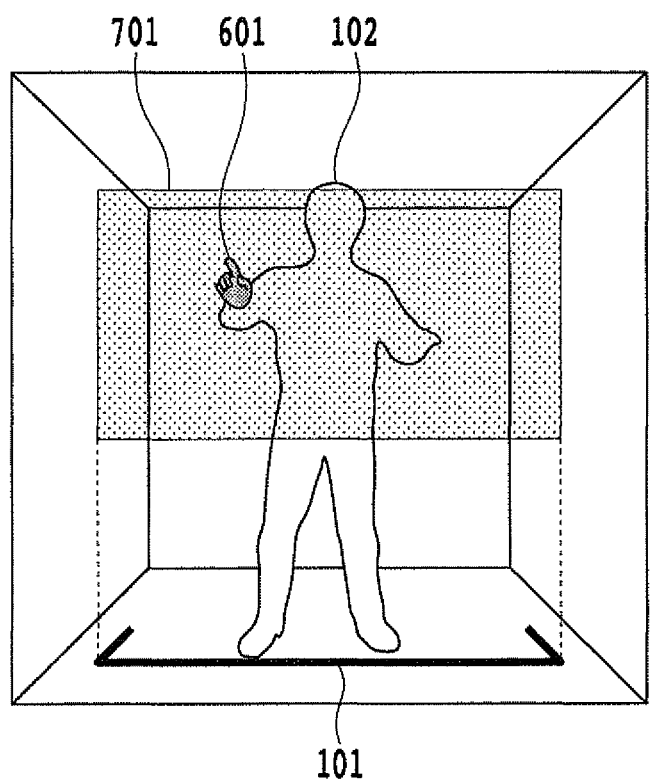
FIG. 8 is a diagram showing the state of a virtual operation plane that is formed based on the operation plane forming reference according to one embodiment of the present invention.

In this embodiment, the processing is performed in which, as shown in FIG. 8, the position of the operator 102 recorded by the video camera 201 is determined based on the marker 101, also recorded by the video camera 201, and further, the positional relationship between the virtual operation plane 701 and the operator 102 is calculated on the assumption that the operation plane 701 is formed above the marker 101. In this embodiment, assuming that the initial setup known to the technical field of this invention is employed as a prerequisite for performing this processing, e.g., assuming a case wherein the image recognition apparatus of this embodiment is installed, information indicating, for example, the distortion of the lens of the video camera 201 that is employed and a distance between the marker 102 and the lens should be entered into the apparatus before performing this processing. Furthermore, the setting of threshold values, etc., is adjusted in advance. When the initial setup of the system has been completed, the processing for this embodiment is performed, and this processing will be described below while referring to FIG. 4.

Figure 4:
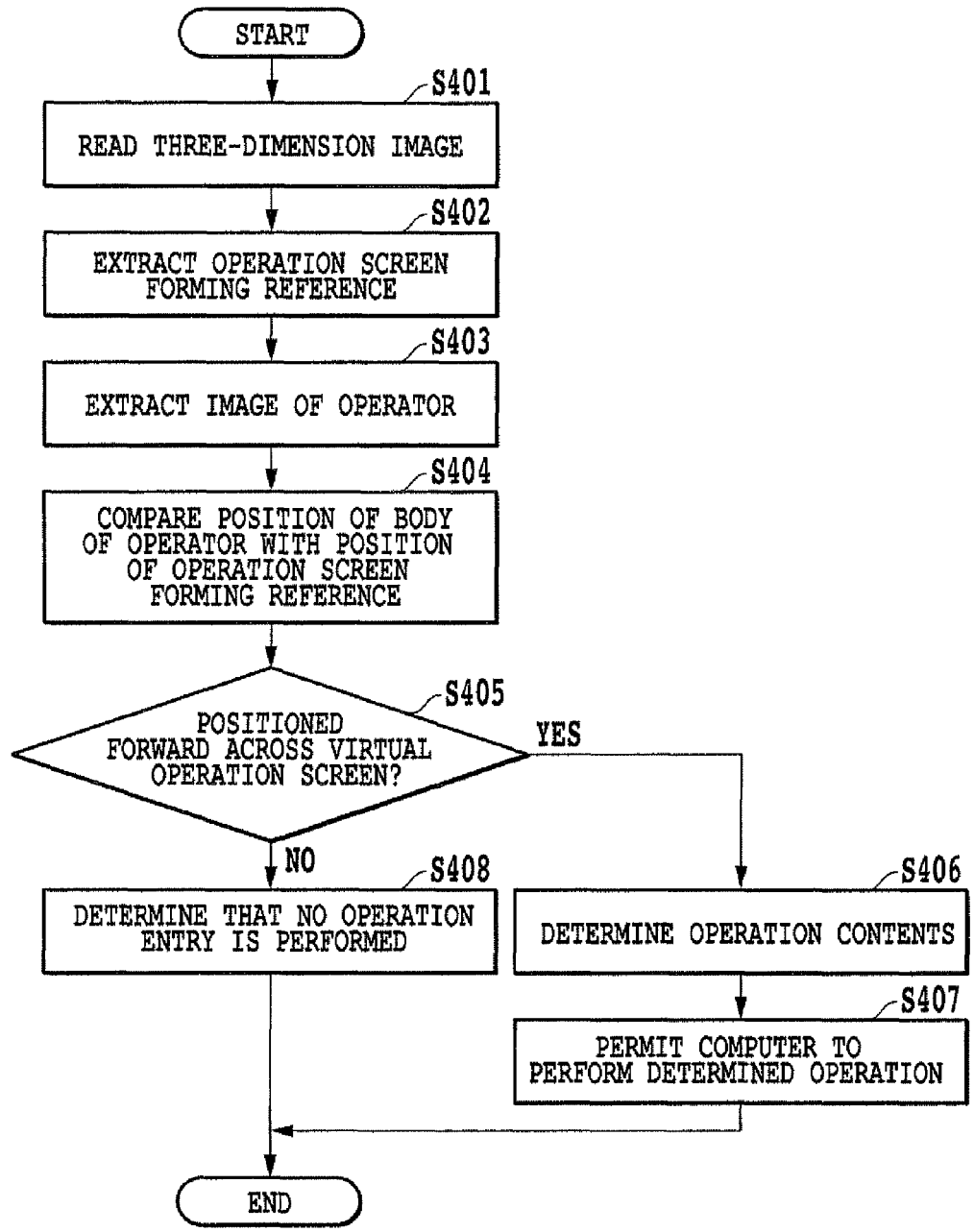
FIG. 4 is a flowchart showing the processing for this embodiment.

FIG. 4 is a flowchart for the processing performed in this embodiment. First, the image reading unit 301 reads data obtained by the video camera 201 (S401), and in the case of a color image, for example, the image extraction unit 302 extracts, from the obtained data, a color area that is defined as a marker in advance, and obtains only an image for the maker 101 (S402). Specifically, in this embodiment, the upper and lower threshold values are designated for a luminescence signal Y and color difference signals U and V, which form a color NTSC signal, and pixels that satisfy all the threshold values are extracted. However, this is not the only method, and any other method known to the technical field of this invention can be employed. When the three-dimensional position of the marker 101 is obtained in this manner, the status of the virtual operation plane is calculated and stored in a database.

Referring to FIG. 8, etc., the operation plane has a rectangular shape perpendicular to the surface of a floor; however, the shape of the operation plane is not limited to this, and operation planes of various shapes and sizes can be formed depending on the shape and the arrangement of the marker 101. Since the marker 101 in FIG. 8 is a straight line having a specific length, and is parallel to the screen of the monitor, the operation plane 701 is formed as a virtual operation plane and, a marker, for example, may be an oblique line at a specific angle. In this case, an operation plane that is formed has the same shape as the operation plane 701 in FIG. 8, but is located obliquely, at a specific angle relative to the monitor 111. Since the operator 102 will also understand that in this case the virtual operation plane is obliquely formed, based on the marker, the operator 102 will need simply to perform the operation while simply being aware of the operation plane. Auxiliary stereo markers may also be arranged as desired, so that an operation plane inclined at a specific angle relative to the surface of the floor, or a curved operation plane may be employed. For this embodiment, an explanation will be given by employing, as a reference, a virtual operation plane that is formed based on a marker, etc., to perform the processing; however, as understood by one having ordinary skill in the art, calculation of the position of the operator, based on the operation plane, is not always required during the actual calculation process. This is because the virtual operation plane is employed by the operator merely for entering an operation instruction, and is otherwise merely aware of its presence.

When color extraction is completed, the auxiliary marker 501 is extracted by performing the same process, and the image position calculation unit 303 binarizes the extracted marker portion, and calculates the number of pixels that form the vertical and transverse sides of the marker that is extracted from the image recorded by the video camera 201. The lengths and the inclinations of the vertical and transverse sides of the obtained image are compared with those of a reference image, and the distortion and the scale of the space that is recorded are calculated. In this embodiment, for calculation of the distortion or the scale, markers may be provided at least at four more points and may be employed as references. For example, when four or more reference points are present, a line segment can be formed by connecting these points to perform calibration.

As a result of the above described preparation, the image of the operator 102 is actually extracted (S403), and the operation determination unit 304 employs the relationship, relative to the maker 101 of the operation input system, of the operator 102, who is standing behind the marker 101, according to the view of the video camera 201 (S404), determines that an operation has begun when one part of the operator 102 has moved forward, according to the view of the video camera 201 (S405), and examines the shapes of the individual portions (the hands being open, two fingers being held up, etc.) or the movement to determine an operation that is assumed in advance in correlation with the shapes or the movement (S406). At this time, the correlation of the shape and the movement with the operation can be determined uniquely for a system, or an arbitrary method known to the technical field of the invention may be employed to determine the correlation. The computer 110 executes the results of determination by assuming that such an operation was entered (S407), and in a case wherein the hands are not extended across the virtual operation plane, it is determined that originally an operation instruction is not entered, and the processing is terminated (S408). The method for determination of the operation contents is not limited to the above described method, and an arbitrary method known to this embodiment can be employed. A specific determination method has not been described here; generally, the shape or the movement of the body of the operator, such as a pre-designated gesture, and the contents of correlated operations are stored in a database, etc., and after an image is extracted, the operation contents are determined by accessing the database. Of course, at this time, to improve the accuracy for determination, the image recognition technique or the artificial intelligence may be employed using a method known to the technical field of this invention.

In this process, the image of the operator is compared with the image of the operation plane forming reference, and image distortion or the scale that is distortion correlated information obtained in advance is employed to determine the positions of the individual parts of the operator and the posture. Although not described in detail, the image of the operator is also extracted using an arbitrary method known to the technical field of this invention. An example idea is that a characteristic background is provided for the operator in order to easily extract so that the image of the operator.

Furthermore, in this embodiment, the virtual operation plane is formed for recognizing the action taken by the operator, and this is effective for a case, for example, of a small system wherein comparatively frequently the position of the operation plane forming reference is changed relative to the position of the camera. However, for a case, such as a museum exhibition, wherein once the reference and camera are set, the positional relationship is not frequently changed, the virtual operation plane may be extracted in advance and be changed into numerical values using an arbitrary method, and the obtained values may be stored. Therefore, when the operator performs operation input, determination of the operation instruction can be performed directly, without extracting the virtual operation plane. When this process is employed, the process for forming the virtual operation plane can be eliminated and efficient processing will be available, on the whole.

(Operation Input Support)

As described above, when a three-dimensional camera and an operation plane forming reference, such as the marker 101, need simply be prepared, the operator can visualize an operation plane like a touch panel in the space, and when the operator performs various manipulations on this operation plane, an operation entry using all, or a part, of the body is enabled. Furthermore, when the operation input action is supported, e.g., the image of the operator relative to the virtual operation plane is displayed on the monitor 111, the system of this embodiment can be more easily employed.

Figure 9:
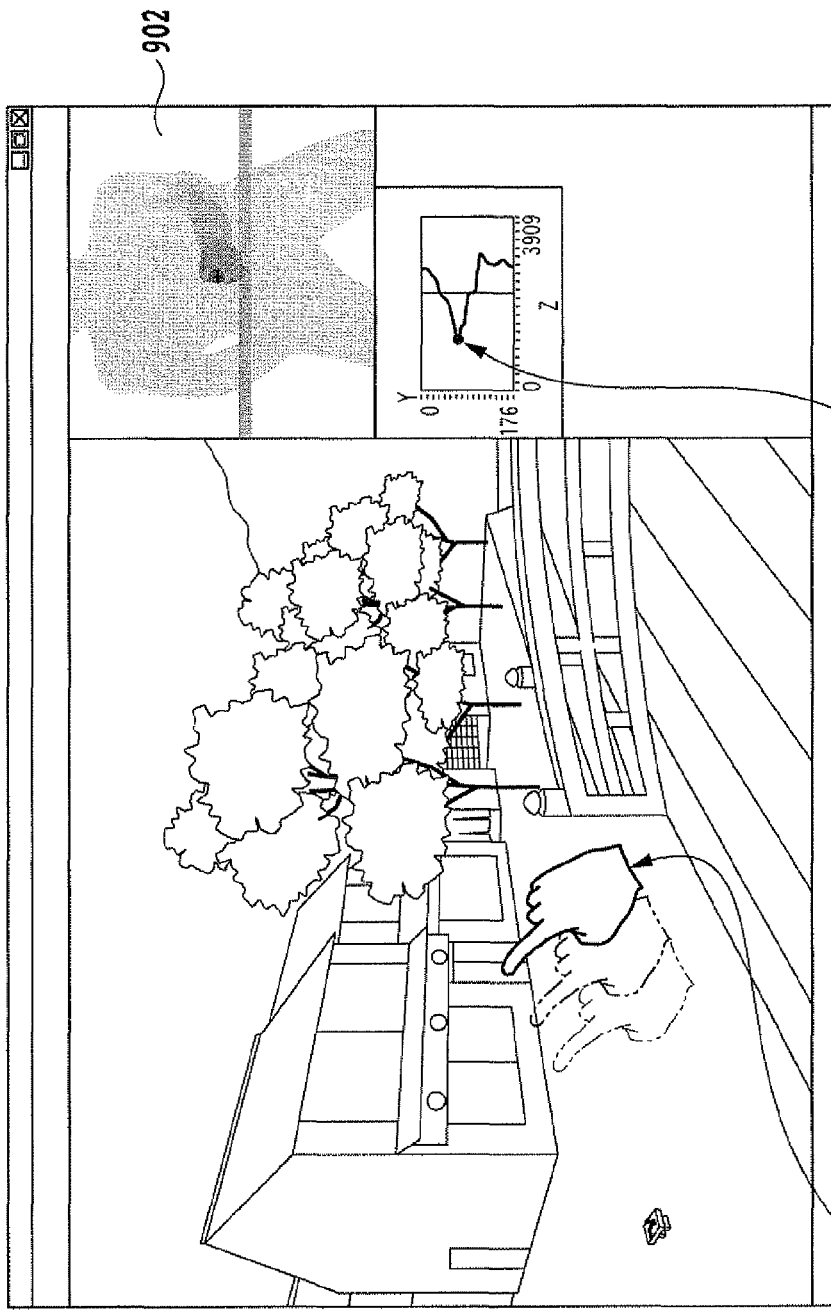
FIG. 9 is a diagram showing a specific display example for supporting operation input according to the embodiment of the present invention.

FIG. 9 is a diagram showing an example for displaying, on the monitor 111, guidance that supports operation input. For example, in a case wherein a pointer is used to point at an arbitrary portion of an image displayed in the center of the monitor 111, the operator superimposes on the display the virtual operation plane with the image, and projects hand and finger to point at a desired point. When this pointing state is represented using a pointer 901, shown in FIG. 9, the operator can recognize and confirm the operation currently being performed, and begin the next operation. In this example, the pointer 901 is displayed on the screen when the hand and finger are projected across the operation plane, and disappears when they are retracted, or is displayed using shading. Therefore, by moving the hand and referring to the status of the pointer displayed on the monitor 111, the operator can perform the input method of this embodiment in a natural manner. Further, a small operation plane 902, on which the states of the operator in FIGS. 6 to 8 appear, is displayed in the upper right corner of the monitor 111 to present operator actions being currently performed and to indicate an operation that the system determines the action of the operator to be. Furthermore, a sequential line graph 903, representing the movements of the hands, is also displayed to the operator to identify, for example, how the hands moved forward and backward, so that a more accurate operation can be expected. Also, for operation input support, although not shown, gestures available to the system may be displayed on the guidance screen to request that the operator follow these gestures for operation input.

When the above described embodiment is employed, the operator can operate the system by the action, without memorizing or designating gestures in advance, and since the posture of the operator and the movements of individual body portions, such as the hands, can be recognized, so-called mixed reality (MR) can be provided for a game played by moving the entire body.

Second Embodiment

A system configuration for this embodiment is basically the same as that for the first embodiment described above, and is provided based on a more specific usage situation. That is, for this embodiment, while taking the system and the processing in the first embodiment into account, markers 1902 and 1903 are provided for a predetermined solid object, such as a desk-like solid item 1901 shown in FIG. 21, and are employed as operation plane forming references to form a virtual operation plane 701, and when a finger 601, etc., is used to manipulate the virtual operation plane, operation input is enabled. An explanation for this embodiment will be given by employing a table in a living room as an example solid object, and by assuming a case wherein an operator is seated on a sofa at home, etc., while manipulating the system. However, the item in use is not limited to this, and various other items for individual use, such as a platform for a speaker, a stand and a guard like a bar 1702 shown in FIG. 17, can be employed. Here, it is assumed that a monitor 111 is a large screen television set arranged, for example, in a living room at home.

Figure 21:
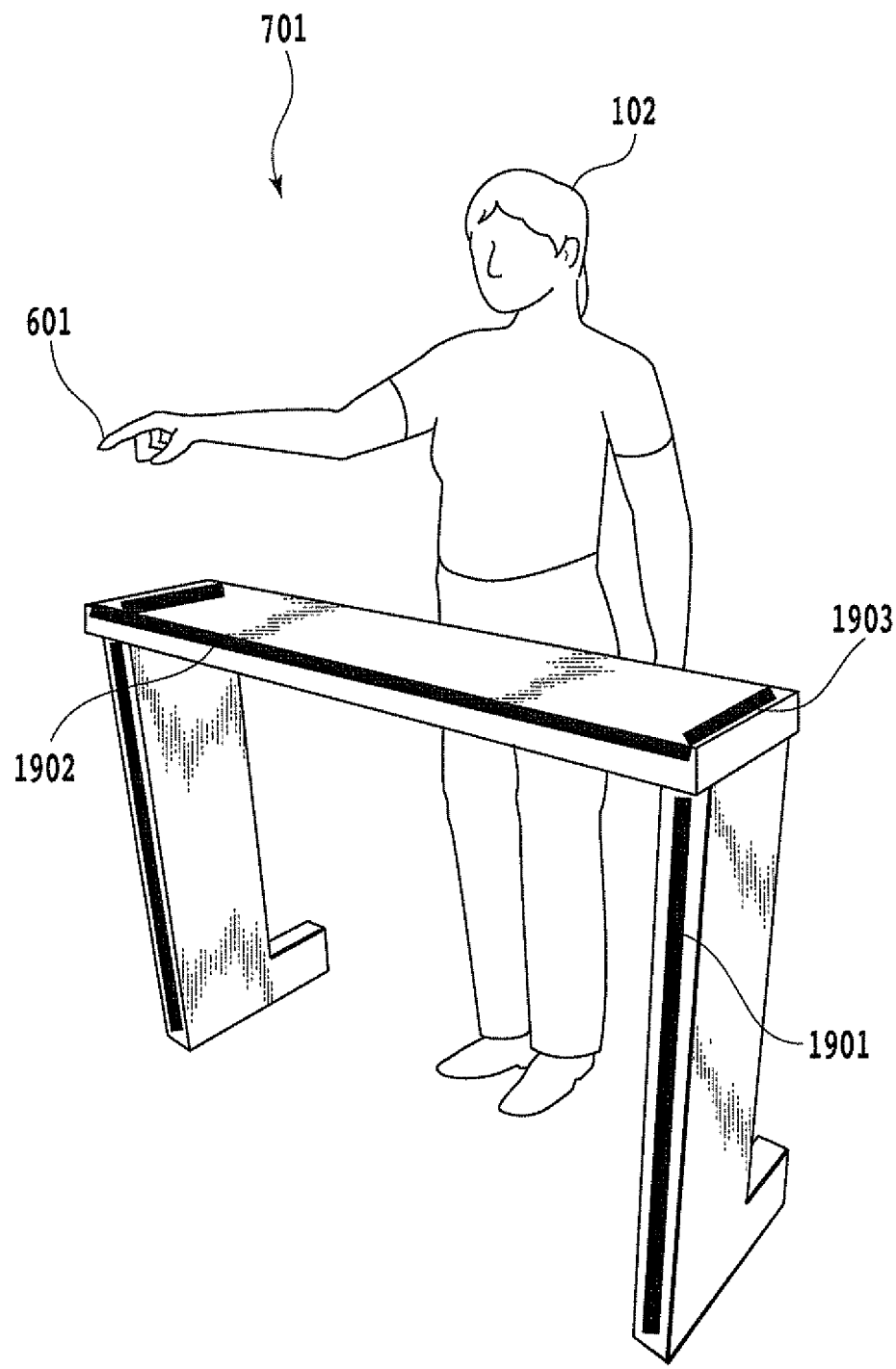
FIG. 21 is a diagram illustrating a specific operation example using an operation input method according to the further embodiment of the present invention.
Figure 23:
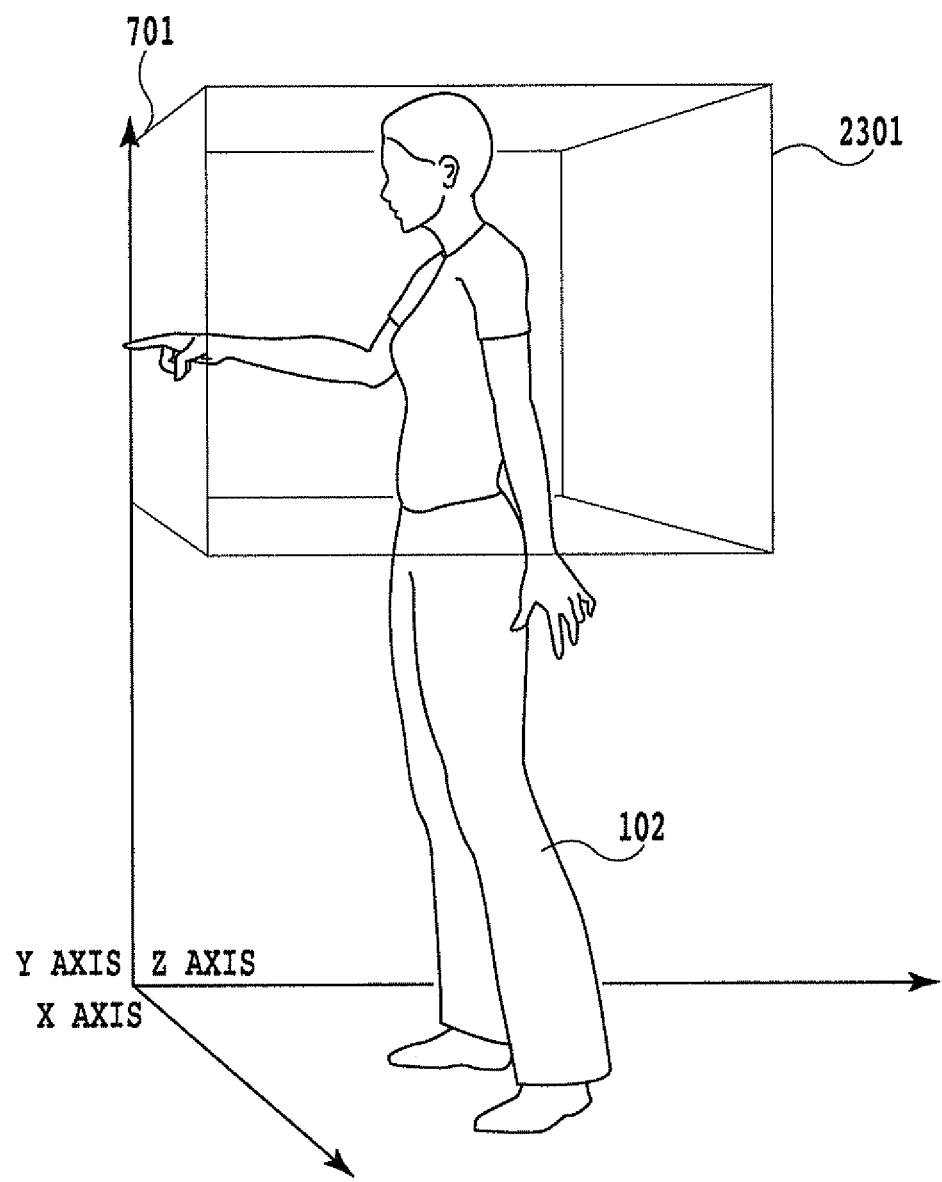
FIG. 23 is a diagram illustrating the status of a virtual operation plane and an operation area according to the embodiment of the present invention.

In a case wherein a marker-applied table as shown in FIG. 21 is employed, only the upper portion of an operator 102, for example, may be regarded as an area 2301 to be detected using the marker 1903, as shown in FIG. 23 and which will be described later, and it can be determined that only the movement of the portion extended forward across the virtual operation plane 701 indicates operation input. With this arrangement, in a case wherein the operator performs the operation input while supporting the body using the table shown in FIG. 21, the movement of only the upper portion can be recognized as indicating operation input, regardless of whether the lower portion, especially the legs, are extended forward across the virtual operation plane.

Figure 38:
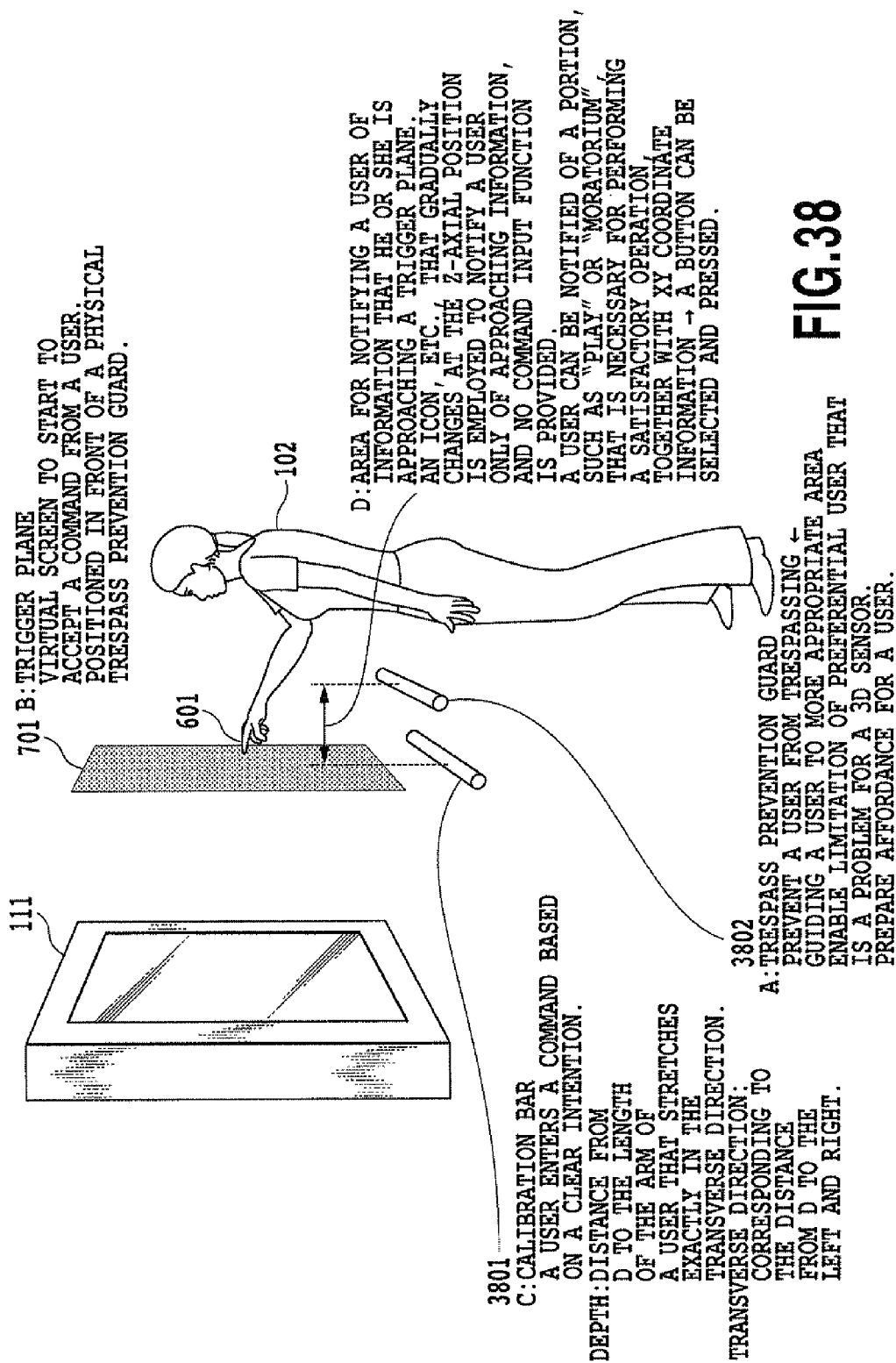
FIG. 38 is a diagram showing a relationship between a virtual operation plane and a trespass prevention guard according to still another embodiment of the present invention.

The relationship between the marker and the virtual operation plane in this embodiment will be described while referring to FIGS. 38 and 39. Basically in this embodiment, markers are provided along the edges of a desk, a table, etc., and an operator contacts a virtual operation plane formed above the markers, or changes the positions of the hands relative to the virtual operation plane, and permits a system to recognize the action indicates operation input. At this time, the edges of the desk or the table, where a marker is not provided, limit the movement of the operator, and support the operator such that a hand properly held over desk or table automatically touches the virtual operation plane. This idea will be explained while referring to FIG. 38. The virtual operation plane 701 is formed above a marker 3801 that is an operation plane forming means, and arbitrary movement limitation means 3802 maintains the operator 102 at a predetermined distance from the virtual operation plane, so that the operator can manipulate the virtual operation plane using a hand 601 that the operator automatically sticks out, forward. In this embodiment, the virtual operation plane 701 is formed immediately above the marker 3801; however, as in the first embodiment, the virtual operation plane 701 may be moved to the front, or to the rear, using the marker 3801 as a reference. For example, since the movement limitation means 3802 is basically fixed, there is a probability that, depending on the shape of the body of an operator, the position of the virtual operation plane formed immediately above the marker 3801 is too far forward or too far rearward, and the usability is deteriorated. In this case, for an individual operator, the position for forming the virtual operation plane can be moved forward or rearward from the marker 3801.

Figure 39:
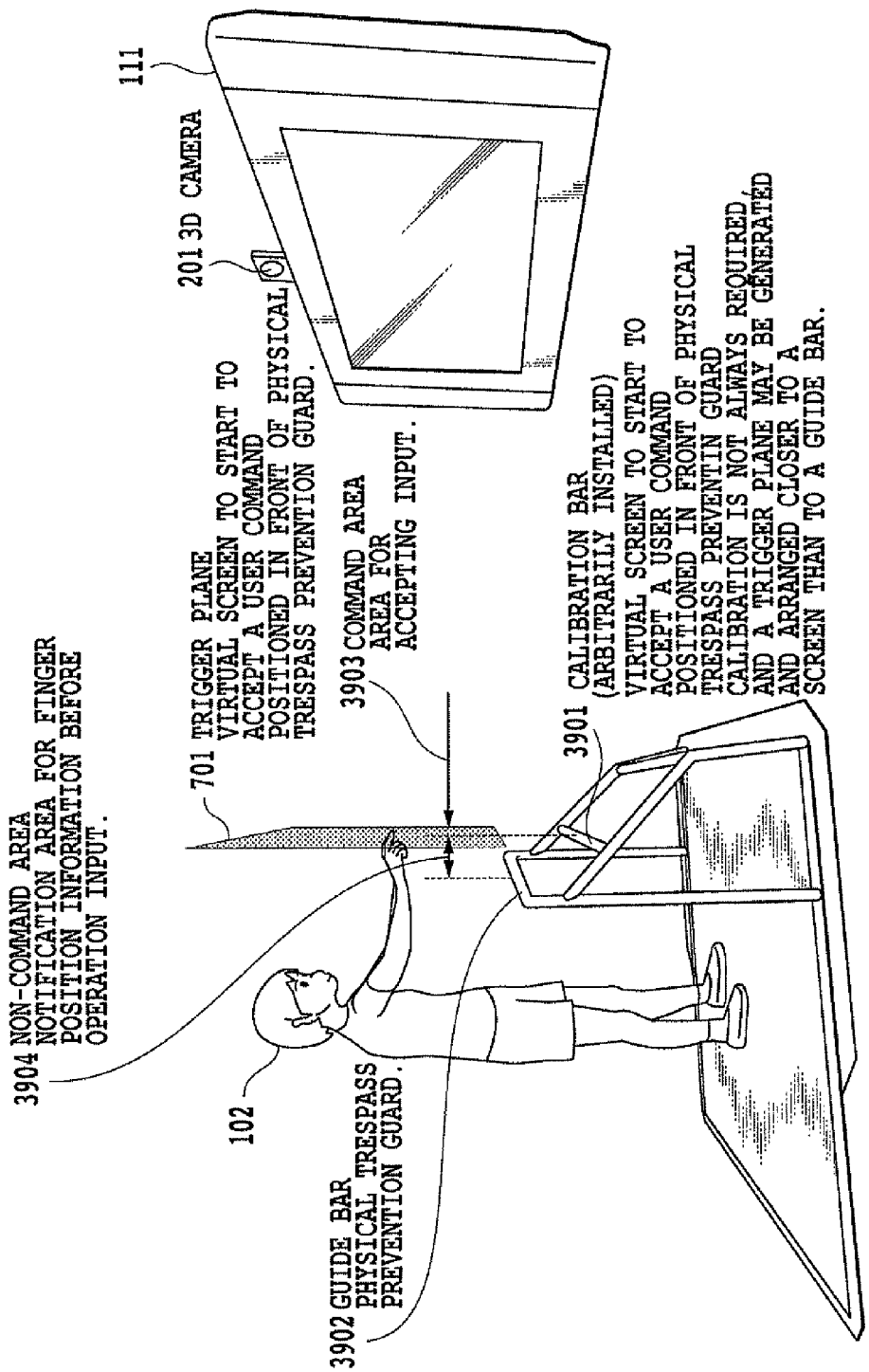
FIG. 39 is a diagram illustrating an example pattern projection method for the operation instruction area of a specific operation apparatus according to still an additional embodiment of the present invention.

FIG. 39 is a diagram illustrating an example for a case wherein a guide bar is employed as such movement limitation means. A guide bar 3902 generally can be used as a handrail, or a support for leaning against, in order to prevent an off balance movement on this operation plate. For performing the input operation of this embodiment, the guide bar 3902 serves as movement restriction means that helps to provide easy control when using the virtual operation plane.

Referring to FIG. 10, in this embodiment, the operator 102 is seated and manipulates a large screen television, and a marker 1002 and auxiliary markers 1003 and 1004 on a table 1001 are employed as operation plane forming references. The operator approximately assumes, by referring to these markers, that the operation plane 701 is located above the marker 1002, and manipulates various access controls for the operation plane to enter a desired operation. As described above, the operation plane 701 is superimposed on the screen of the large screen television where an array of channels is displayed, and a portion corresponding to a desired channel on the operation plane need only be pointed at, using the finger 601, for that channel to be selected.

Here, since the auxiliary markers 1003 that define the inclination of the operation plane are provided on the table legs, while referring to FIG. 10, the auxiliary markers 1003 are almost perpendicular to the upper face of the table 1001, and accordingly, the virtual operation plane is formed perpendicular to the upper face of the table 1001. Therefore, in a case wherein the auxiliary markers 1003 are provided at an angle other than a right angle, the operation plane, when formed will be inclined, instead of perpendicular, as in this embodiment. Furthermore, the auxiliary markers 1004 are employed for determining the front and rear positions and for performing perspective computation. According to this embodiment, when a remote controller is missing while relaxing and watching TV at home, searching for the remote controller is not required to enable remote control for the TV.

Third Embodiment

Figure 11:
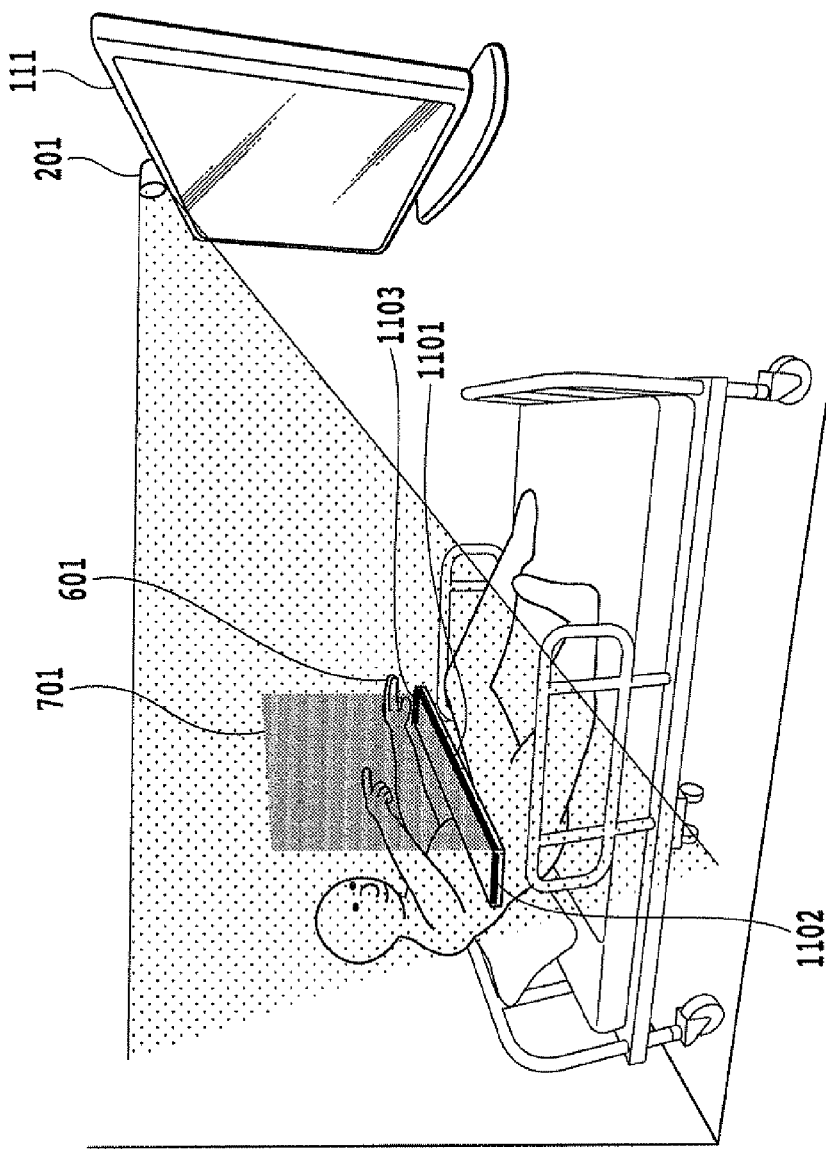
FIG. 11 is a diagram showing the state of a virtual operation plane that is formed based on an operation plane forming reference according to an additional embodiment of the present invention.

A system configuration for this embodiment is basically the same as that for the first embodiment described above, and differs from that for the second embodiment based on a specific usage situation. That is, for this embodiment, unlike the second embodiment, assume a case wherein, for example, manipulation is performed while lying in a bed in a hospital, as shown in FIG. 11. Here, it is assumed that a monitor 111 is, for example, a television located in a ward.

Figure 12:
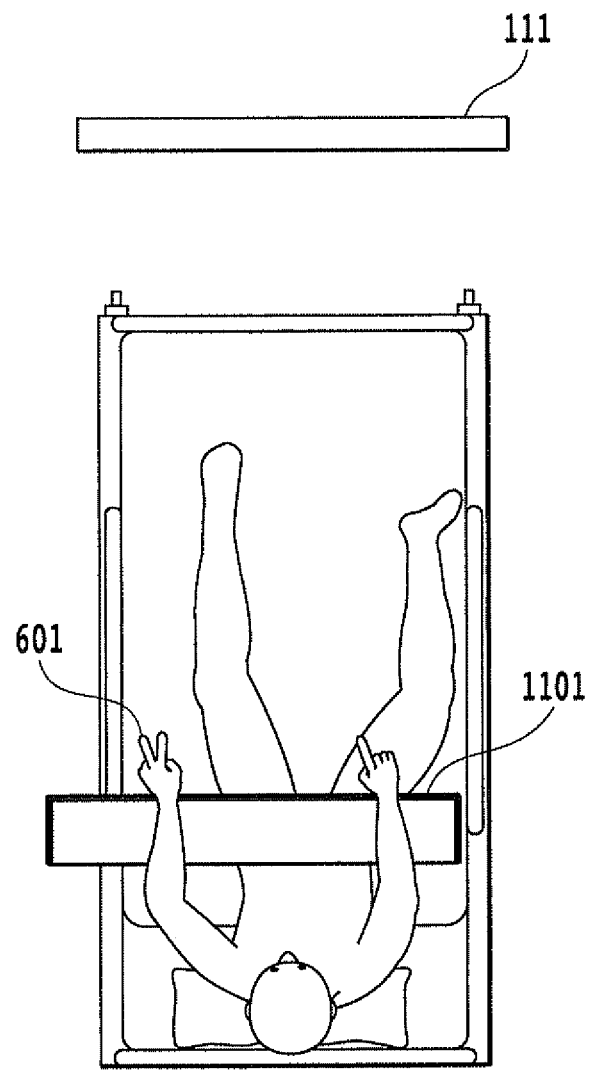
FIG. 12 is a diagram showing a specific display example for supporting operation input according to the additional embodiment of the present invention.
Figure 14:
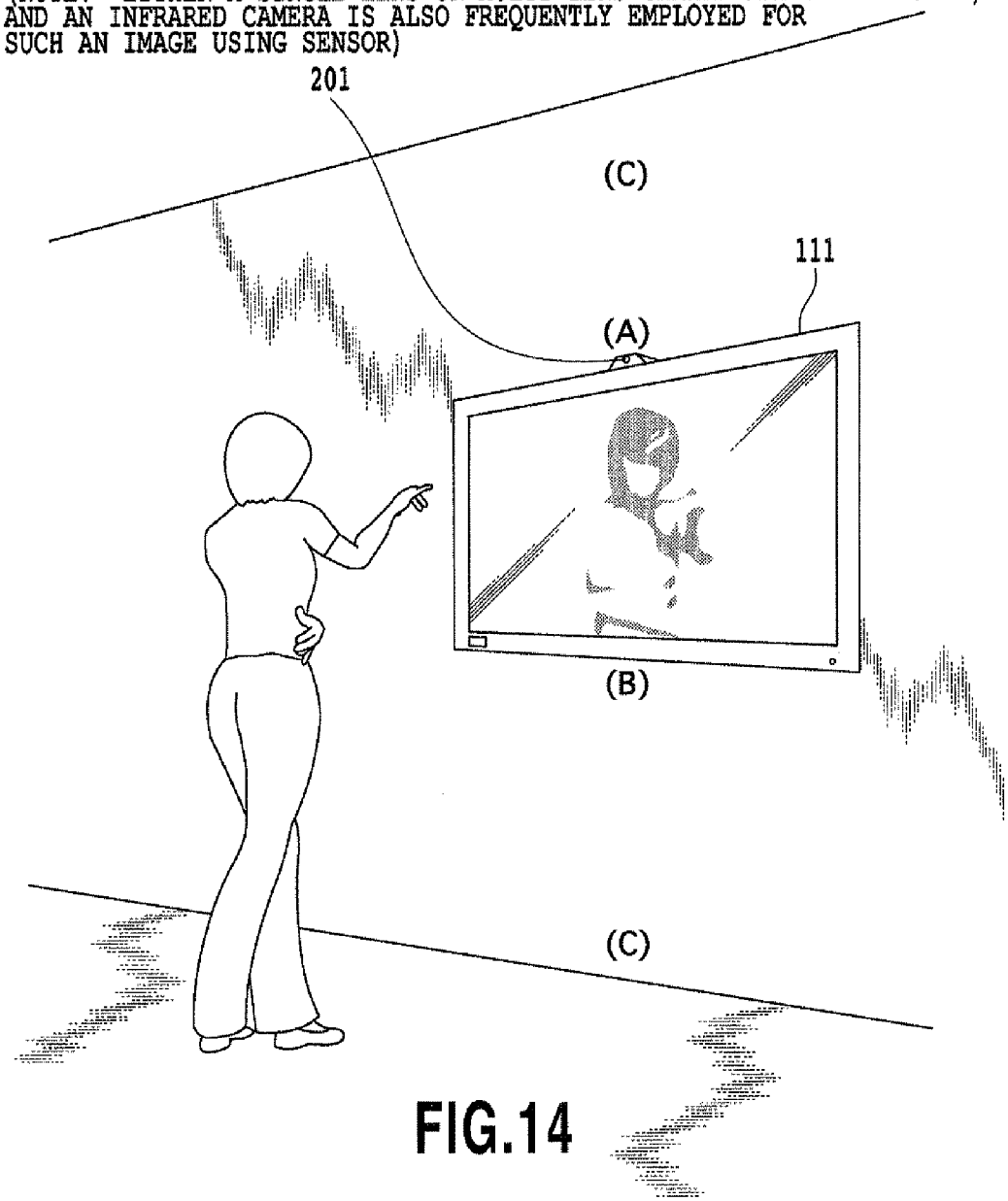
FIG. 14 is a diagram for explaining a conventional input system using a gesture with a large screen.
Figure 15:
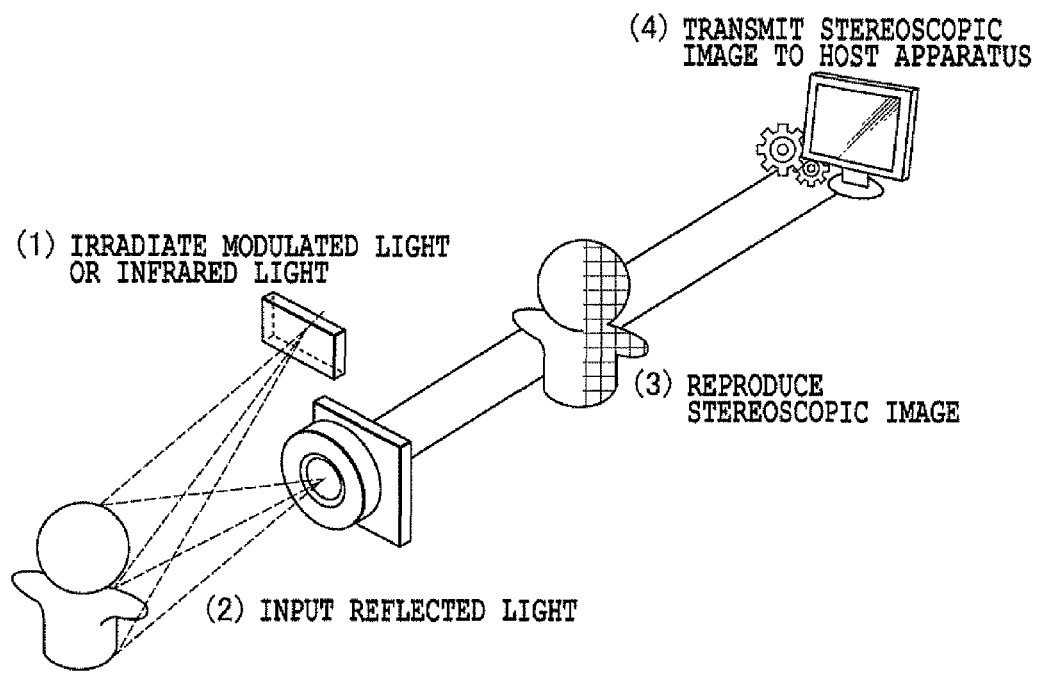
FIG. 15 is a diagram showing a conventional method for employing a 3D camera to capture an image of an operator.
Figure 16:
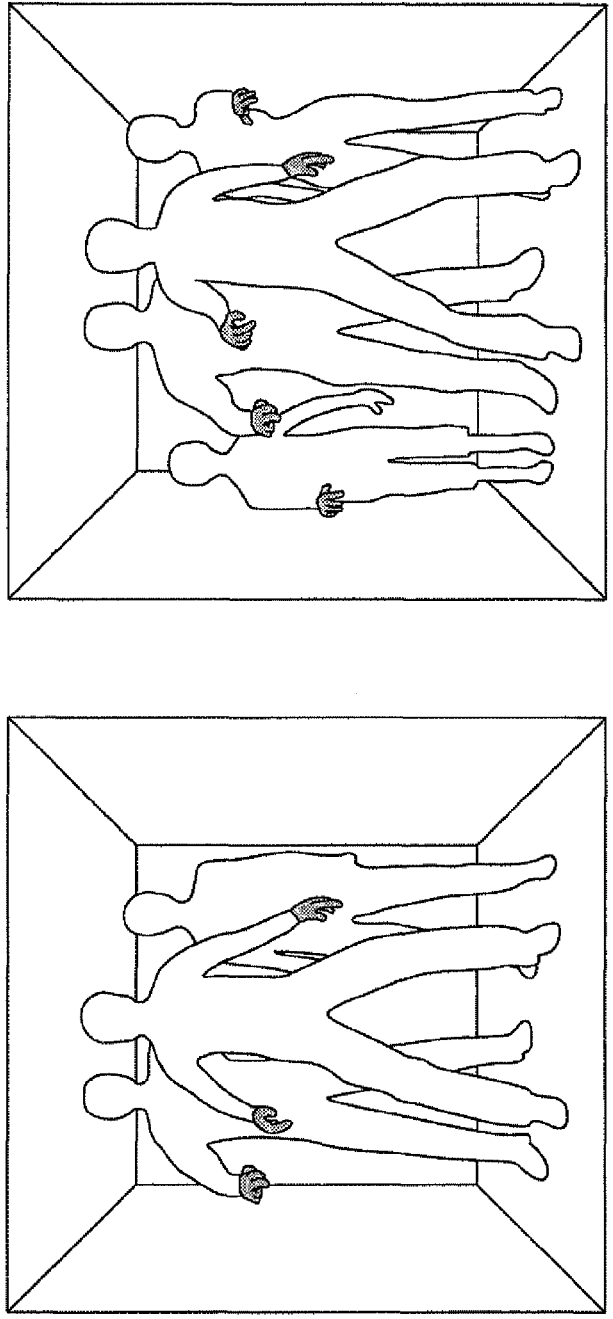
FIG. 16 is a diagram showing an image example for a conventional case wherein an image for a plurality of operators is captured while employing a 3D camera.

In this embodiment, a marker 1101 and auxiliary markers 1103 designated on a bed table 1102 are employed as operation plane forming references, and based on these markers, an operator 102 who manipulates a television by slightly raising his or her body from a bed, assumes that an operation plane 701 is formed above the marker 1101, and performs various acts to access the operation plane in order to perform a desired operation. Specifically, as shown in FIG. 12, the operator 102 sticks a finger of the marker 1101 out toward the television 111 so that the system can detect that an operation is in progress; in this embodiment, the contents of the operation is indicated by the shape of a finger 601. That is, as shown in FIG. 13, when "1" is presented to the television using a right hand finger 1301, and "2" is presented using a left hand finger 1302, the operation input system of this embodiment determines that this is an instruction to change channels to "21". In this manner, a desired channel can be obtained by pointing at the operation plane 701 using the finger 601, and the virtual operation area can be easily noticed by the guard. The intent of a user that an input operation is or is not to be performed can be confirmed by either sticking the finger across the determination line (long side) or not, and when a specific gesture is shifted to another gesture, the intermediate movement can be conducted inside a determination line, and a gesture that signals a decision simply need be presented across the determination line toward the camera. As a result, ambiguity and input errors, which are conventional problems, can be avoided.

Fourth Embodiment

In this embodiment, an auxiliary manual input method is also employed for the apparatus of the first embodiment, so that an apparatus that can easily and immediately recognize an action signal is provided. That is, a floor mat sensor is connected to the image recognition apparatus of the above described first embodiment, and is used to enter an instruction for an operating mode, and an image recognition apparatus employing a three-dimensional imaging device more appropriately identifies the action of an operator, such as a gesture. Specifically, when an operator has stepped on L or R on a floor mat 1701 shown, for example, in FIG. 17, the operating mode is started, and a recognition process is performed by assuming that this movement of the operator is a gesture. Any other movement of the operator is regarded as ineligible, and the process is not performed. At this time, a virtual operation plane is formed by employing bars 1702 and 1703 as references.

Figure 18:
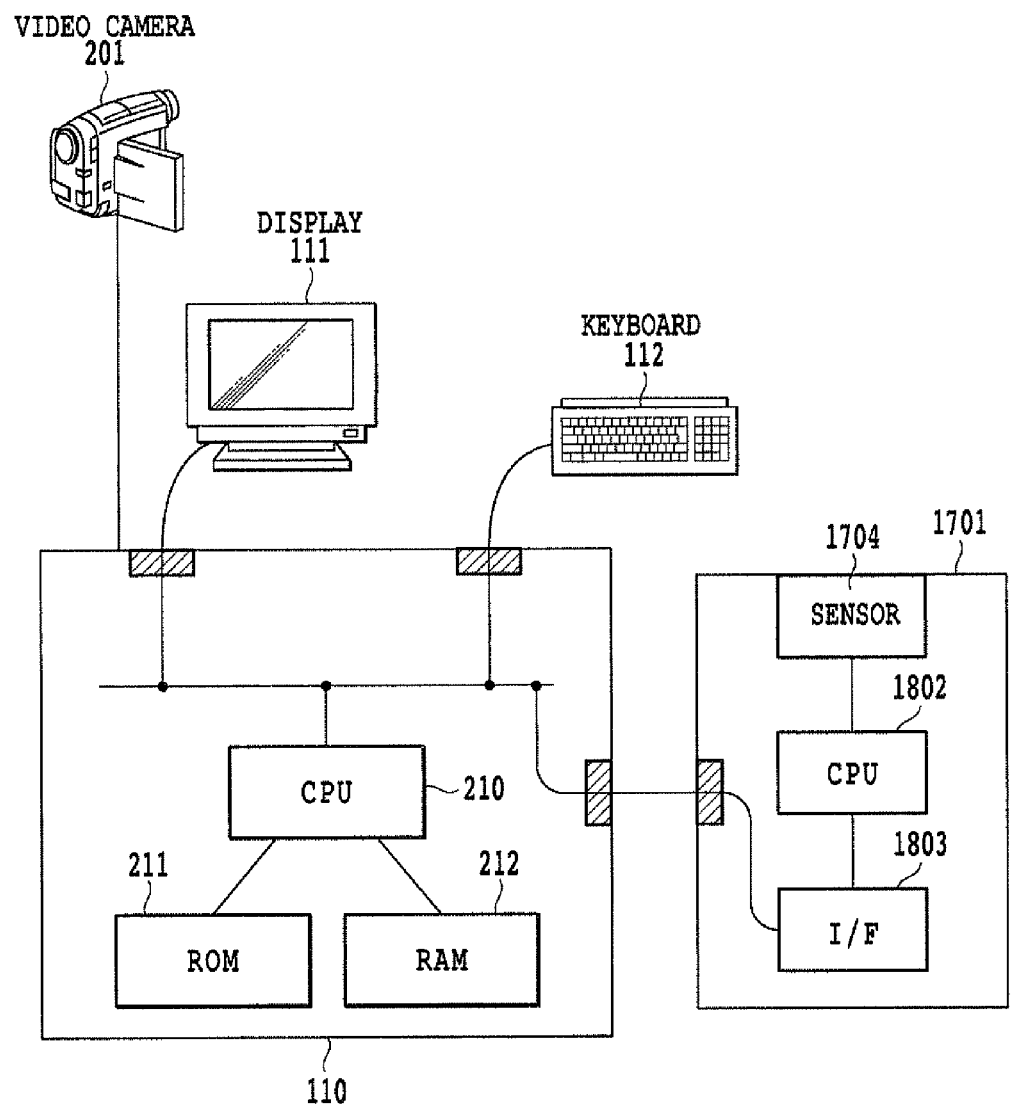
FIG. 18 is a schematic block diagram illustrating a relationship between an operation input system and a computer according to the further embodiment of the present invention.

FIG. 18 is a schematic block diagram illustrating the arrangement of a computer 110 for the image recognition apparatus of this embodiment. A video camera for recording an operator and markers, etc., that are applied to the bars 1702 and 1703 is attached, for example, to the upper portion of a monitor, and is connected to the computer 110, and the recorded images are transmitted to the computer 110. For the images obtained by recording, a CPU 210 performs image extraction and position calculation, which are the features of this embodiment, and employs the obtained position to determine whether one part of the body of the operator is extended across the operation plane toward the video camera. The computer 110 usually includes the CPU 210 that executes, on a RAM 212, a program stored in a ROM 211, etc., and outputs, to the monitor, etc., the processing results obtained based on the image loaded into the image recognition apparatus. The monitor in this embodiment outputs various video pictures provided by various applications with which the operator will experience; however, as will be described later, information used to support operation input is also displayed. Referring to FIG. 18, a floor mat sensor 1701 is provided for the surface of the operation input apparatus of this embodiment, and when pressure is applied, for example, to an area identified by either "L" or "R" by stepping on the area, a signal corresponding to the area is output. Since it is possible that such foot manipulation might off balance some operators, the bar 1702 is useful, and operators can hold on to the bar 1702 and stabilize their posture.

An arbitrary technique known to the technical field of this invention can be employed for the floor mat sensor of this embodiment. For example, a pressure sensor, a sensor employing statistic electricity or any other technology may be employed, just so long as a signal indicating the location where pressure is applied by a foot can be output. A signal that is output is processed by a CPU 1802 through data input processing, i.e., the signal is converted into "R" or "L" data, and the thus obtained data is transmitted to the computer 110 via an interface 1803. The computer 110 performs a process for identifying data received from the floor mat sensor with an action performed on the above described virtual operation plane, and determining an operation that the operator is to perform. That is, assuming, for example, that the act of stepping on "R" indicates that a specific operation is to be performed, the operator simply needs to step on "R" when the specific operation is desired, and for a case wherein the operator permits the computer 110 to recognize the movement as an instruction for a specific operation, just by stepping on "R" and the operator performs a predetermined gesture, so that the computer 110 can appropriately read the gesture by the operator, and identify the specific operation to be processed for the system.

Figure 17:
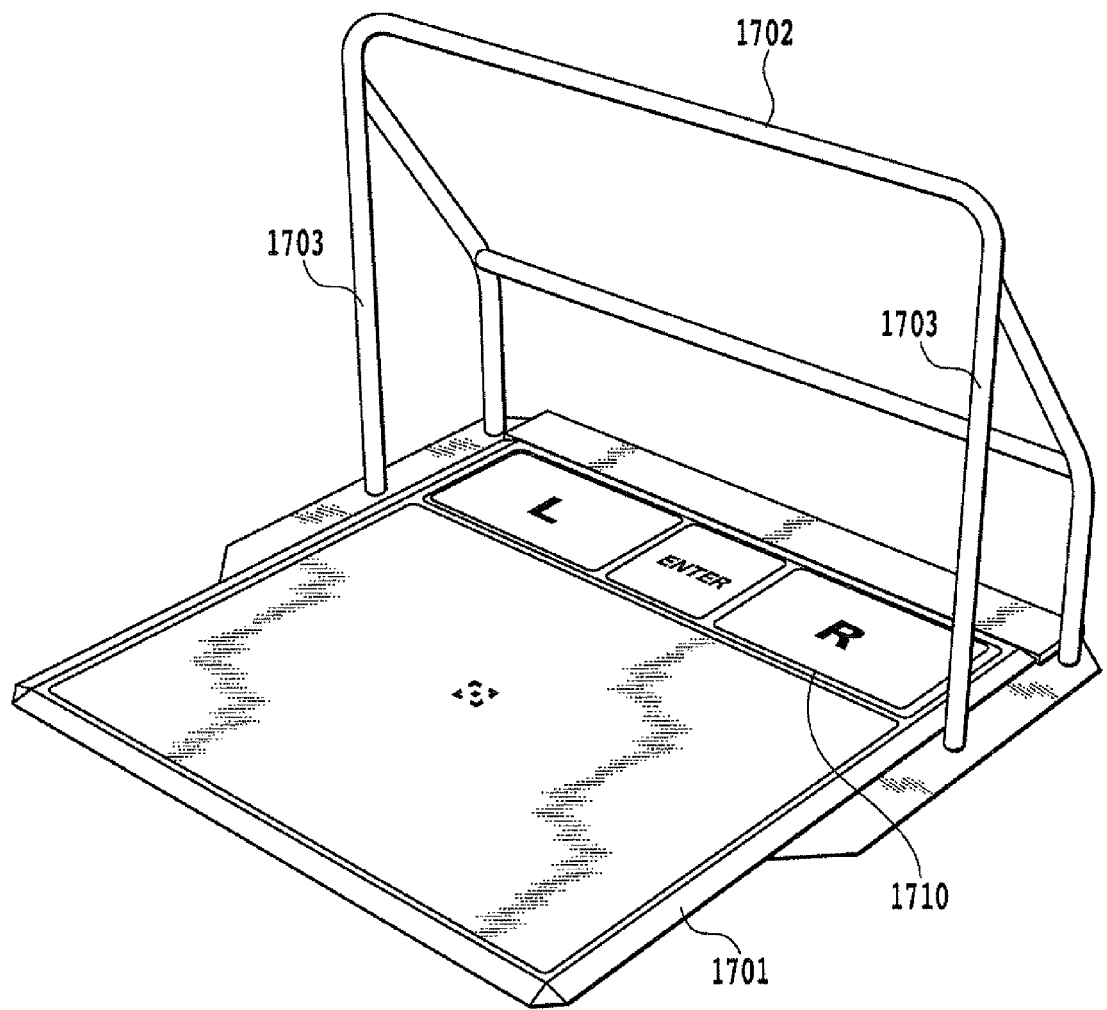
FIG. 17 is a diagram illustrating a specific operation apparatus example according to a further embodiment of the present invention.
Figure 19:
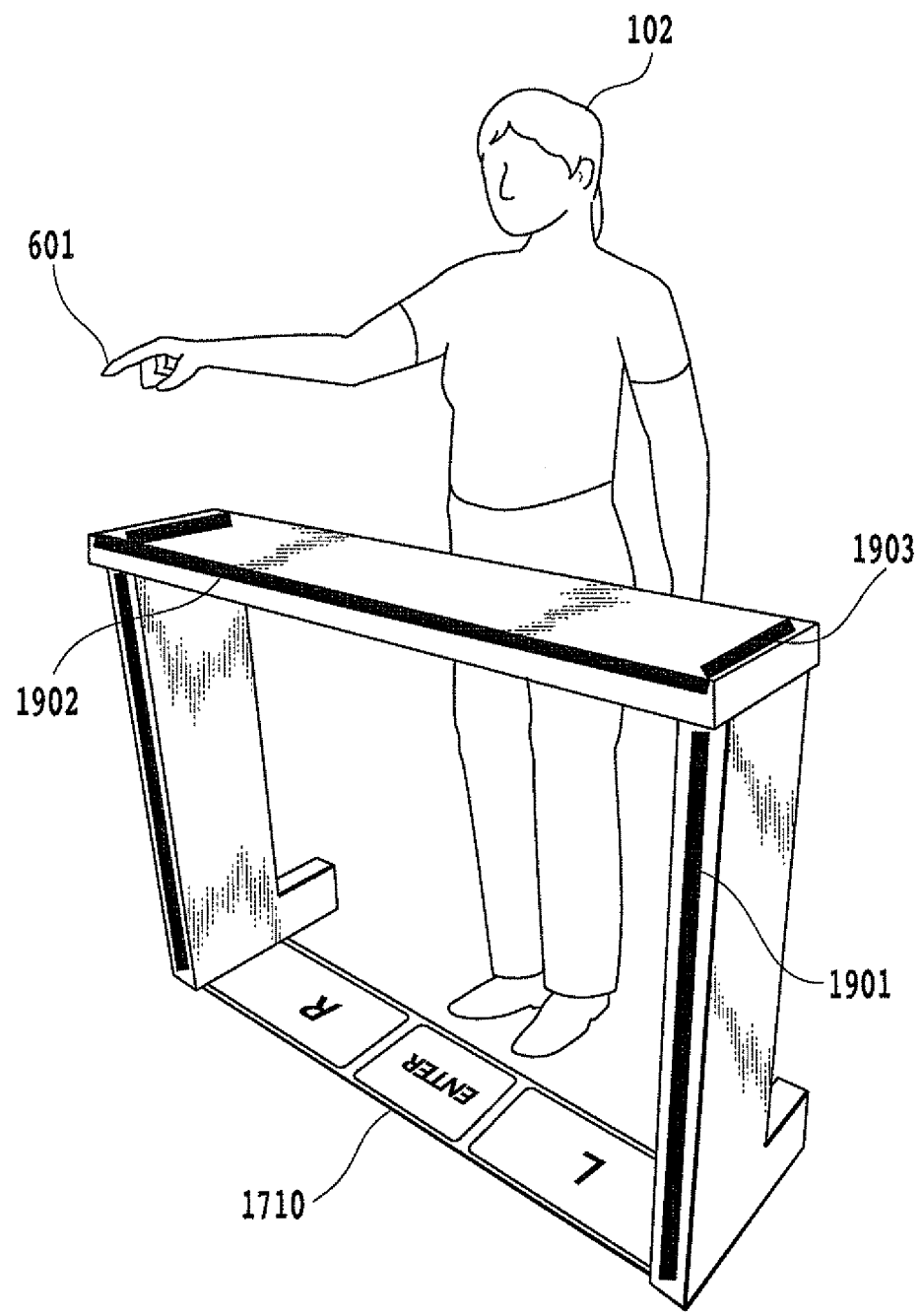
FIG. 19 is a diagram illustrating another specific example operation apparatus according to the further embodiment of the present invention.
Figure 20:
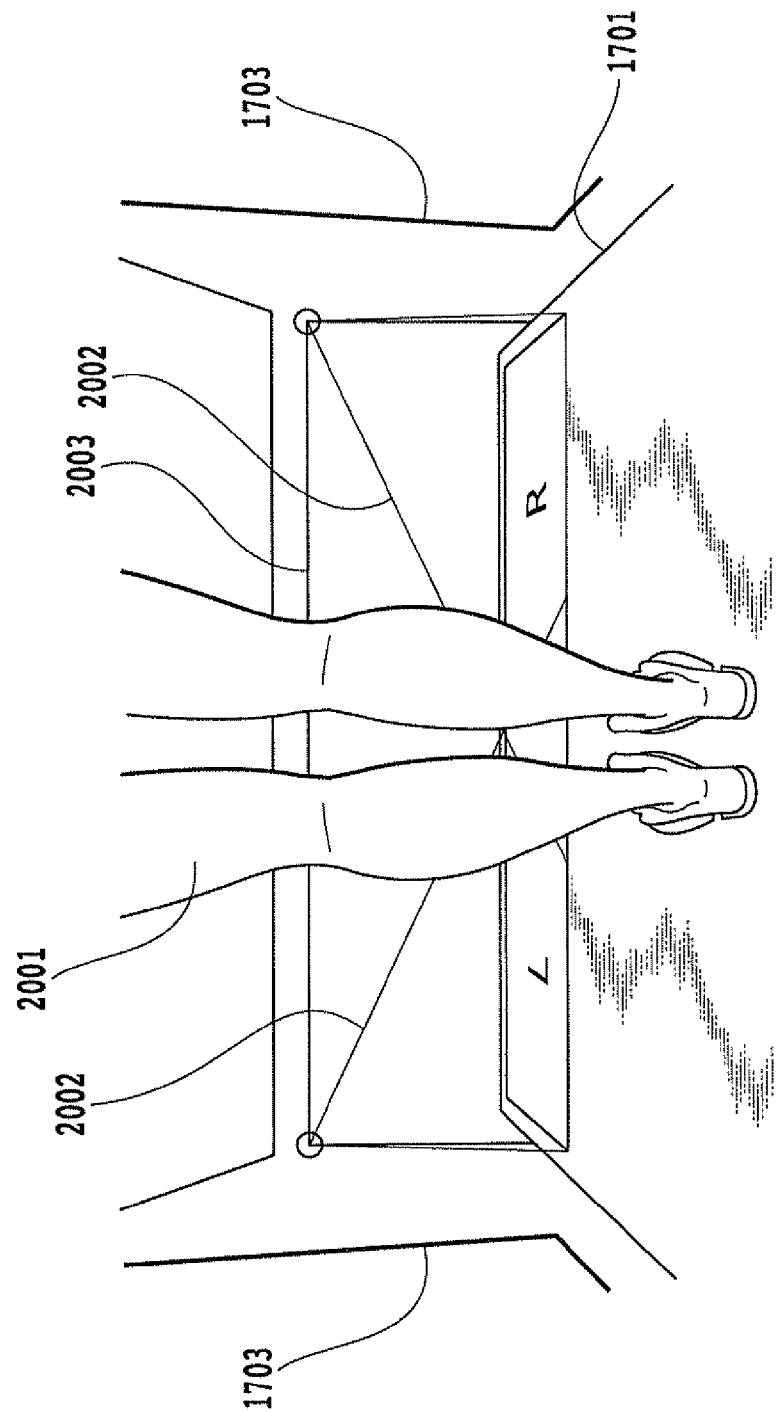
FIG. 20 is a diagram showing an example pattern projection method for the operation instruction area of the specific operation apparatus according to the further embodiment of the present invention.

Instead of the bars 1702 and 1703 in FIG. 17, markers may be provided for a desk-like solid object shown, for example, in FIG. 19, and be employed as operation plane forming references. In this case, as in FIG. 17, an area 1710, which includes areas "R" and "L", is arranged on the floor and is also to be manipulated mainly by feet. The area 1710 that includes area "R", etc., can be provided by drawing or printing on a floor mat or on the surface of a floor, or on a sheet that may be adhered to the floor. Further, as shown in FIG. 20, LED spot lights or liquid crystal projectors, which are pattern projection means, may be attached to bar support portions 1703, etc., and when light 2002 is projected onto the floor mat sensor, a pattern such as an input character pattern may be formed on the floor mat. That is, when projection units are installed on the bar support portions 1703 and obliquely project light, the feet 2001 of an operator do not interrupt the projection of the pattern, and a phenomenon that prevents the proper projection of the foot mat sensor pattern onto a floor mat, because of a shadow, can be avoided. When pattern projection is performed in this manner, a pattern easily identified by the operator can be dynamically formed in accordance with input data. In the example shown in FIG. 19, since an instruction for the operation start can be entered by stepping on the pattern 1710 displayed on the floor surface, various operation entries using gestures can also be performed, without using the virtual operation plane for this embodiment.

Fifth Embodiment

For this embodiment, although the basic concept matches that for the first embodiment described above, the invention that uses a different method to obtain the same effects is employed. Specifically, in this embodiment, manipulation is also performed by employing, as a reference, a virtual operation plane that is virtually formed in space, as if an input device like a touch panel were present in space, and the operation contents are appropriately determined. However, unlike the first embodiment, the determination of an operation is performed without using an operation plane forming reference that an operator can perceive, for example, the marker 101 in FIG. 1. For this purpose, an auxiliary input method employed for the above described fourth embodiment is also employed for this embodiment, and also provided is an apparatus that permits an operator to immediately apprehend how the system has identified his or her manipulation.

Figure 22:
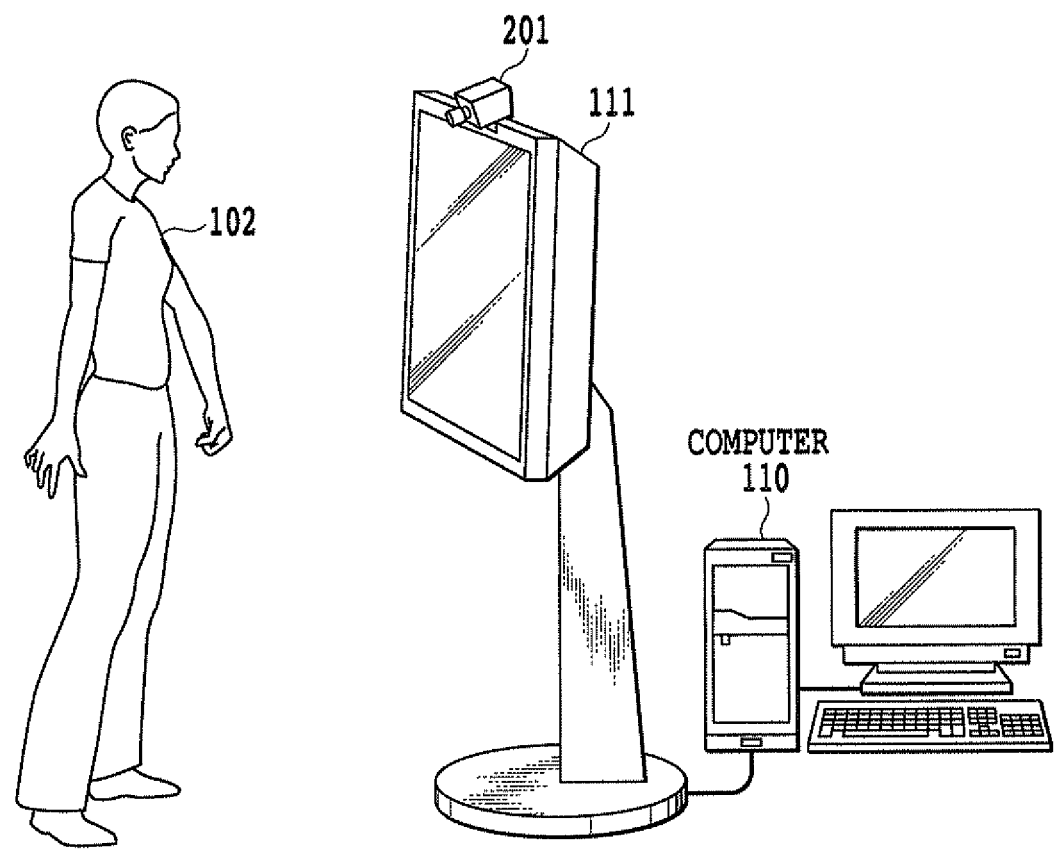
FIG. 22 is a diagram illustrating an operation input system employing a virtual operation plane according to one embodiment of the present invention.

A basic principle of this embodiment is that an operation instruction given by an operator is visually displayed on a monitor 111 in accordance with the shifting of the position of body parts, such as a hand or fingers, of an operator who faces a virtual operation plane, and thus the operator can be guided and can appropriately perform operation input. Specifically, as shown in FIG. 22, since the marker 101 used in the first embodiment is not present, basically, an operator 102 can not identify the location of a virtual operation plane. In this case, the operator employs intuition, instead of a reference screen such as a marker, to identify the presence of a virtual operation plane within a predetermined range, and enters an operation instruction into the range as a reference, while the system determines the operation instruction.

Figure 24:
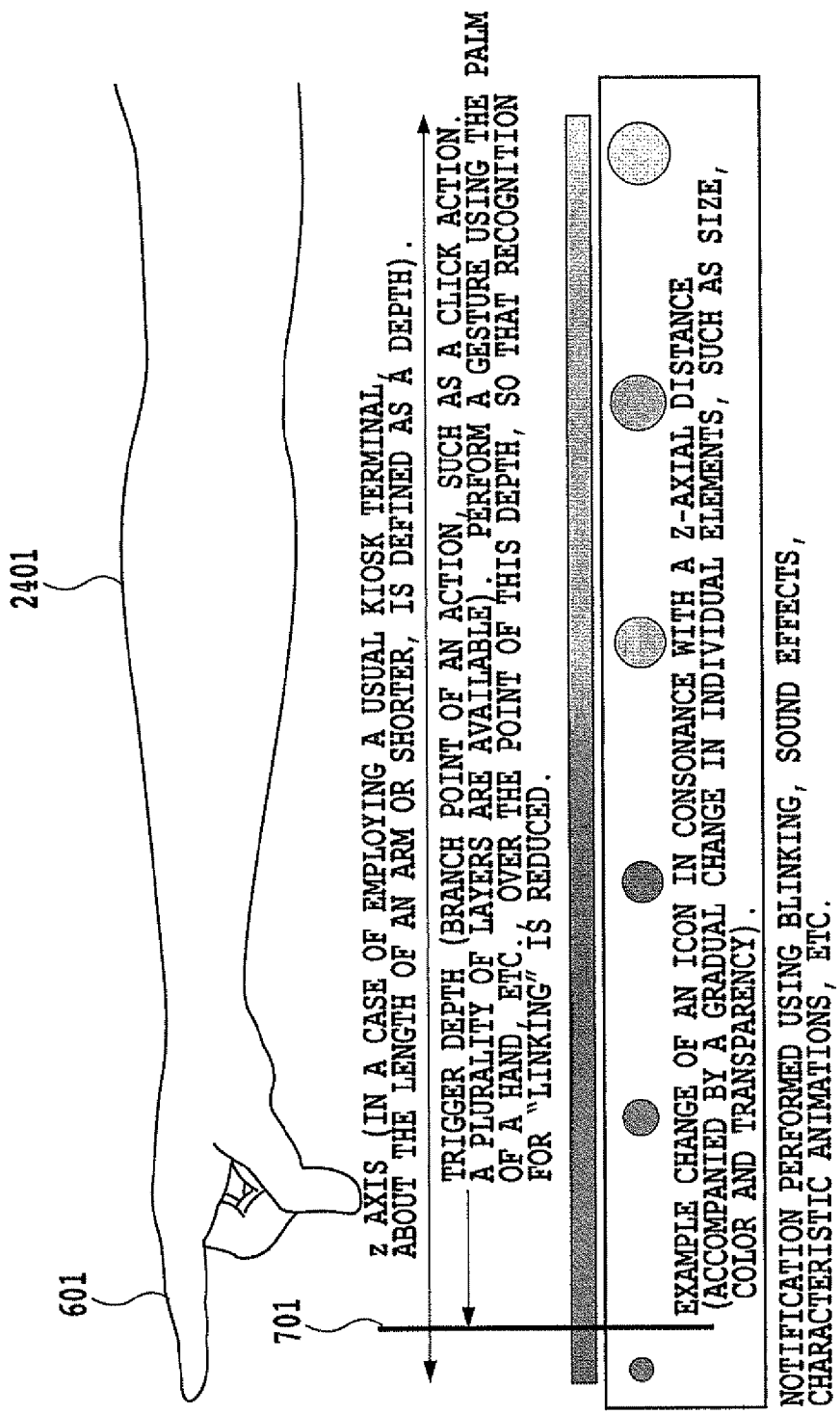
FIG. 24 is a diagram showing a relationship, for the embodiment of the present invention, between the actions of an operator and icons displayed on a screen.

This process will be described while referring to FIGS. 23 and 24. In this embodiment, for a case wherein an operator stands in a predetermined position for an operation, a virtual operation plane 701 is formed in advance, at an appropriate pre-designated position, where the operator, while at the standing position, or at an appropriate position corresponding to the standing position of the operator can manipulate the virtual operation plane. Further, as shown in FIG. 23, a proper operation range 2301 is designated for the operator 102. As described above, an operation that is to be performed is displayed in various forms, so that the operator can identify his or her manipulation.

One of these forms will be described while referring to FIG. 24. According to this example, in a case wherein an operator is to perform a specific operation using the system, the position of a hand or finger 601 is changed by moving an arm 2401 forward to or backward from the monitor 111, and this state is displayed on the monitor 111. When the pointing finger 601 has reached a predetermined position, the system performs a predetermined process, e.g., performs a process corresponding to a designated item on the screen of the monitor 111. In the example in FIG. 24, the size of an icon is changed in consonance with the position (distance) of the finger 601 relative to the virtual operation plane 701, and as the finger approaches the virtual operation plane, the icon becomes smaller, and the operator can quickly apprehend that a predetermined location is gradually being focused on in response to his or her manipulation. At the position where the ion becomes the smallest, the effect of the manipulation is established, and a corresponding process is performed.

Figure 25:
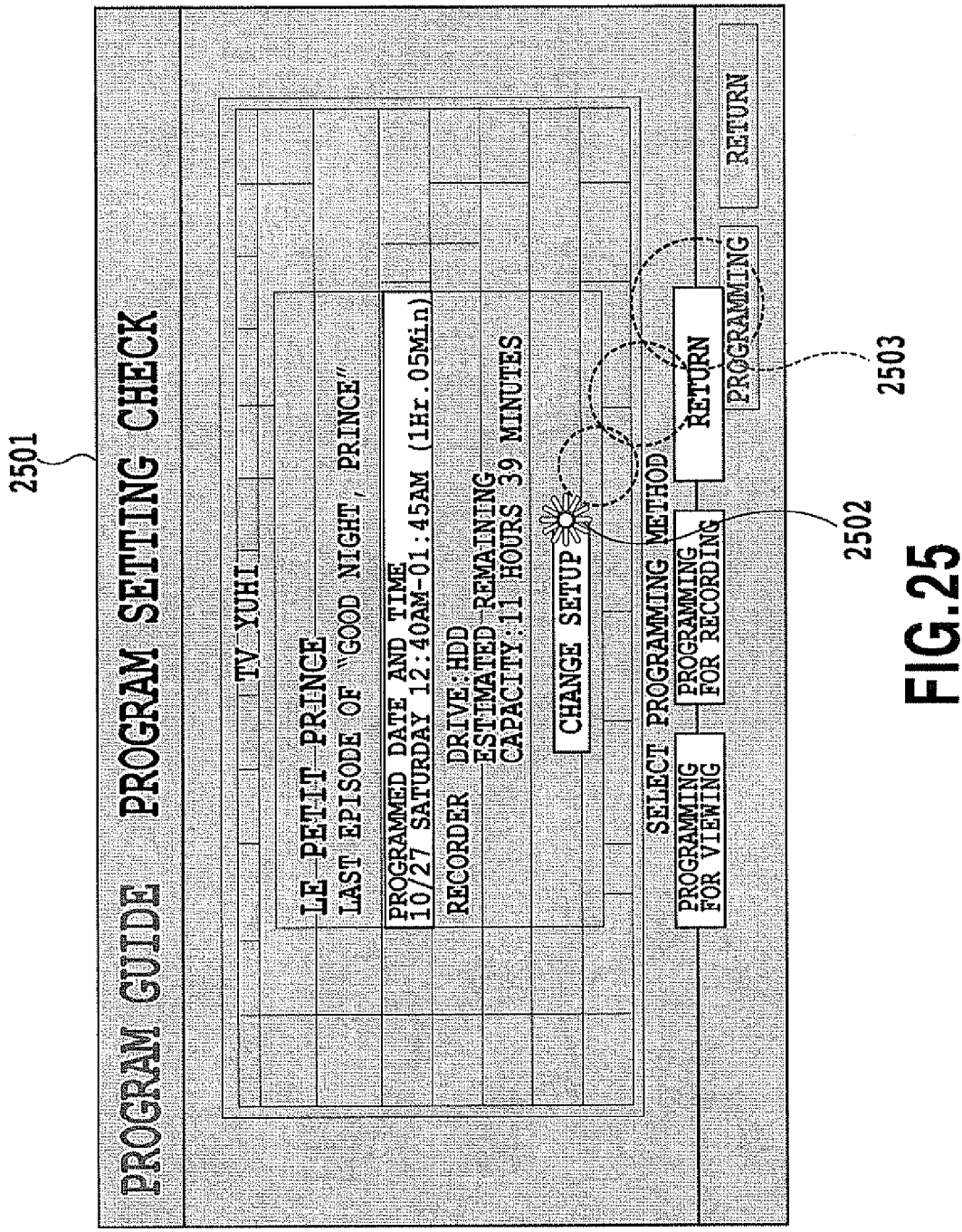
FIG. 25 is a diagram showing a specific operation input screen example to be displayed according to the embodiment of the present invention.

The changes in the size of the icon on the screen 2501 of the monitor 111, as a result of the above described manipulation, are shown in FIG. 25. Referring now to FIG. 25, a TV program schedule, for example, is displayed on the screen 2501 of the monitor 111, and an operation related to a specific program is to be performed. Under this condition, in a case wherein an operator is to select menu button "Change Setup", for example, the operator moves the extended finger 601 toward the monitor 111 for selection in the above described manner. In this embodiment, the operator does not precisely recognize the location of the virtual operation plane, and as the finger 601 approaches the virtual operation plane, at a predetermined distance, an icon 2503 is displayed on the screen 2501. Since the position of the finger is still too far, a comparatively large icon, on the right side of those icons shown in FIG. 24, is displayed. Then, as the operator continues to stretch out the arm 2401, the icon is moved closer to a targeted selected item, "Change Setup", and becomes smaller, and when an icon 2502 having a predetermined size is reached, it is determined that the item at the position indicated by this icon has been selected.

According to the example in FIG. 25, the size of the icon displayed on the screen 2501 changes in accordance with the position of the finger 601, the operator can apprehend how his or her movement is recognized by the system, and can obtain the approximate location of the virtual operation plane and immediately perform an operation, such as the selection of an item on a menu. Here, as well as in the first embodiment, a three-dimensional camera can be employed to extract the position and size of the entire body of the operator, including the finger 601 and the arm 2401, or the positions and the sizes of the individual parts. As a result, since the size including the depth can be obtained for an object on a screen, a distance to the virtual operation plane and the positional relationship can be calculated based on this information. Since an arbitrary method known to the technical field of this invention can be employed for a three-dimensional camera and for the extraction of a position and calculation of a distance, no explanation for them will be given.

Figure 26:
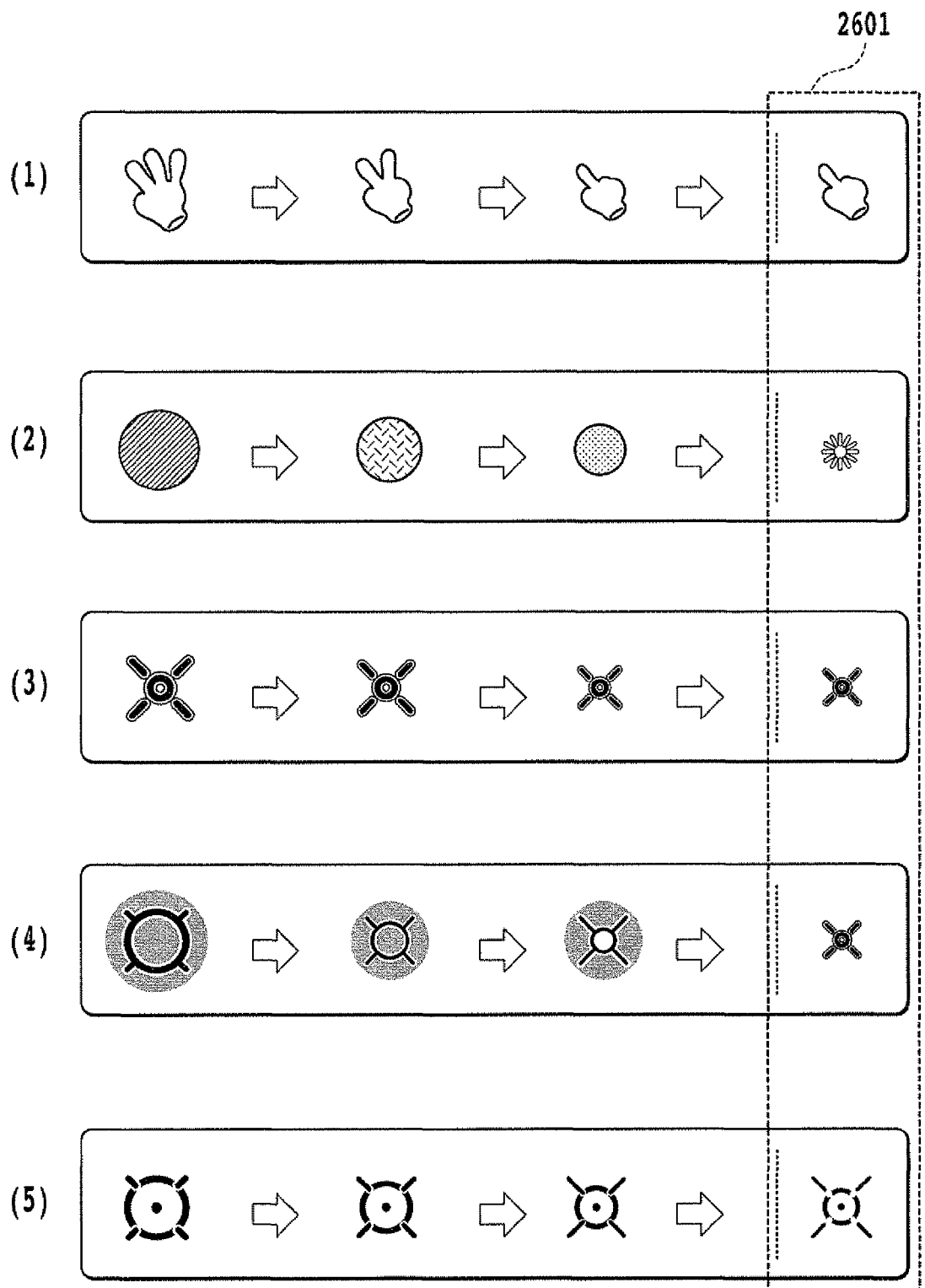
FIG. 26 is a diagram showing various icon examples usable on the operation input screen according to the embodiment of the present invention.

In this embodiment, a circular icon is displayed on the screen, and its size is changed in accordance with the action of the operator; however, the form of an icon is not limited to this, and as shown in FIG. 26, various icons forms may be employed and be variously changed. Specifically, referring to FIG. 26, (1) indicates an icon of a finger form that becomes smaller as the finger of the operator approaches the virtual operation plane, as well as in the example in FIG. 25 described above. (2) indicates an icon having a circular form that gradually becomes smaller, and that is changed to a specific form that indicates the input or selection has been established. For a case wherein this icon and the other icons are colored, the color can be changed instead of, or in addition to, the change of the shape or the size. When, for example, a cold color like blue or green is changed to a warm color like yellow or red, the operator can apprehend, at a glance, that the operation objective has been established. (3) is an icon shaped like an X; when the finger is too far from the virtual operation plane, not only does the icon become large but also faded, and when the finger approaches the operation plane, the icon becomes less faded and has a sharper shape. (4) indicates that, instead of changing the size of the entire icon, the shape of a figure drawn inside the icon is changed to identify the step reached in the process of focusing on a target. In this case, the color of the figure can also be changed. (5) in FIG. 26 is also an icon whose shape is changed. Referring to FIG. 26, the shapes or the colors of the icons are changed in accordance with the movement of the finger, and as soon as the finger proceeds across the virtual operation plane, the icons can be changed to various forms or colors as indicated in a column 2601, or can blink to inform the operator that the manipulation has been determined to be an operation. Although not shown, a change such that a transparent icon becomes opaque when the finger approaches the virtual operation plane is also effective.

Figure 27:
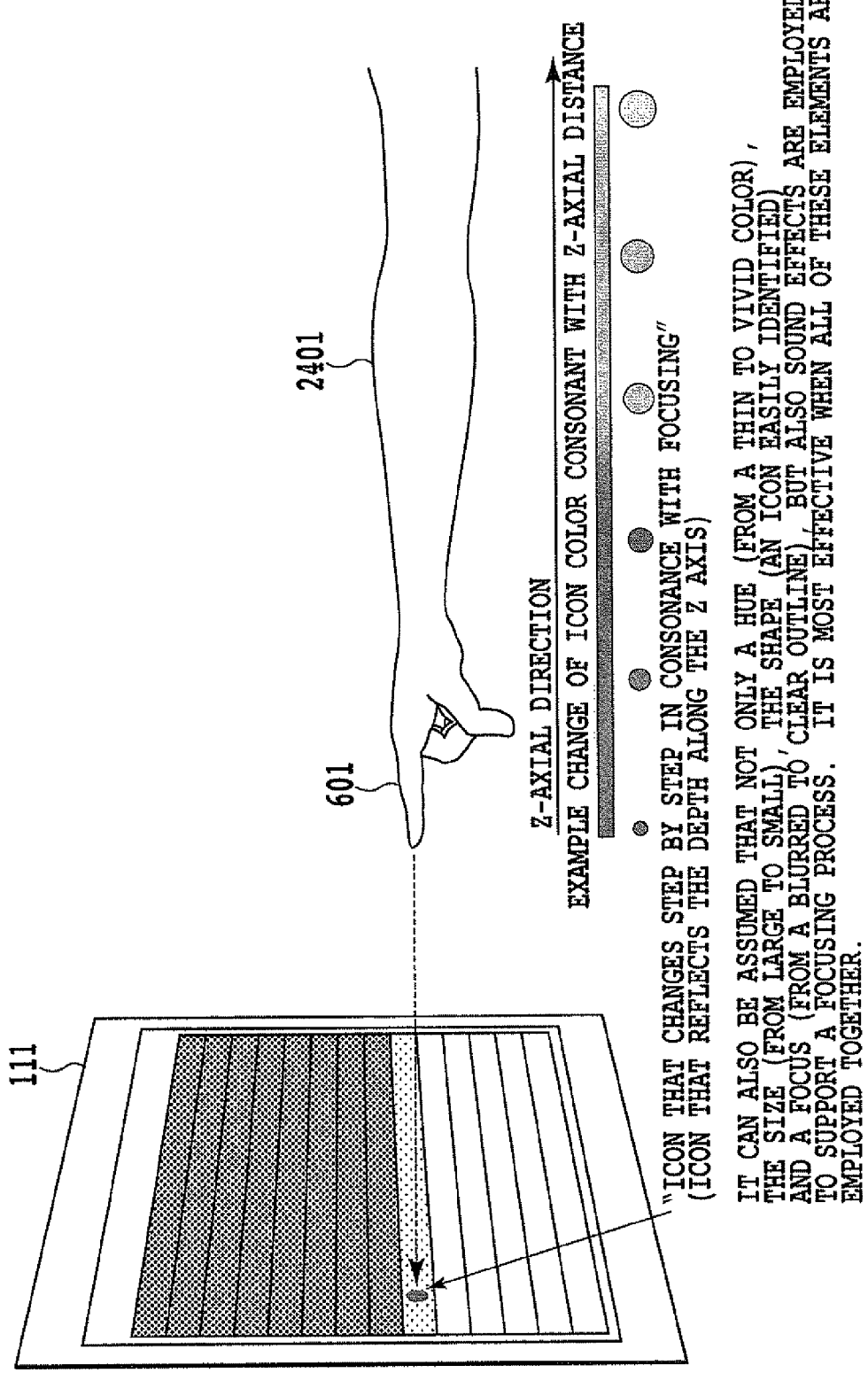
FIG. 27 is a diagram showing a relationship between the actions of the operator and ions displayed on the screen according to the embodiment of the present invention.

In a case wherein there is little change in the shape of an icon but there is changing in colors or densities, which is one of the change variations for an icon, the icon does not move much, as shown in FIG. 27, and when the finger 601 approaches the virtual operation plane, the icon color changes to a warm color or a cold color, so that operation input can be established.

Figure 28:
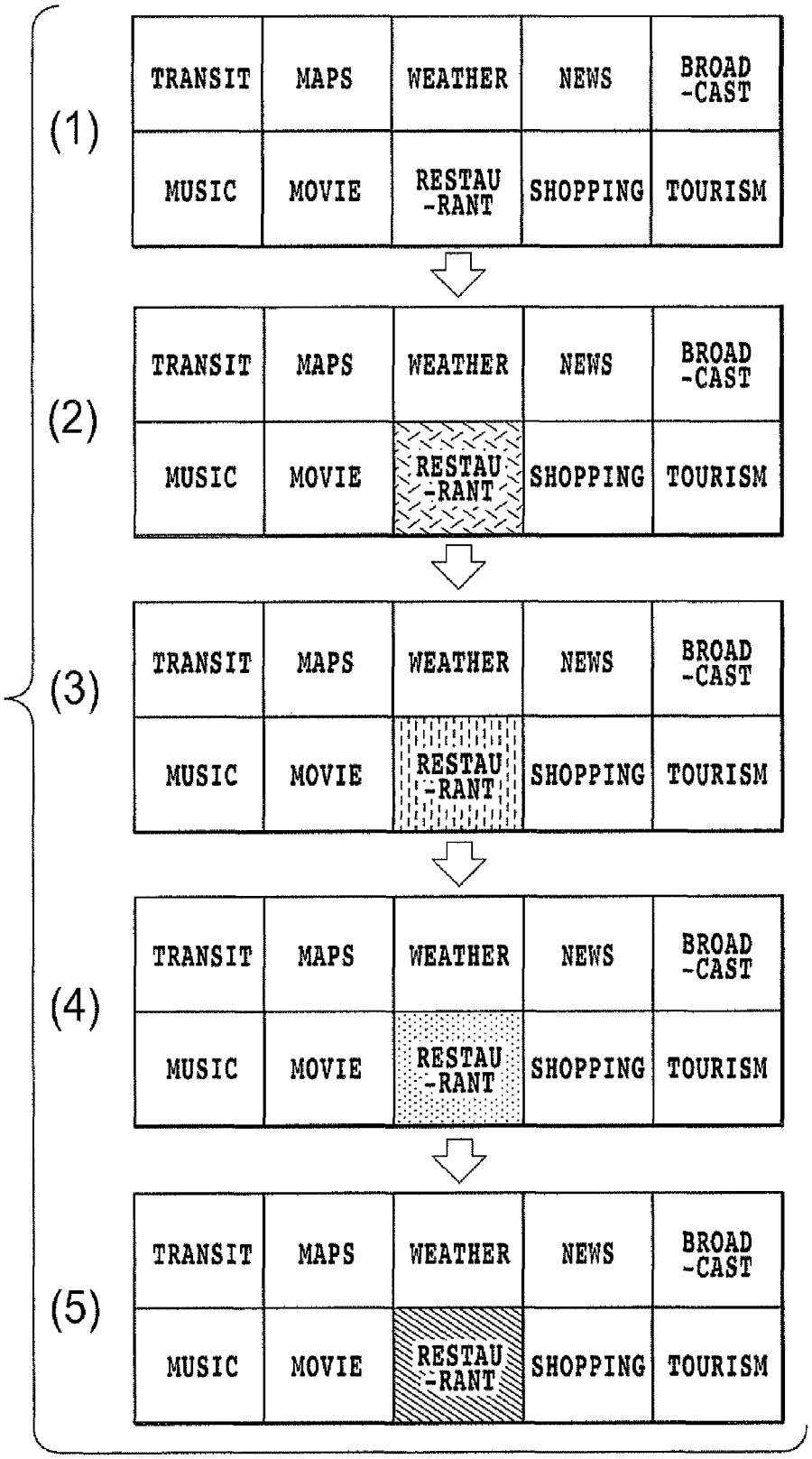
FIG. 28 is a diagram showing a change of the color of a menu button on the operation input screen according to the embodiment of the present invention.
Figure 29:
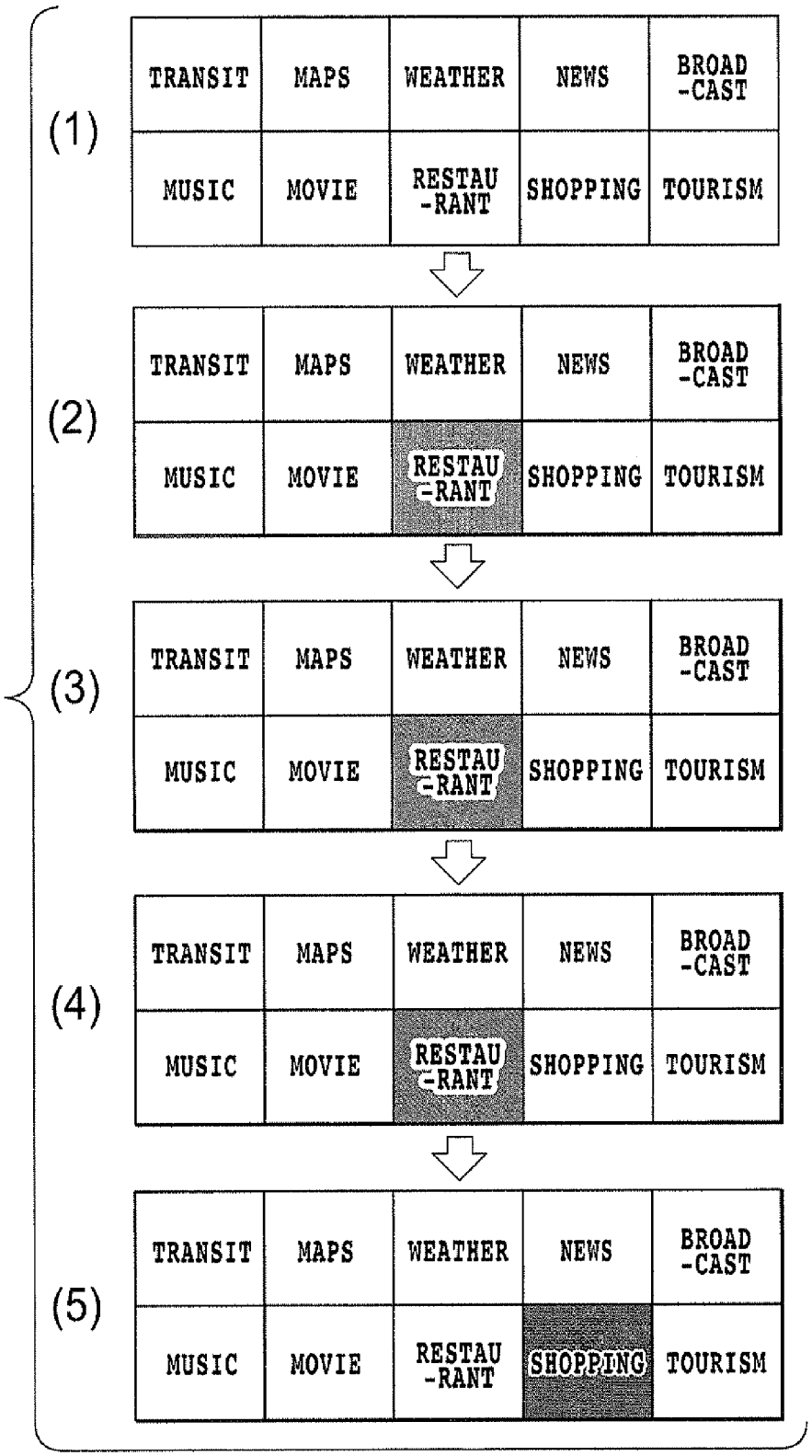
FIG. 29 is a diagram showing a change in the density of the menu button on the operation input screen according to the embodiment of the present invention.

Furthermore, in the above described example, the icon is displayed and the color or shape of the icon is changed in accordance with the action of the operator, in order to confirm the state of the determination provided by the operation. However, in a case, like one for a menu, as shown in FIGS. 28 and 29, for example, wherein the position to point at is fixed in advance, the display of an icon is not required, and a target button is determined by examining which icon button on a menu is closest to the position pointed to by the finger 601, and the color or the density for painting over the button pointed to button is changed in accordance with the movement of the finger 601, especially when at a distance from the virtual operation plane. As a result, the operator can identify the position of the virtual operation plane, and can easily perform operation input. FIG. 28 is a diagram showing an example wherein, as the finger 601 approaches the virtual operation plane, the color of a selected button changes from a cold color to a warm color. When the color for this example is selected as blue for (2), green for (3), yellow for (4) and red for (5), the operator can apprehend at a glance that the operation has been established when the icon color changes to red. Similarly, FIG. 29 is a diagram illustrating an example for changing the density for painting over a button.

Figure 43:
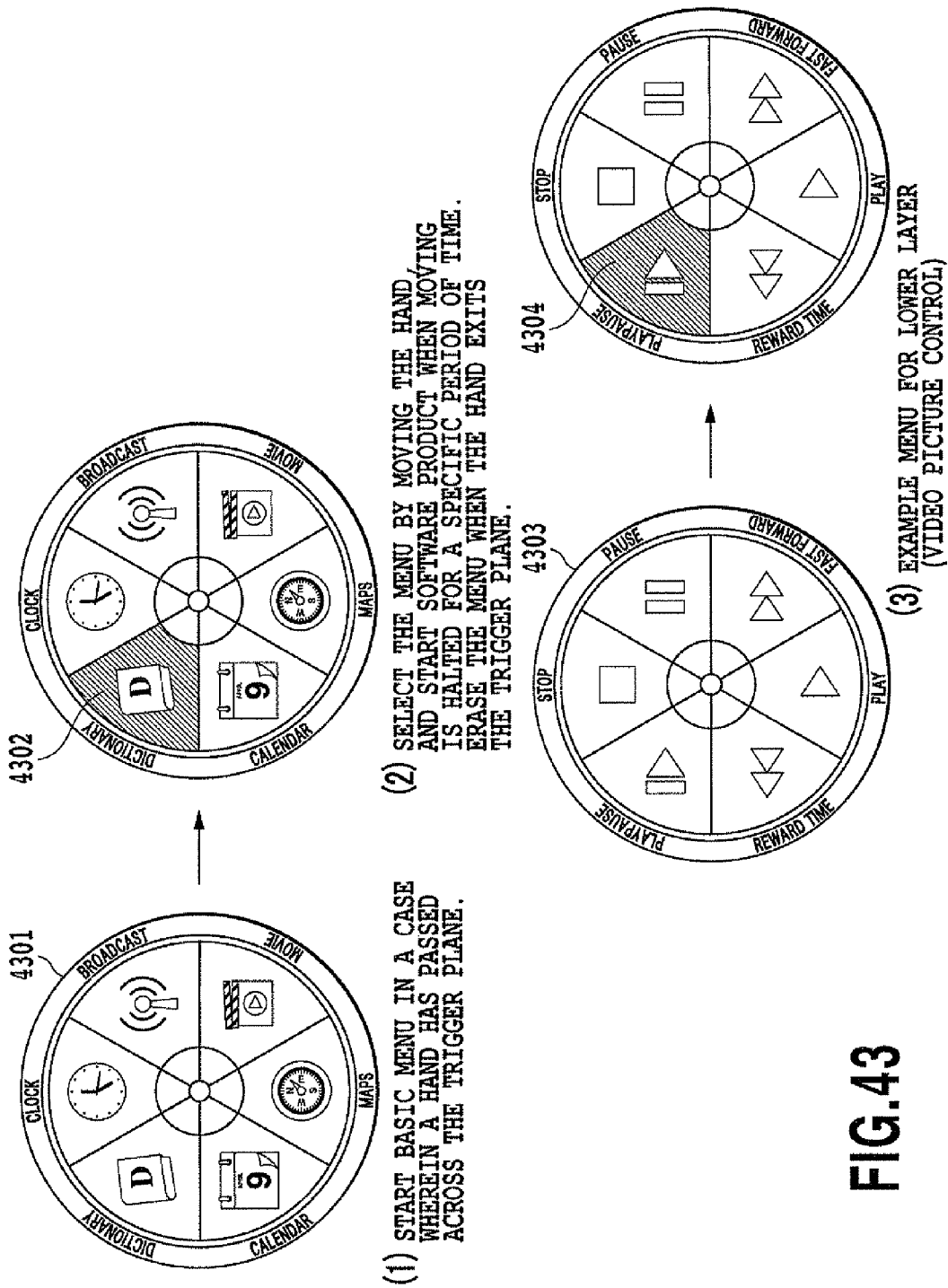
FIG. 43 is a diagram showing a relationship between an action of an operator and a menu displayed on a screen according to again one more embodiment of the present invention.

An example in FIG. 43 is another example of menu selection, and will now be described. Assuming that the finger 601 in FIG. 24 has reached, for example, a position across the virtual operation plane 701, a menu 4301 is displayed on the screen, indicating that an item 4302 has been selected in accordance with the position of the finger 601 in the X-Y direction. Thereafter, the finger 601 moves to the right or left, or up and down, and an item to be selected is changed on the menu when the finger 601 halts on a desired item for a pre-determined period of time, and a process consonant with the selected item is performed. Further, when the finger 601 is retracted behind the virtual operation plane 701 before selection has been established, erasing the menu is also an available operation.

Figure 42:
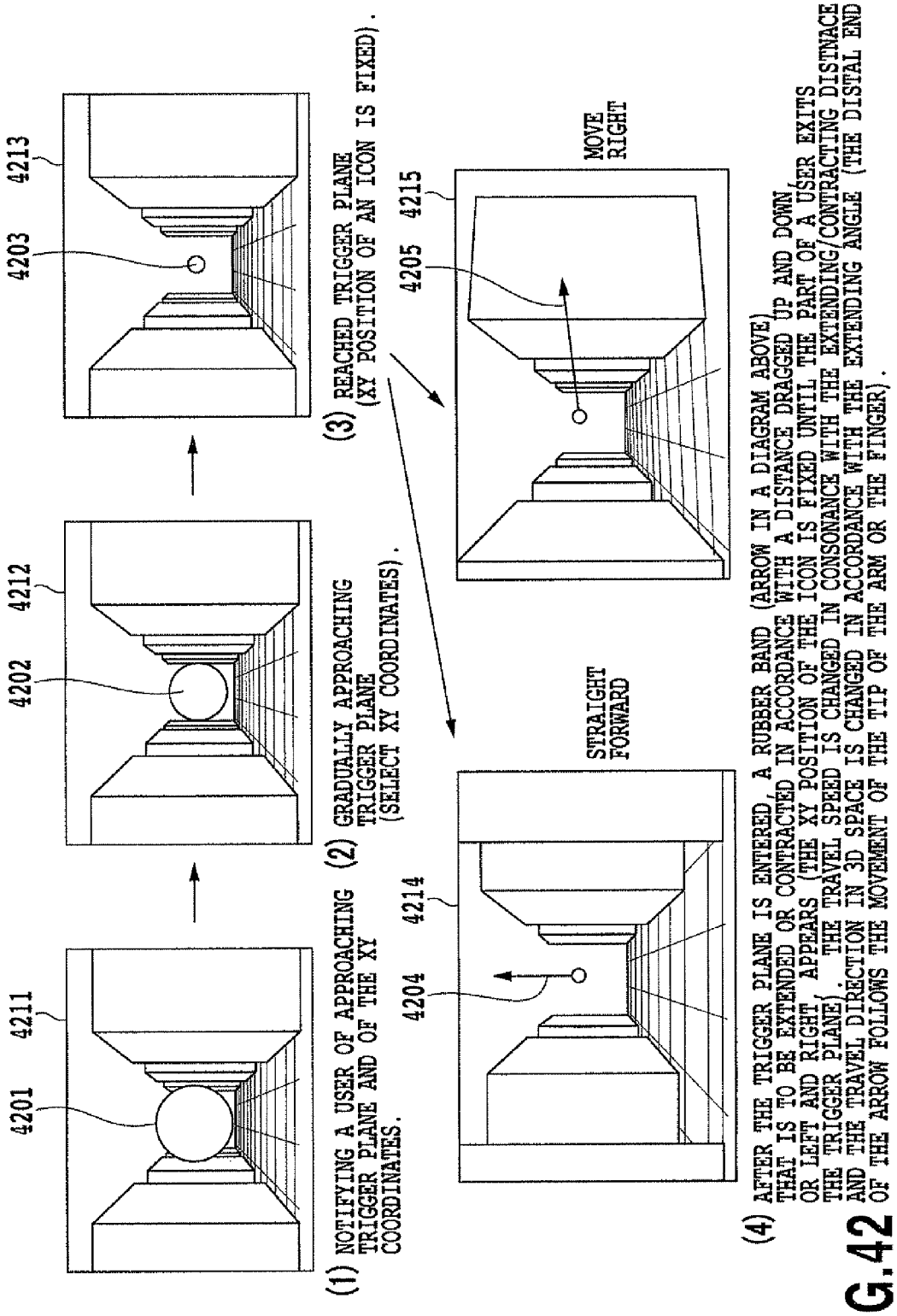
FIG. 42 is a diagram showing an example display screen according to this embodiment, for entering an instruction to move a figure displayed on the screen.

An additional input operation example will be described while referring to FIG. 42. FIG. 42 is a diagram illustrating, for this embodiment, an example display screen into which to enter an instruction to move a figure displayed on the screen. First, when a finger, for example, moves close to a virtual operation plane, the size of an icon is reduced from an icon 4201 on a screen 4211 to an icon 4202 on a screen 4212 to represent the finger approaching the screen. Thereafter, when the finger contacts the virtual operation plane, the state is maintained, for example, by changing the icon color, as indicated by an icon 4203 on a screen 4213. In this state, when the finger, for example, moves upward, a rubber band 4204 is displayed on a screen 4214 to indicate the direction of travel, so that the operator can confirm the progress of his or her manipulation. Furthermore, when the finger is moved to the right, a rubber band 4205 can be displayed on a screen 4215. As described above, after the finger, etc., has reached the virtual operation plane, a rubber band (an arrow in the above drawings) that stretches or contracts in accordance with the distance of vertical or transverse dragging is presented (the position of the icon 4203 is fixed after the finger passes across the virtual operation plane, and the speed of travel can be changed in accordance with the distance the rubber band has been stretched or contracted (or the direction traveled in 3D space can be changed in accordance with a stretch angle at which the distal end of an arrow follows the movement of the arm or the finger tip).

The principle of this embodiment has been explained for a case shown in FIGS. 22 and 23, wherein the operator and the monitor are present substantially at the same height, i.e., wherein the virtual operation plane is formed almost perpendicular to the horizontal face in the front of the operator. This principle is not affected by the positional relationship of the operator and the monitor, or the shape of the device, and various arrangements and structures are available. For example, the principle of this embodiment can be applied for manipulation performed while sitting down on a sofa or lying in a bed, as explained in the second to fourth embodiments, and a table can also be employed.

Figure 30:
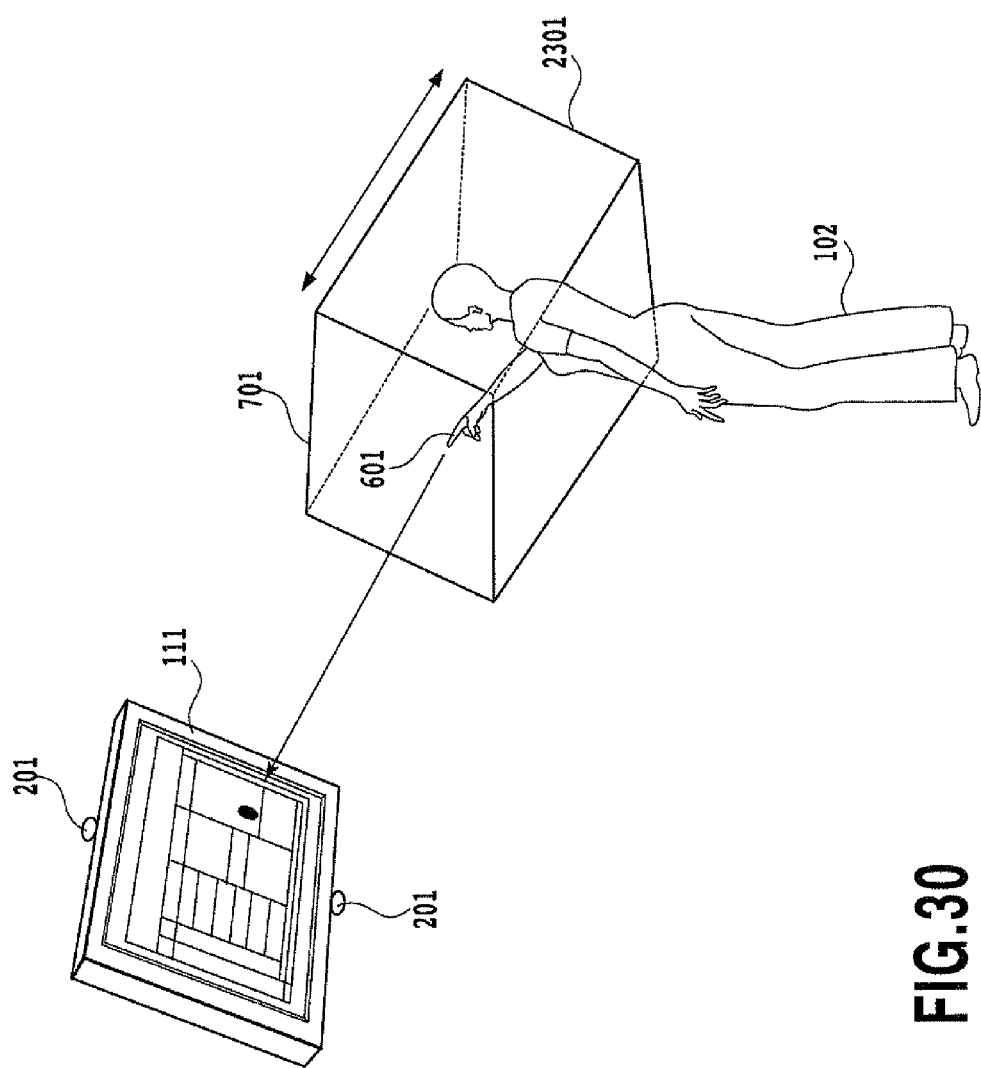
FIG. 30 is a diagram showing a virtual operation plane and the operating state of an operator according to a modification of the embodiment of the present invention.

Further, for a case shown in FIG. 30, wherein the monitor 111 is arranged obliquely above the operator 102, since a virtual operation plane is formed at an inclination and an operation area 2301 is also provided at an inclination, the operator 102 simply looks up at the monitor 111, as shown in FIG. 30, and moves a finger forward or backward in the same manner as in the above described case, so that manipulation of the monitor 1111 is available. In this case, since a three-dimensional camera 201 is also inclined with the monitor 111, basically there is no great difference from a case wherein the camera and the monitor are arranged at the horizontal positions described above. When the camera is located at a different position, positional compensation simply needs to be performed using an arbitrary method known to the technical field of this invention, and the position at which to obtain the desired positional relationship between the body part of the operator and the virtual operation plane, and the operation accepted can be determined.

Furthermore, when, as in the fourth embodiment, a floor mat sensor is connected to the image recognition apparatus of this embodiment, the image recognition apparatus receives an operating mode via a floor mat, and also employs a three-dimensional imaging device to more accurately recognize the manipulation, such as a gesture, performed by the operator. Specifically, when L or R on the floor mat 1701 shown in FIG. 17 is stepped on, for example, an operating mode is started, and the recognition process is performed by assuming that a movement by the operator is a gesture. When a movement other than this has occurred, the pertinent movement of the operator is regarded as ineligible, and any process can be performed. In this case, a virtual operation plane is formed by using the bars 1702 and 1703 as references.

Sixth Embodiment

Figure 31:
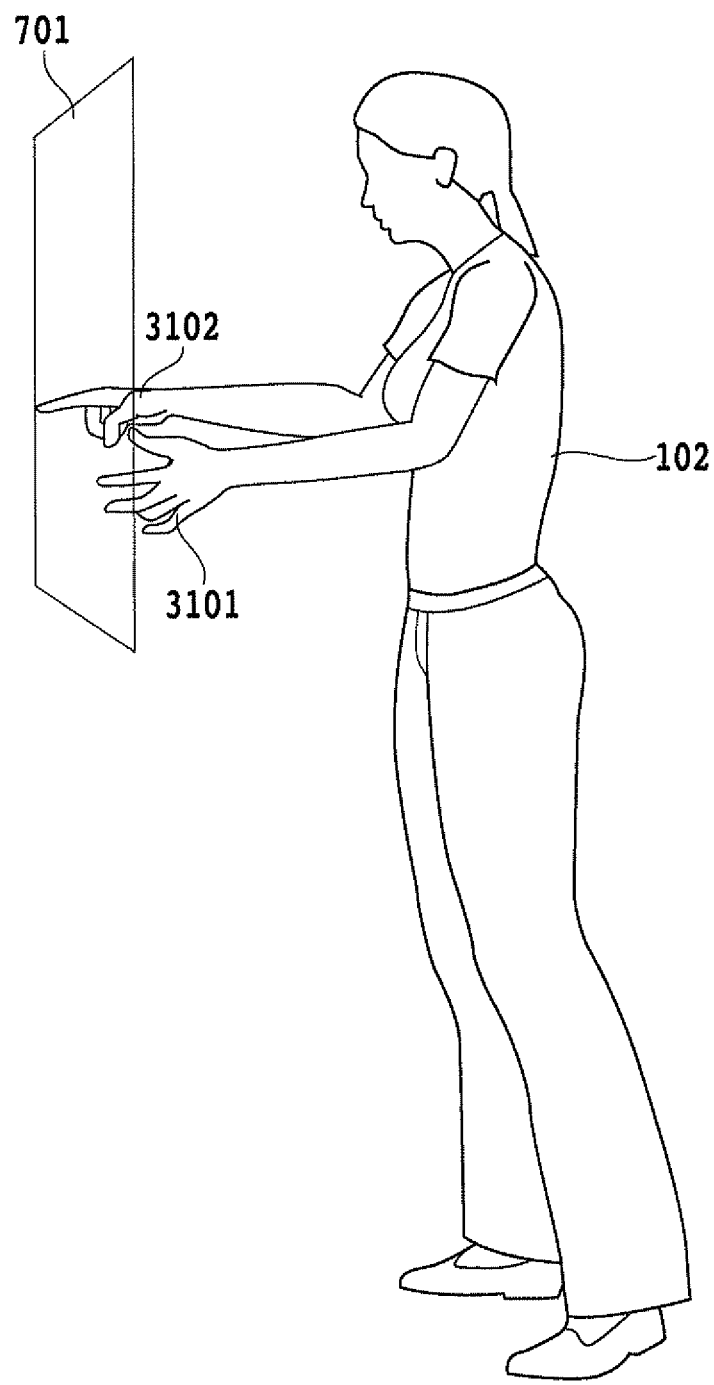
FIG. 31 is a diagram illustrating a multi-touch virtual operation plane and the operating state of an operator according to one further embodiment of the present invention.

This embodiment can be employed by referring to one of the above described first to fifth embodiments as a basis, and is especially effective when the fourth and the fifth embodiments are employed. For a system in this embodiment, basically, the same configuration and arrangement as for these embodiments can be employed. Further, the processing can be performed in the same manner for the detection of the part of an operator and for a calculation performed for the positional relation to a virtual operation plane. That is, when the fourth embodiment is employed as a basis, an operator identifies the position of a virtual operation plane by employing a marker as a reference, and performs various actions relative to the virtual operation plane, to determine a predetermined operation. In a case wherein the fifth embodiment is employed as a basis, for determination of an operation, an operator does not employ a reference, such as a marker, and performs an action, while checking the movement of an icon, etc., on a monitor screen and confirming which operation his or her movement was determined to be. In either embodiment, an explanation has been given for only an example wherein merely one part of an operator, although not necessarily defined, is employed to access the system. However, in this embodiment, as shown in FIG. 31, an operator not only employs one body part, but also simultaneously employs a plurality of other body parts, such as both hands or multiple fingers, to access a system.

Conventionally, it is not easy for a so-called multi-touch panel, to be processed in this embodiment, to be employed as an input system. For example, regardless of the method that is employed, a contact can be detected at each point on a conventional touch panel, but when a plurality of contacts are made at the same time, the detection points where the contacts are made can not be identified. For this embodiment, since as described above the individual body parts of the operator can be identified using a three-dimensional camera, in the stereoscopic manner, and the positions of a plurality of body parts that have contacted the virtual operation plane, for example, can be exactly detected at the same time by employing the virtual operation plane as a reference. Therefore, in this embodiment, as shown in FIG. 31, the two arms, or a plurality of fingers, are moved on the virtual operation plane at the same time to designate a plurality of positions for the system, or to press a plurality of buttons at the same time.

Further, as an operation using a plurality of body parts, an enlarging operation is available by performing by performing an intuitive gesture using a plurality of fingers, e.g., a movement performed to choose the portions of an image to use to expand the image. With this arrangement, a complicated input operation can be performed without learning special gestures that are designated for each system in advance. For example, by referring to FIGS. 32 to 35, an explanation will be given for an example wherein an operation for expanding an image displayed on a monitor 111 is to be performed by employing multi-touch.

Figure 32:
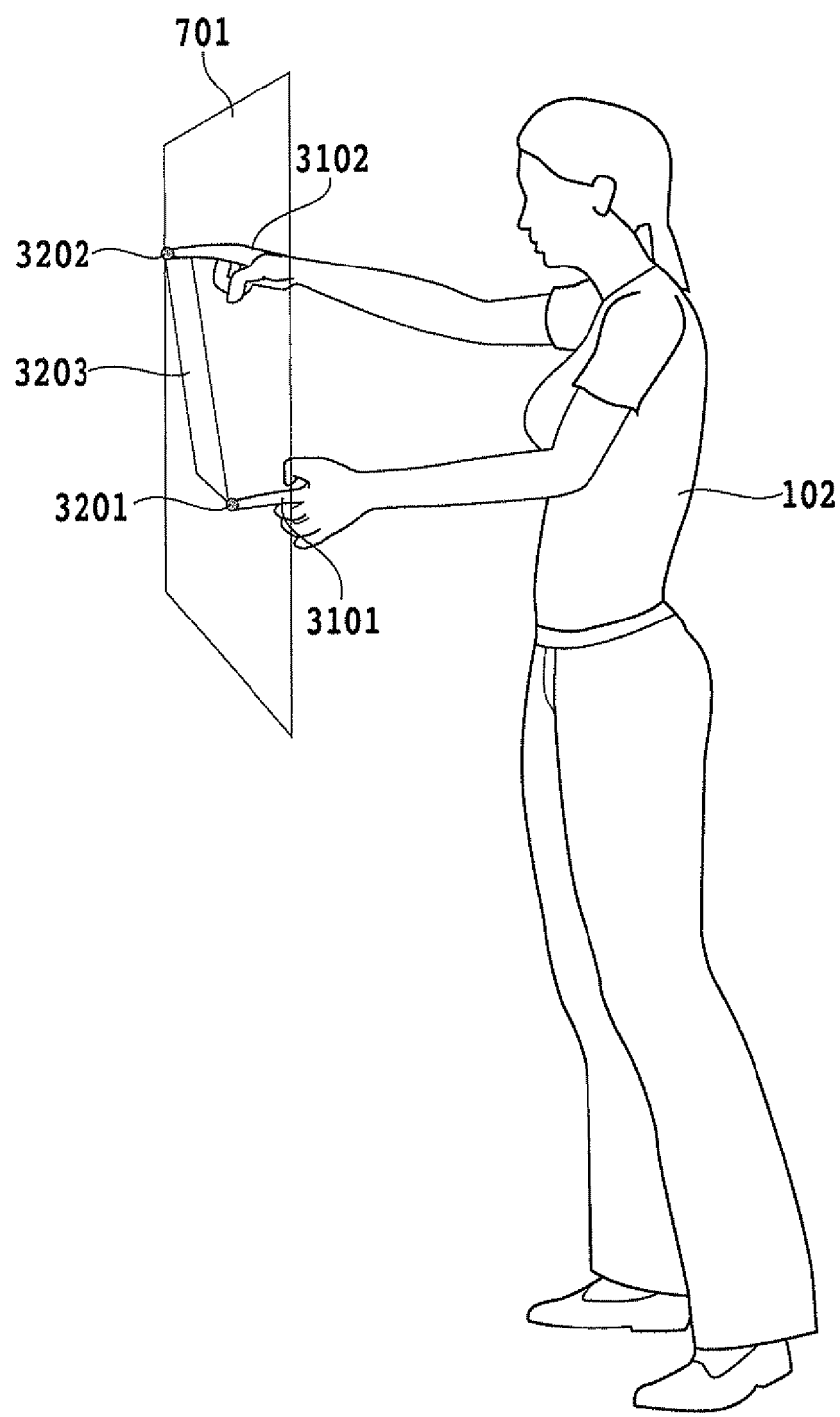
FIG. 32 is a side view illustrating the multi-touch virtual operation plane and a projected picture image according to the embodiment of the present invention.

Referring to FIG. 32, an operator 102 extends a left hand 3101 and a right hand 3102 toward the monitor by using a virtual operation plane 701 as a reference. The operator 102 uses fingers 3201 and 3202 projected across the virtual operation plane 701, and points to a image 3203, which is obtained, on the virtual operation plane, by projecting an image that the operator 102 desires to manipulate. Then, the target image whose edges appear to have been picked by the fingers, is displayed on the monitor 111, and when the fingers 3201 and 3202 are spread, or the arms are spread, the target image is expanded, for example, from the state shown in FIG. 33 to the state shown in FIG. 34. The picture image 3203 shown in FIG. 32 appears to be slightly tilted relative to the virtual operation plane 701, and this indicates that, when the operator 102 sticks the finger 3202 toward the monitor 111, the target image can be expanded and also moved in the direction of depth.

Figure 33:
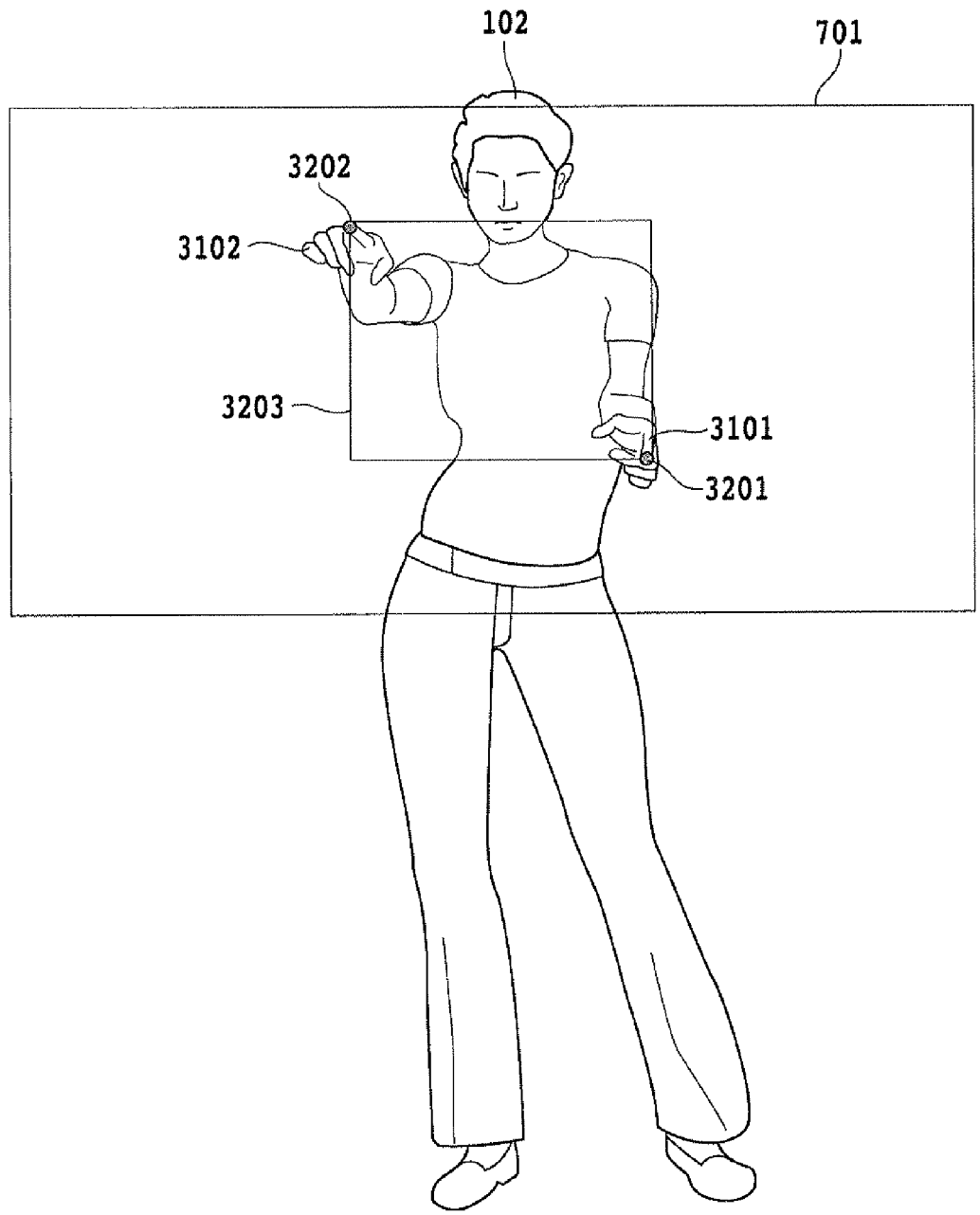
FIG. 33 is a front view illustrating the multi-touch virtual operation plane and the projected picture image according to the embodiment of the present invention.
Figure 34:
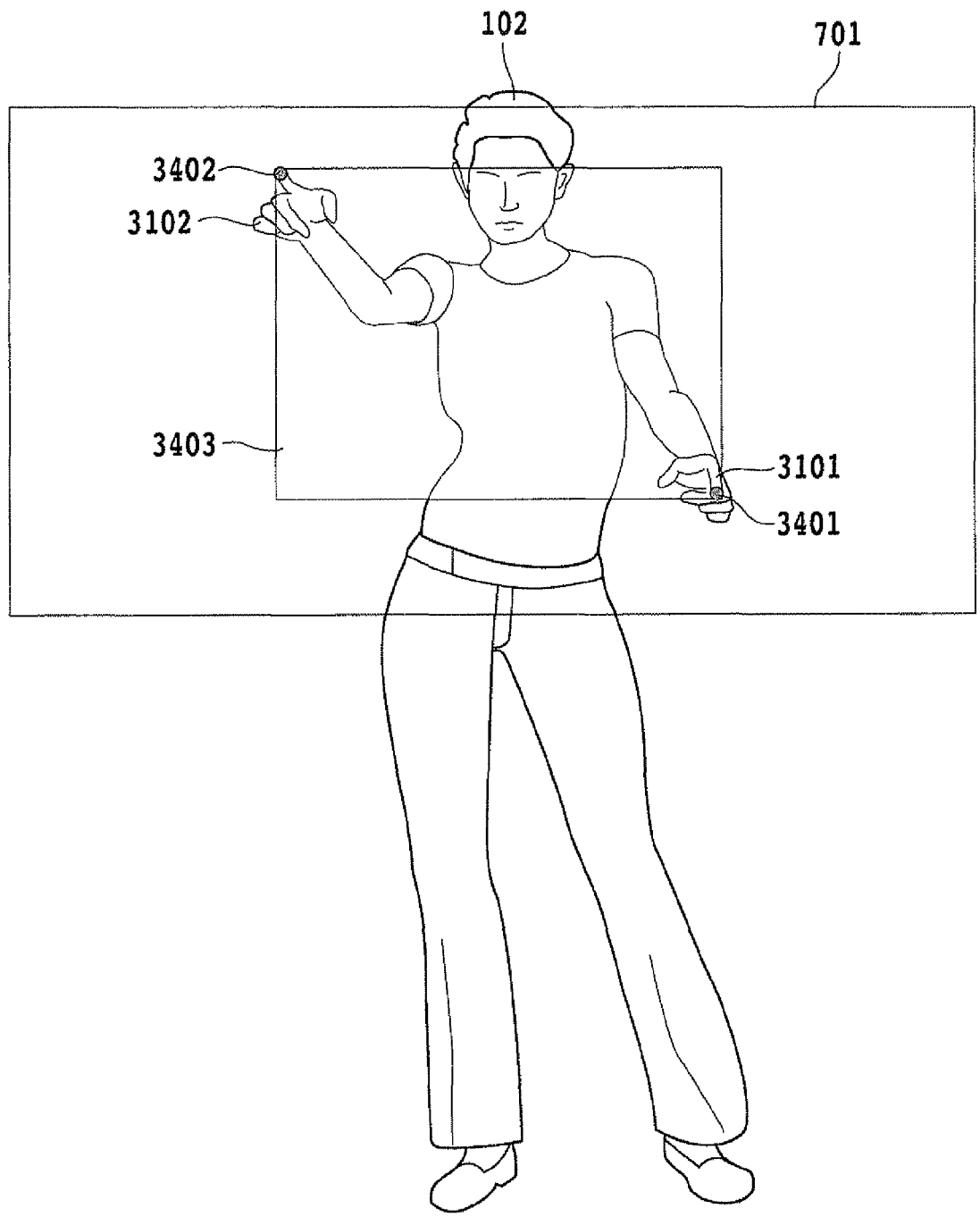
FIG. 34 is a front view illustrating the multi-touch virtual operation plane and a projected picture image according to the embodiment of the present invention.
Figure 35:
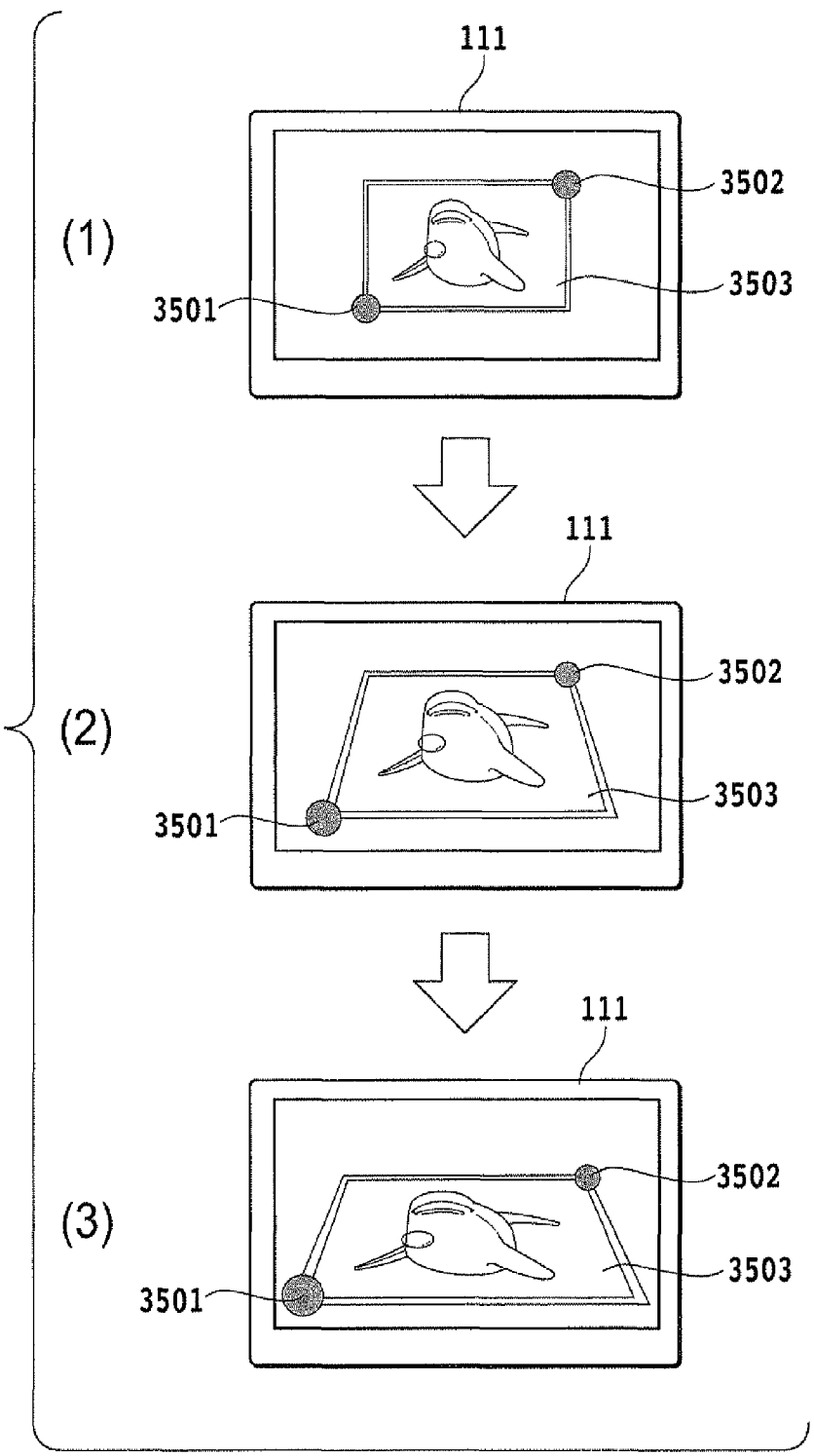
FIG. 35 is a diagram showing the state according to the embodiment of the present invention, in which an image displayed on a screen is changed by multi-touch operation.

That is, FIGS. 33 and 34 are front views for the state of the operation viewed from the side in FIG. 32, and through this operation for the picture image 3202 for an image that is originally displayed, the edges of the image picture are moved from the positions of the fingers 3201 and 3202 in FIG. 33 to the positions of the fingers 3401 and 3402 shown in FIG. 34, and the picture image is expanded to an image picture 3403. FIG. 35 is a diagram showing the states of images on the monitor 111 obtained through the above described operation. As shown in FIG. 35, in the first state (1), edges 3501 and 3502 of an image 3503 are pointed at by the fingers 3201 and 3202 on the monitor ill, and thereafter, when the arms are spread, the image is gradually expanded to state (2) and finally reaches an image 3503 in state (3). When the multi-touch in this embodiment is employed in this manner, not only is a menu button or an icon simply pressed, but also an image displayed on the monitor can be held or expanded.

Figure 36:
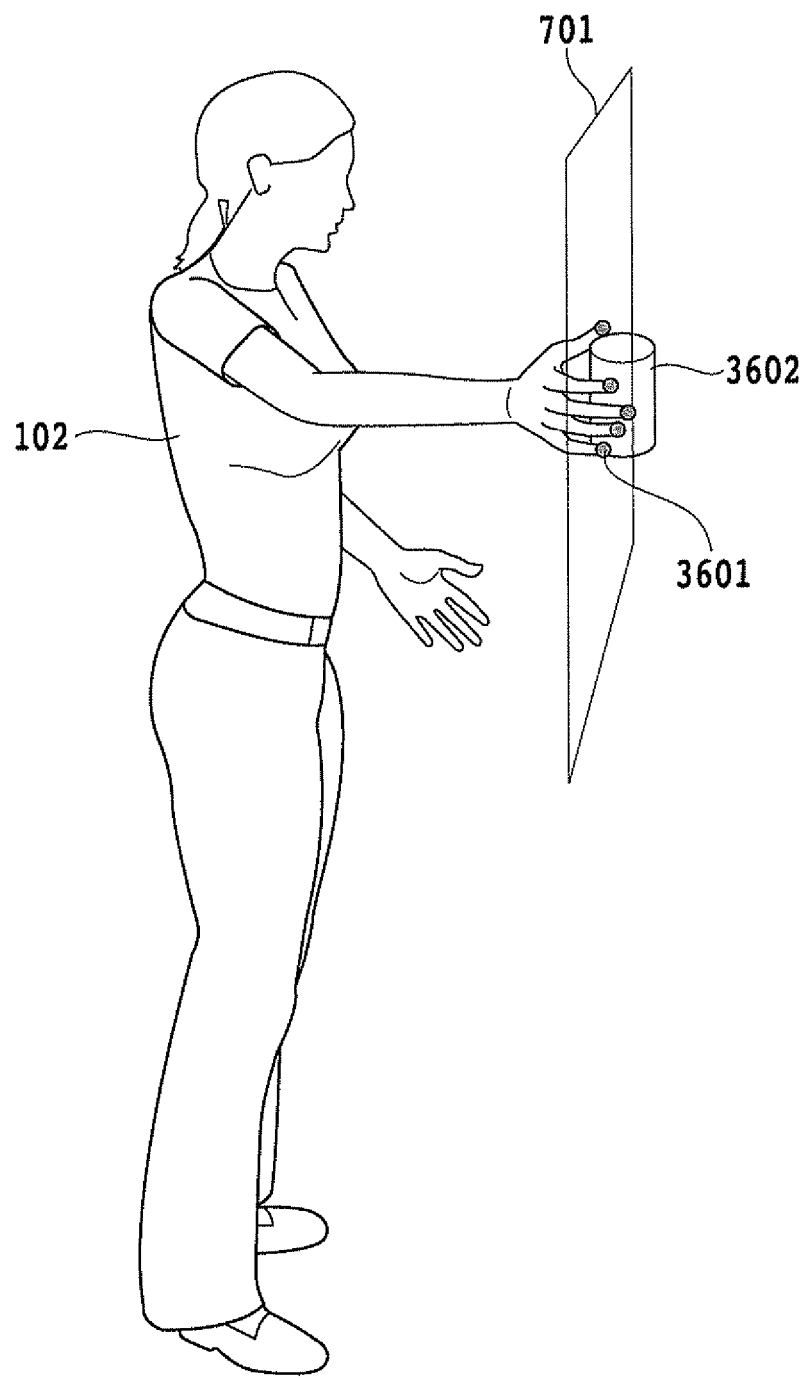
FIG. 36 is a side view illustrating a multi-touch virtual operation plane and a projected picture image according to the embodiment of the present invention.
Figure 37:
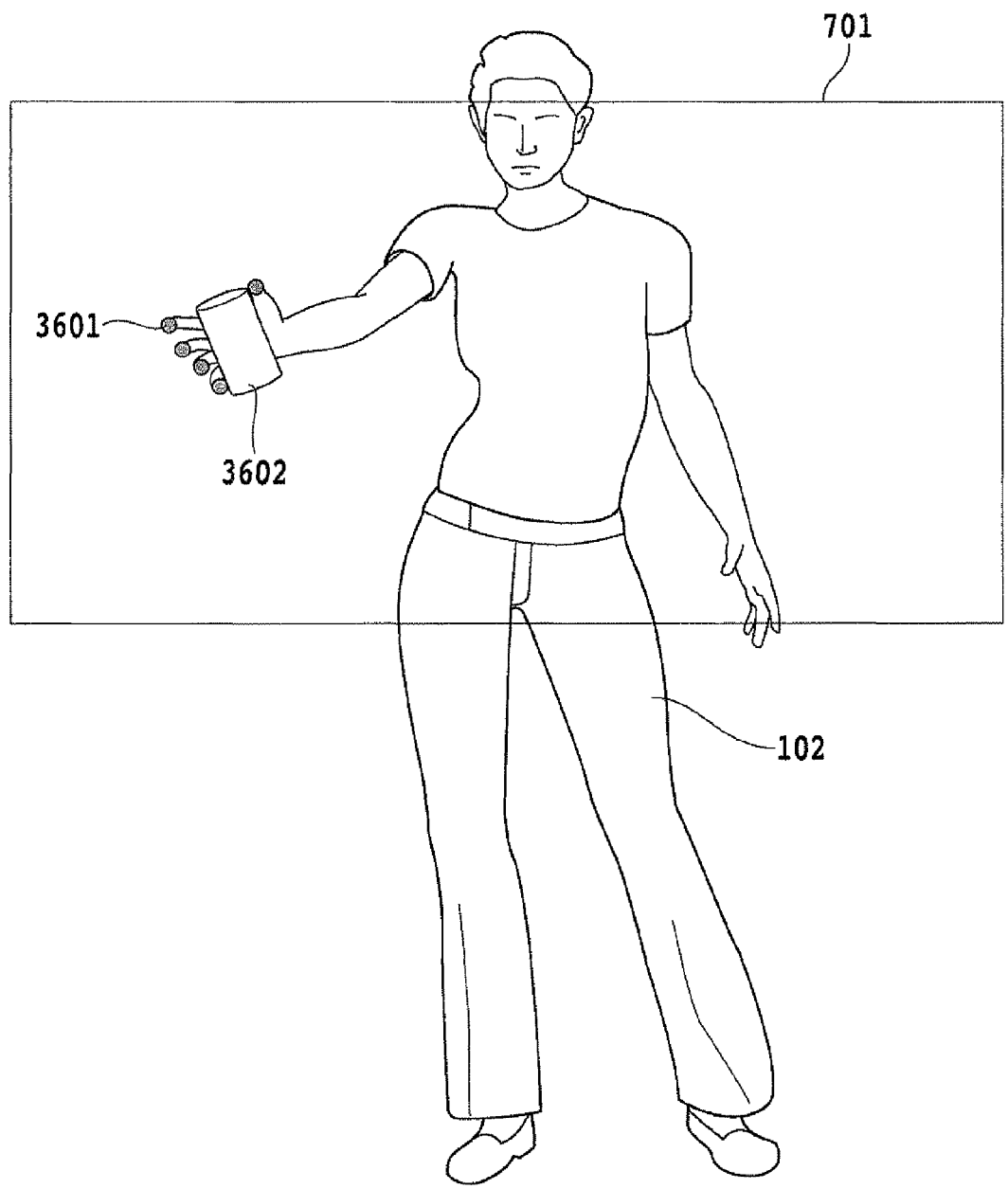
FIG. 37 is a front view illustrating the multi-touch virtual operation plane and the projected picture image according to the embodiment of the present invention.

Another example of using multi-touch is shown in FIGS. 36 and 37. Referring to FIG. 36, when a plurality of fingers 3601 are projected across the virtual operation plane 701, and it is determined that this movement is an action of holding an image picture 3602, such as glass, a process for moving the glass, etc., can be performed by the following movement of the arm. FIG. 37 is a front view of this state. It should be noted that the virtual operation plane 701 may be projected onto the monitor 111, either entirely or partially.

As described above, when this embodiment is employed, a plurality of the body parts can be used at the same time for the first to fifth embodiments, so that a complicated operation or multiple simultaneous operations can be performed, and a more effective input environment can be provided.

Seventh Embodiment

The configuration employed for the first to the fourth embodiments is also employed for this embodiment, and a difference is that operation plane forming references are respectively prepared for a plurality of operators. As one case, such as for an online fighting game, wherein a plurality of operators enter operations at the same time, the operations of the individual operators interact with each other, and computer processing and screen displaying are performed. As another case, for operators who each write different processes, a display screen is divided into segments consonant with the number of the operators who perform processing. In either case, it is required that the operator who performed each operation be precisely identified as being the operator who performed that operation. In this embodiment, an ID recognition function, such as color-coding, shape-coding or bar-coding, is provided as an operation plane forming reference, or a positional relationship, such as right or left, up or down, front or behind, is employed when such a relationship is satisfactory means by identifying an operation plane forming reference, and an operation entered based on the operation plan forming reference that is identified should be processed separately from another operation that is entered based on an operation plane forming reference.

The ID recognition function provided for the operation plane forming reference may be the one identified by the above described three-dimensional camera that is employed for operation analysis in this embodiment, or be obtained by another method, whereby a positional relationship is determined using, for example, a wireless tag, and is compared with a picture obtained by the three-dimensional camera. However, the ID recognition function is not limited to this.

Figure 40:
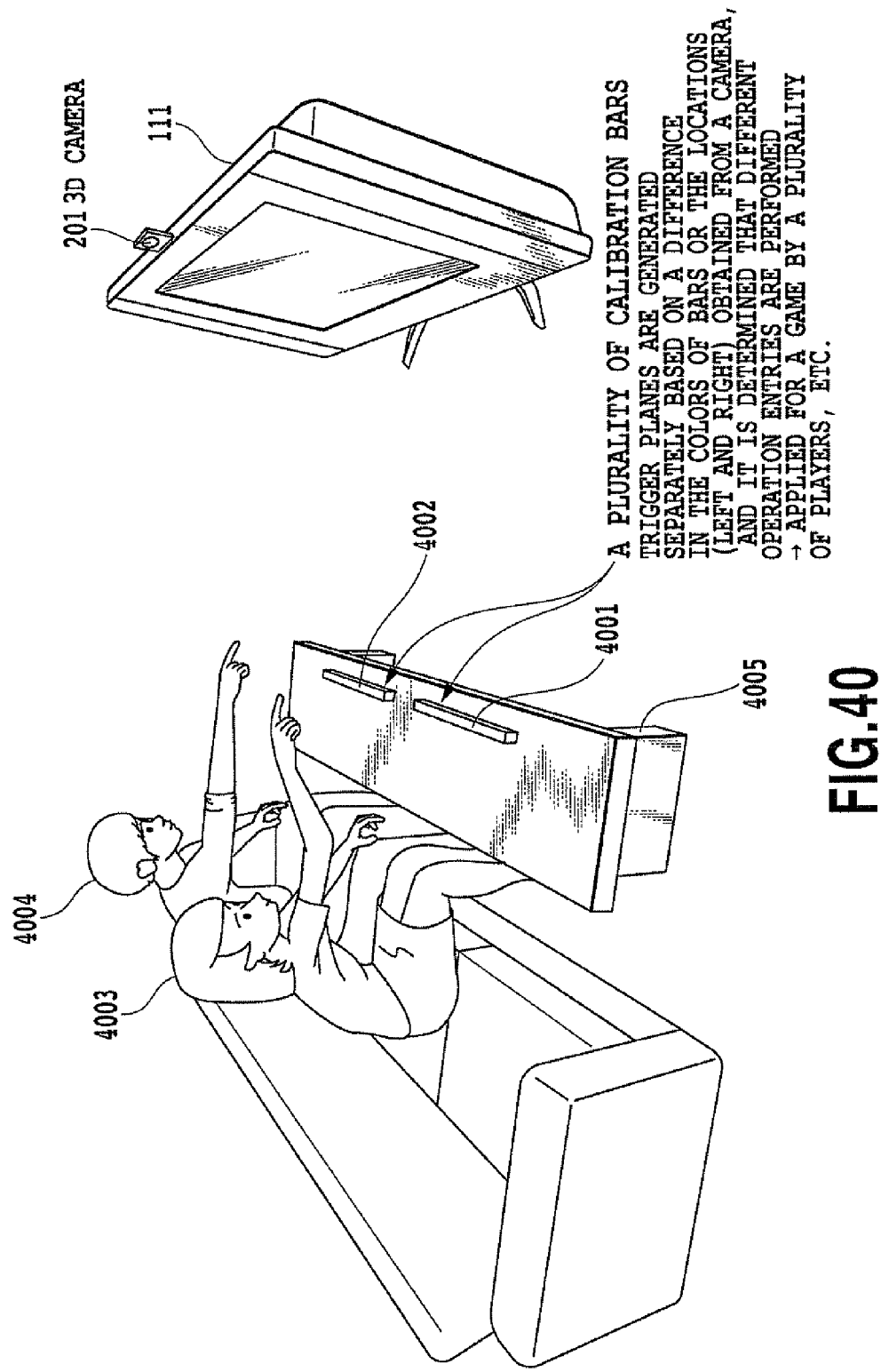
FIG. 40 is a diagram showing the state, according to still one more embodiment of the present invention, for a plurality of virtual operation planes that are formed based on a plurality of operation plane forming references.
Figure 41:
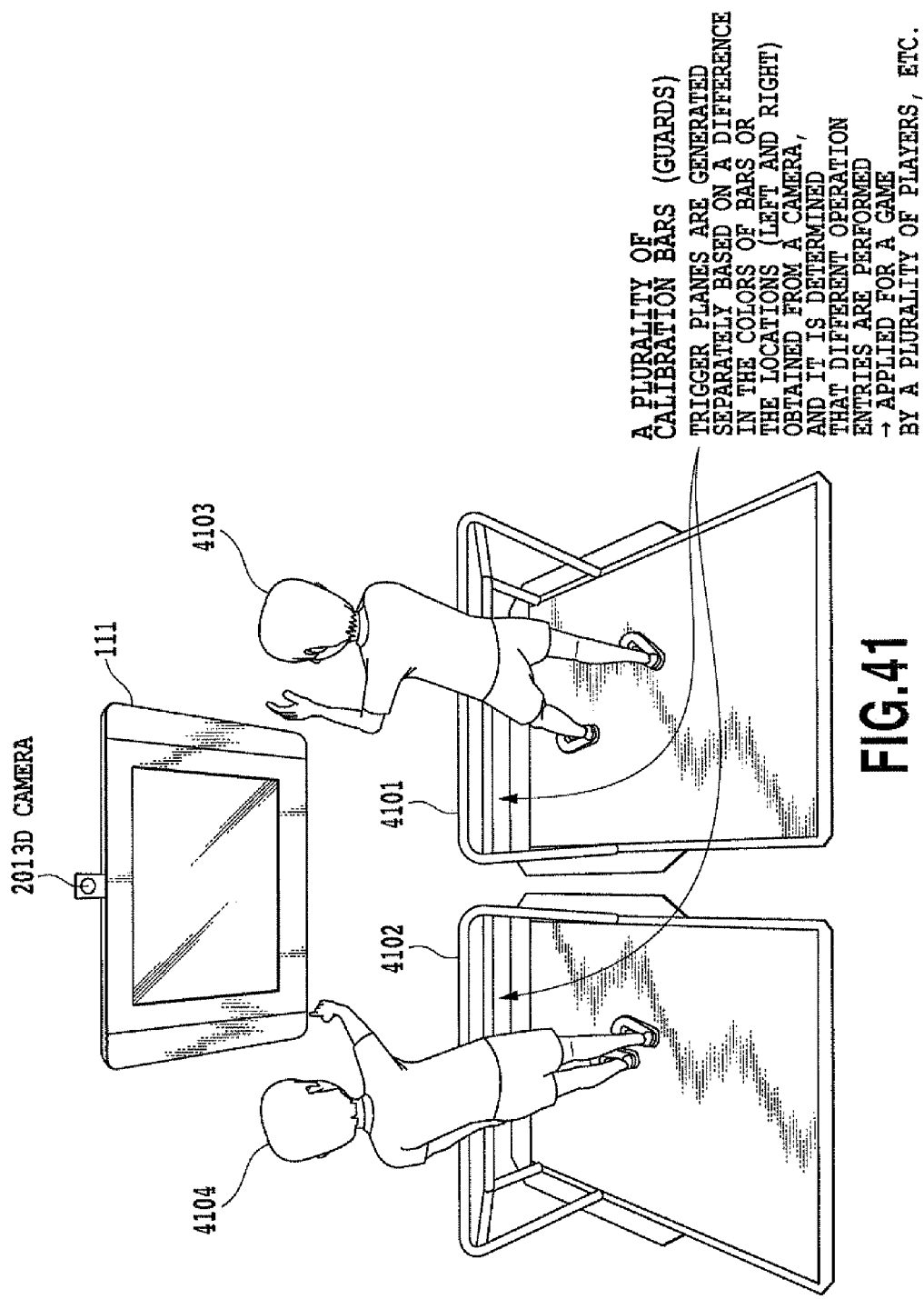
FIG. 41 is a diagram showing the state, according to still one further embodiment of the present invention, for a plurality of virtual operation planes that are formed based on a plurality of operation plane forming references.

FIG. 40 is a diagram illustrating an example system employing a plurality of operation plane forming references, as described above. In this example, a virtual operation plane is formed based on markers 4001 and 4002, provided on the upper face of a desk 4005, and when operators 4003 and 4004 move hands, etc., along the virtual operation plane that is formed, these movements are recognized as actions, the operations intended by the operators 4003 and 4004 are identified, and the succeeding processes are performed. In this example, the markers 4001 and 4002 are distinguished by colors. Similarly, FIG. 41 is a diagram illustrating another example system that employs a plurality of operation plane forming references, as described above. Markers 4101 and 4102 can be employed to process the operations entered separately by operators 4103 and 4104. In this example, it is assumed that the markers can be identified by colors or shapes.

As described above, in this embodiment, since a plurality of operation plane forming references that can be distinguished from each other are employed, the operation entries of the individual operators are enabled, and except for identifying the markers and the operators, the apparatuses or the methods employed for the first to the fourth embodiments are also employed. Further, only two operators are shown in FIGS. 40 and 41, abut this embodiment can be applied and used for more operators.

Eighth Embodiment

According to this embodiment, one of the first to seventh embodiments described above is employed to provide a greater variety of operations for the determination processes. That is, for this embodiment, an operator also employs, as a reference, a virtual operation plane that is virtually formed in space, and enters an operation instruction as if an input device, such as a touch panel, were present in space, and the determination of the operation contents is appropriately performed. The contents of the operation are determined using a positional relationship, between a virtual operation plane and one body part, such as the hand, of an operator, or an object the operator is wearing, in the rearward direction from the virtual operation plane, i.e., in a direction separate from the operator. For example, two or three layers provided as an operation area in the z-axial direction, which is a direction separate from the operator, are designated as virtual operation layers, and the type of operation is determined by examining the layer where the hand of the operator is currently positioned, and the operation contents are determined in accordance with the movement of the hand within the layer. At this time, when the position of the hand and the operation type are displayed on the display screen the operator is watching, it is easier for the operator to recognize the operation. It should be noted that the distances in the z direction between one part of the operator and the planes that divide the individual layers can be obtained by the method explained in the first embodiment.

Figure 45:
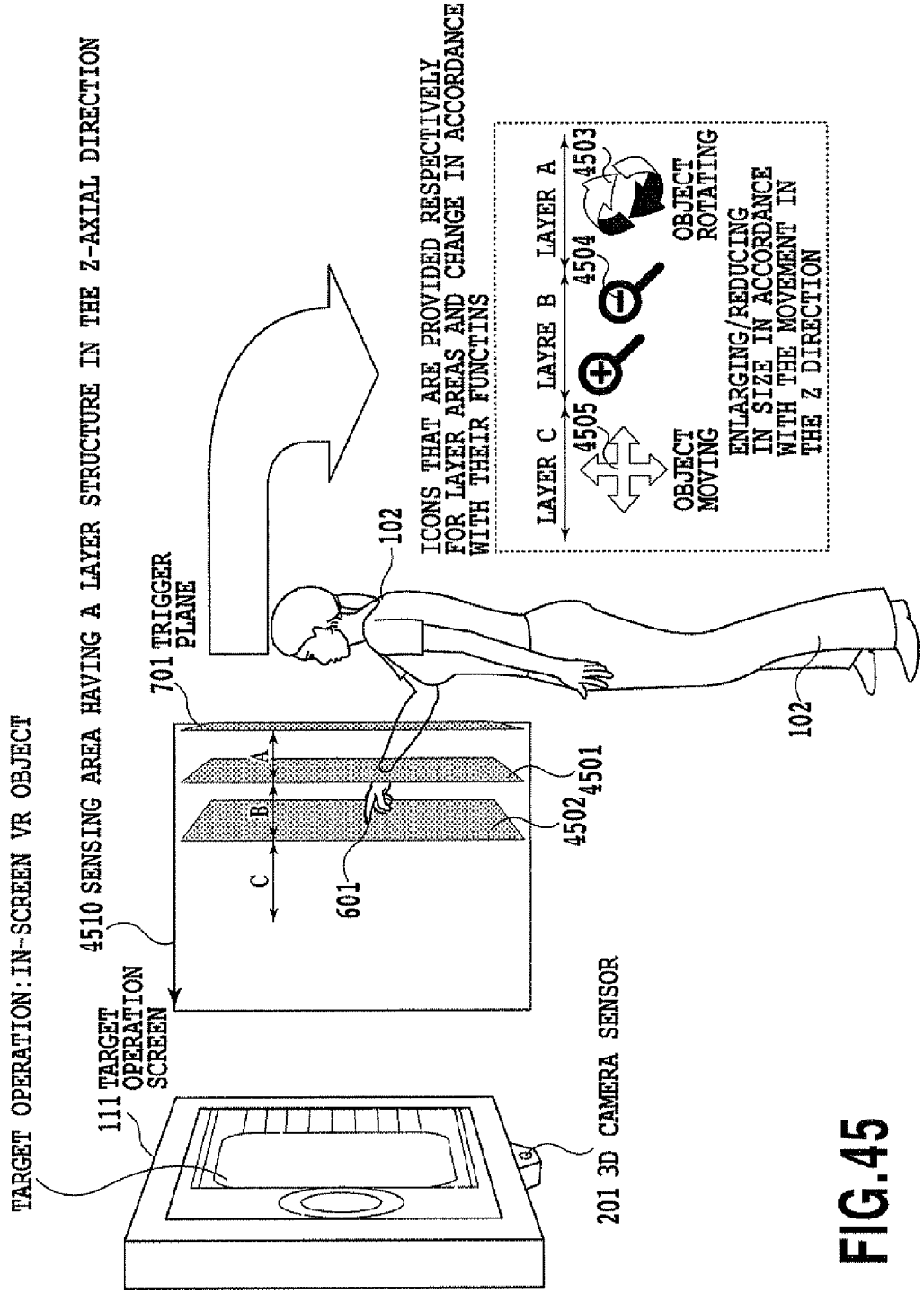
FIG. 45 is a diagram showing a relationship between an action of an operator and a menu displayed on a screen according to again an additional embodiment of the present invention.

This embodiment will be more specifically described, while referring to drawings. As well as in the first to seventh embodiments, a trigger plane 701 shown in FIG. 45 is a virtual operation plane for this invention, and when a finger 601 passes through the trigger plane 701 in the direction of the z axis by using one of the above described embodiments, it is determined that an operation instruction has been entered. Furthermore, in this embodiment, the above described operation area is divided into three layers A to C by planes 4501 and 4502, and different operation types are allocated to these layers. In the example shown in FIG. 45, a rotation operation for an object is allocated to the layer A, an enlarging/reducing operation is allocated to the layer B and a moving operation for an object is allocated to the layer C. When the finger 601 is moved in each layer, a corresponding operation is performed. As for the layer A, for example, when the finger 601 has passed through the trigger plane 701, a selected object is rotated, in accordance with the movement of the finger 601, at a position indicated by an icon that represents the finger 601, e.g., a rotation icon 4503. As for the layer B, an enlarging/reducing icon 4504, for example, is displayed on a monitor 111, and when the finger 601 is moved in the z direction, an object can be enlarged, or when the finger 601 is moved in the opposite direction, the size of the object can be reduced.

Likewise, as for the layer C, a moving icon 4505 is displayed at the position of the finger 601 on the designated object on the monitor 111, and can be moved in accordance with the movement of the finger 601. Here, the planes 4501 and 4502 that separate the layers can be arranged so that the individual layers have the same depth, or can be located at different depths in accordance with operation types that are allocated for the layers. In the example in FIG. 45 wherein the enlarging/reducing operation is allocated to the layer B, enlarging/reducing of the size should be expressed by using the forward and backward movement, and usually the movement in the z direction in the layer B becomes greater, compared with the layers A and C. When the thickness of the layer B is greater, the operation can be more easily be performed.

Figure 46:
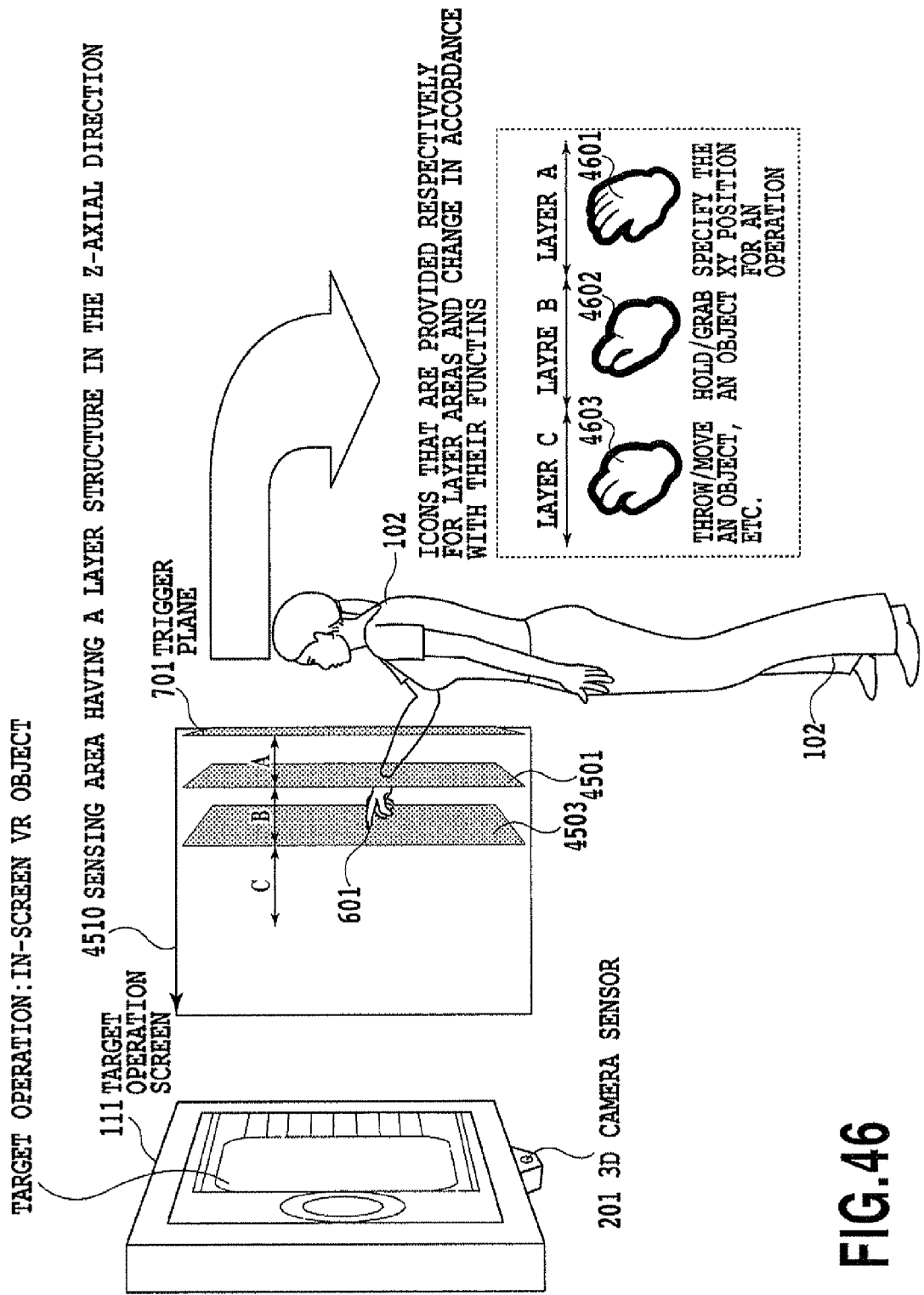
FIG. 46 is a diagram showing the action of an operator and a menu displayed on a screen according to again a further embodiment of the present invention.

FIG. 46 is a diagram illustrating another example icon according to this embodiment. According to the example in FIG. 46, an operation for specifying an operation position on the monitor is allocated for the layer A, an operation for "holding" an object at a specified position is allocated for the layer B, and an operation for throwing, or moving an object that is being held is allocated for the layer C.

As described above, in this embodiment, when the movement is identified as an operation based on a virtual operation plane, and when the contents of the operation are to be determined, not only the movement of the finger or the hand, but also its position in the z direction, i.e., the virtual operation layer, can be employed to determine an operation type. Therefore, compared with a case wherein many varied gesture patterns must be prepared and a user must remember these to perform determinations for operations based on the movement of the fingers and the hand, complicated operations can be accurately designated merely by performing a simple act.

In the above described examples, especially in the example shown in FIG. 45, operations are prepared so that a series of movements by a hand, a finger, etc., are sequentially performed between the individual layers. However, for a case (example in FIG. 46) wherein a sequential operation is not available, the following two problems exist. That is, (1) before the hand or the finger reaches a target virtual operation layer, it passes through the other layer, and as a result, an instruction the operator does not desire is entered; and (2) in a case wherein the hand exits the operation area after a targeted operation has ended, the hand passes through the other virtual operation area, and an operation the operator does not desire is entered. In order to avoid these problems, the following method, for example, can be employed. Specifically, a multi-sensing state wherein the other hand of an operating hand is inserted into the operation area (for example, the state wherein the left hand is inserted into the operation area while the right hand is used for an operation) is designated as the state wherein no operation input is performed (or, operation input is performed), and whether operations for the individual layers should be performed is determined depending on the insertion of the hand opposite to the operating hand (according to this example, the operation is performed using two hands, but various other methods are available, like forming an exit area in the XY plane).

The invention claimed is:

1. An image recognition apparatus comprising:
   three-dimensional imaging means for capturing an image of at least part of an operator, and for generating stereoscopic image data;
   a virtual operation plane forming reference, which is visible for an operator, so that the operator is able to identify a virtual operation plane in a predetermined space;
   operation determination means for forming the virtual operation plane based on the operation plane forming reference, permitting the three-dimensional imaging means to scan an action of the operator relative to the formed virtual operation plane, and for employing a positional relationship between a part of the operator and the virtual operation plane to determine whether or not the action indicates an operation instruction; and
   signal output means for outputting a predetermined signal when it is determined that the action indicates an operation instruction.

2. The image recognition apparatus according to claim 1, wherein the virtual operation plane is a plane formed by an upward projection from the operation plane forming reference.

3. The image recognition apparatus according to claim 2, further comprising:
   action limiting means for restricting the operator on an action on an operator side along the operation plane forming reference.

4. The image recognition apparatus according to claim 1, wherein the virtual operation plane is a plane formed by a projection upward from a predetermined position, on a side opposite an operator side, along the operation plane forming reference.

5. The image recognition apparatus according to claim 1, wherein when one part of the operator is closer to the three-dimensional imaging means than to the virtual operation plane, the operation determination means determines that the action indicates an operation instruction.

6. The image recognition apparatus according to claim 1, wherein the operation determination means examines a shape or the action of a specific part of the operator that is closer to the three-dimensional imaging means than to the virtual operation plane, and determines that an operation correlated with the shape or the action is currently being performed.

7. The image recognition apparatus according to claim 6, wherein the operation determination means searches storage means wherein operation contents are stored in advance in correlation with the shapes or actions of one part of the operator, and determines that an operation that matches or is correlated with the shape or the action is an operation to be entered.

8. The image recognition apparatus according to claim 1, wherein the operation plane forming reference is indicated on a surface of a floor where the operator is located.

9. The image recognition apparatus according to claim 1, further comprising:
   a solid object located between the operator and the three-dimensional imaging means, wherein the operation plane forming reference is a predetermined outer edge of the solid object.

10. The image recognition apparatus according to claim 9, wherein the solid object is a table.

11. The image recognition apparatus according to claim 1, wherein, for the operation plane forming reference, markers are provided on a predetermined screen recorded by the three-dimensional imaging means, so that data can be easily extracted from an image that is read.

12. The image recognition apparatus according to claim 1, further comprising:
   image display means arranged opposite the operator, wherein the operation determination means displays current results for an operation determination on the image display means, so that the operator can obtain the determination results.

13. The image recognition apparatus according to claim 1, further comprising:
   operation contents determination means for, when a gesture of the operator has occurred within one of two or more virtual operation layers that are areas defined based on the positional relationship relative to the virtual operation plane, determining the contents of an operation based on an operation type, allocated in advance to the virtual operation layer, and the gesture of the operator performed in the virtual operation layer.

14. The image recognition apparatus according to claim 1, wherein
   said virtual operation plane forming reference is located in advance within an imaging range of the imaging means, and
   said virtual operation plane is formed based on the operation plane forming reference that is read by the three-dimensional imaging means.

15. An operation determination method, whereby an image recognition apparatus recognizes an image for an operator and determines contents of an operation, the method comprising:
   a three-dimensional imaging step of reading a virtual operation plane forming reference, which is visible for an operator, so that the operator is able to identify a virtual operation plane in a predetermined space, and also of capturing an image of at least part of an operator, within an imaging range of a predetermined imaging means, and generating stereoscopic image data;
   an operation determination step of forming the virtual operation plane based on the operation plane forming reference, and employing a positional relationship between a part of the operator and the virtual operation plane to determine whether or not an action, obtained at the three-dimensional imaging step, indicates an operation instruction; and
   a signal output step of outputting a predetermined signal when it is determined that the action indicates an operation instruction.

16. An image recognition apparatus comprising:

three-dimensional imaging means for reading an image of at least one part of an operator, and generating a three-dimensional image;

operation determination means for forming a virtual operation plane, which serves as an operation reference for the operator, by employing a pre-designated size, at a pre-designated position in an imaging range of the three-dimensional imaging means, and for permitting the three-dimensional imaging means to scan an action of the operator on the virtual operation plane that is formed, and employing a positional relationship of a part of the operator and the virtual operation plane to determine whether the action indicates an operation instruction;

image display means, visually recognizable by the operator, for employing the positional relationship, obtained by the operation determination means, between one part of the operator, on an opposite side of the three-dimensional imaging means, along the virtual operation plane, and the virtual operation plane, and calculating a distance between the two, and for displaying an indicator that changes in accordance with the distance in order to indicate an operation instruction to be determined; and signal output means for outputting a predetermined signal when the action indicates an operation instruction.

17. The image recognition apparatus according to claim 16, wherein the indicator becomes smaller when the distance from the part of the operator to the virtual operation plane is reduced.

18. The image recognition apparatus according to claim 16, wherein a hue for the indicator is changed when the distance from the part of the operator to the virtual operation plane is reduced.

19. The image recognition apparatus according to claim 16, wherein transparency for the indicator is lowered when the distance from the part of the operator to the virtual operation plane is reduced.

20. The image recognition apparatus according to claim 16, wherein a contrast between the indicator and an image to be operated displayed on the image display means is increased when the distance from the part of the operator to the virtual operation plane is reduced.

21. The image recognition apparatus according to claim 16, wherein a shape for the indicator is changed when the distance from the part of the operator to the virtual operation plane is reduced.

22. The image recognition apparatus according to claim 16, wherein there are more than one part for the operator, and a plurality of indicators are displayed in correlation with the individual parts of the operator.

23. The image recognition apparatus according to claim 16, further comprising:

operation contents determination means for, when a gesture of the operator has occurred within one of two or more virtual operation layers that are areas defined based on the positional relationship relative to the virtual operation plane, determining contents of an operation based on an operation type, allocated in advance to the virtual operation layer, and the gesture of the operator performed in the virtual operation layer.

* * * * *